US012670142B2

(12) United States Patent
Dixit et al.

(10) Patent No.: US 12,670,142 B2
(45) Date of Patent: *Jun. 30, 2026

(54) ASSURANCE OF SECURITY RULES IN A NETWORK

(71) Applicant: Cisco Technology, Inc., San Jose, CA (US)

(72) Inventors: Advait Dixit, Sunnyvale, CA (US); Navneet Yadav, Cupertino, CA (US); Navjyoti Sharma, Livermore, CA (US); Ramana Rao Kompella, Cupertino, CA (US); Kartik Mohanram, Pittsburgh, PA (US)

(73) Assignee: Cisco Technology, Inc., San Jose, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 18/495,305

(22) Filed: Oct. 26, 2023

(65) Prior Publication Data
US 2024/0146774 A1      May 2, 2024

Related U.S. Application Data

(63) Continuation of application No. 17/157,957, filed on Jan. 25, 2021, now Pat. No. 11,888,603, which is a
(Continued)

(51) Int. Cl.
*H04L 9/40* (2022.01)
*G06F 16/22* (2019.01)
(Continued)

(52) U.S. Cl.
CPC ...... *G06F 16/2246* (2019.01); *H04L 41/0893* (2013.01); *H04L 41/0894* (2022.05);
(Continued)

(58) Field of Classification Search
CPC ............. G06F 9/45558; G06F 16/2246; G06F 2209/45562; G06F 2209/45595;
(Continued)

(56) References Cited

U.S. PATENT DOCUMENTS 5,204,829  A      4/1993  Lyu et al.
6,763,380  B1      7/2004  Mayton et al.
(Continued)

FOREIGN PATENT DOCUMENTS

CN      103701926  A      4/2014
CN      105471830  A      4/2016
(Continued)

OTHER PUBLICATIONS

"Datasheet: Firewall & Compliance Check for Endpoint"—Check Point Software Technologies, LTD., Mar. 15, 2013 https://www.checkfirewalls.co.il/datasheets/ds-endpoint-firewall-compliance.pdf (Year: 2013).*
(Continued)

*Primary Examiner* — Randy A Scott
(74) *Attorney, Agent, or Firm* — Polsinelli P.C.

(57) ABSTRACT

In some examples, a system creates a requirement including EPG selectors representing EPG pairs, a traffic selector, and a communication operator; determines that EPGs in distinct pairs are associated with different network contexts and, for each pair, which network context(s) contains associated policies; creates first data representing the pair, operator, and traffic selector; when only one network context contains the associated policies, creates second data representing a network model portion associated with the only network context and determines whether the first data is contained in the second data to yield a first check; when both network contexts contain the associated policies, also creates third data representing a network model portion associated with a
(Continued)

second network context, and determines whether the first data is contained in the second and/or third data to yield a second check; and determines whether policies for the pairs comply with the requirement based on the checks.

18 Claims, 47 Drawing Sheets

Related U.S. Application Data continuation of application No. 16/217,607, filed on Dec. 12, 2018, now Pat. No. 10,911,495.

(60) Provisional application No. 62/690,454, filed on Jun. 27, 2018.

(51) Int. Cl.

| | |
|---|---|
| *H04L 41/0893* | (2022.01) |
| *H04L 41/0894* | (2022.01) |
| *H04L 43/08* | (2022.01) |
| *G06F 9/455* | (2018.01) |

(52) U.S. Cl.
CPC .......... *H04L 63/20* (2013.01); *G06F 9/45558* (2013.01); *G06F 2009/45562* (2013.01); *G06F 2009/45595* (2013.01)

(58) Field of Classification Search
CPC ............. H04L 41/0893; H04L 41/0894; H04L 41/5019; H04L 63/20
See application file for complete search history.

(56) References Cited

U.S. PATENT DOCUMENTS

| | | | |
|---|---|---|---|
| 7,003,562 | B2 | 2/2006 | Mayer |
| 7,089,369 | B2 | 8/2006 | Emberling |
| 7,127,686 | B2 | 10/2006 | Drechsler et al. |
| 7,360,064 | B1 | 4/2008 | Steiss et al. |
| 7,453,886 | B1 | 11/2008 | Allan |
| 7,505,463 | B2 | 3/2009 | Schuba et al. |
| 7,548,967 | B2 | 6/2009 | Amyot et al. |
| 7,552,201 | B2 | 6/2009 | Areddu et al. |
| 7,609,647 | B2 | 10/2009 | Turk et al. |
| 7,619,989 | B2 | 11/2009 | Guingo et al. |
| 7,698,561 | B2 | 4/2010 | Nagendra et al. |
| 7,743,274 | B2 | 6/2010 | Langford et al. |
| 7,765,093 | B2 | 7/2010 | Li et al. |
| 7,975,286 | B1 * | 7/2011 | Fickey ................... H04L 63/20 |
| | | | 726/4 |
| 8,010,952 | B2 | 8/2011 | Datla et al. |
| 8,073,935 | B2 | 12/2011 | Mswanath |
| 8,103,480 | B2 | 1/2012 | Korn et al. |
| 8,190,719 | B2 | 5/2012 | Furukawa |
| 8,209,738 | B2 | 6/2012 | Nicol et al. |
| 8,261,339 | B2 | 9/2012 | Aldridge et al. |
| 8,312,261 | B2 | 11/2012 | Rao et al. |
| 8,375,117 | B2 | 2/2013 | Venable, Sr. |
| 8,441,941 | B2 | 5/2013 | McDade et al. |
| 8,479,267 | B2 | 7/2013 | Donley et al. |
| 8,484,693 | B2 | 7/2013 | Cox et al. |
| 8,494,977 | B1 | 7/2013 | Yehuda et al. |
| 8,554,883 | B2 | 10/2013 | Sankaran |
| 8,589,934 | B2 | 11/2013 | Makljenovic et al. |
| 8,621,284 | B2 | 12/2013 | Kato |
| 8,627,328 | B2 | 1/2014 | Mousseau et al. |
| 8,693,344 | B1 | 4/2014 | Adams et al. |
| 8,693,374 | B1 | 4/2014 | Murphy et al. |
| 8,761,036 | B2 | 6/2014 | Fulton et al. |
| 8,769,063 | B2 | 7/2014 | Barton et al. |
| 8,775,352 | B2 * | 7/2014 | Sen ......................... H04L 47/20 |
| | | | 706/47 |
| 8,782,182 | B2 | 7/2014 | Chaturvedi et al. |

| | | | |
|---|---|---|---|
| 8,824,482 | B2 | 9/2014 | Kajekar et al. |
| 8,910,143 | B2 | 12/2014 | Cohen et al. |
| 8,914,843 | B2 | 12/2014 | Bryan et al. |
| 8,924,798 | B2 | 12/2014 | Jerde et al. |
| 9,019,840 | B2 | 4/2015 | Salam et al. |
| 9,038,151 | B1 | 5/2015 | Chua et al. |
| 9,055,000 | B1 | 6/2015 | Ghosh et al. |
| 9,106,555 | B2 | 8/2015 | Agarwal et al. |
| 9,137,096 | B1 | 9/2015 | Yehuda et al. |
| 9,225,601 | B2 | 12/2015 | Khurshid et al. |
| 9,246,818 | B2 | 1/2016 | Deshpande et al. |
| 9,264,922 | B2 | 2/2016 | Gillot et al. |
| 9,276,877 | B1 | 3/2016 | Chua et al. |
| 9,319,300 | B2 | 4/2016 | Huynh Van et al. |
| 9,344,348 | B2 | 5/2016 | Ivanov et al. |
| 9,369,434 | B2 | 6/2016 | Kim et al. |
| 9,389,993 | B1 | 7/2016 | Okmyanskiy et al. |
| 9,405,553 | B2 | 8/2016 | Branson et al. |
| 9,444,842 | B2 | 9/2016 | Porras et al. |
| 9,497,207 | B2 | 11/2016 | Dhawan et al. |
| 9,497,215 | B2 | 11/2016 | Vasseur et al. |
| 9,544,224 | B2 | 1/2017 | Chu et al. |
| 9,548,965 | B2 | 1/2017 | Wang et al. |
| 9,553,845 | B1 | 1/2017 | Talmor et al. |
| 9,571,502 | B2 | 2/2017 | Basso et al. |
| 9,571,523 | B2 | 2/2017 | Porras et al. |
| 9,594,640 | B1 | 3/2017 | Chheda |
| 9,596,141 | B2 | 3/2017 | McDowall |
| 9,641,249 | B2 | 5/2017 | Kaneriya et al. |
| 9,654,300 | B2 | 5/2017 | Pani |
| 9,654,361 | B2 | 5/2017 | Vasseur et al. |
| 9,654,409 | B2 | 5/2017 | Yadav et al. |
| 9,660,886 | B1 | 5/2017 | Ye et al. |
| 9,660,897 | B1 | 5/2017 | Gredler |
| 9,660,905 | B2 | 5/2017 | Dunbar et al. |
| 9,667,645 | B1 | 5/2017 | Belani et al. |
| 9,680,875 | B2 | 6/2017 | Knjazihhin et al. |
| 9,686,180 | B2 | 6/2017 | Chu et al. |
| 9,686,296 | B1 | 6/2017 | Murchison et al. |
| 9,690,644 | B2 | 6/2017 | Anderson et al. |
| 9,781,004 | B2 | 10/2017 | Danait et al. |
| 9,787,559 | B1 | 10/2017 | Schroeder |
| 9,998,247 | B1 | 6/2018 | Choudhury et al. |
| 10,084,795 | B2 | 9/2018 | Akireddy et al. |
| 10,084,833 | B2 | 9/2018 | McDonnell et al. |
| 10,084,895 | B2 | 9/2018 | Kasat et al. |
| 2002/0143855 | A1 | 10/2002 | Traversat et al. |
| 2002/0178246 | A1 | 11/2002 | Mayer |
| 2003/0229693 | A1 | 12/2003 | Mahlik et al. |
| 2004/0073647 | A1 | 4/2004 | Gentile et al. |
| 2004/0168100 | A1 | 8/2004 | Thottan et al. |
| 2005/0108389 | A1 | 5/2005 | Kempin et al. |
| 2007/0011629 | A1 | 1/2007 | Shacham et al. |
| 2007/0107043 | A1 | 5/2007 | Newstadt et al. |
| 2007/0124437 | A1 | 5/2007 | Chervets |
| 2007/0214244 | A1 | 9/2007 | Hitokoto et al. |
| 2008/0031147 | A1 | 2/2008 | Fieremans et al. |
| 2008/0117827 | A1 | 5/2008 | Matsumoto et al. |
| 2008/0133731 | A1 | 6/2008 | Bradley et al. |
| 2008/0172716 | A1 | 7/2008 | Talpade et al. |
| 2008/0301765 | A1 * | 12/2008 | Nicol ..................... H04L 63/20 |
| | | | 726/1 |
| 2009/0240758 | A1 | 9/2009 | Pasko et al. |
| 2009/0249284 | A1 | 10/2009 | Antosz et al. |
| 2010/0191612 | A1 | 7/2010 | Raleigh |
| 2010/0198909 | A1 | 8/2010 | Kosbab et al. |
| 2011/0093612 | A1 | 4/2011 | Murakami |
| 2011/0295983 | A1 | 12/2011 | Medved et al. |
| 2012/0054163 | A1 | 3/2012 | Liu et al. |
| 2012/0198073 | A1 | 8/2012 | Srikanth et al. |
| 2012/0297061 | A1 | 11/2012 | Pedigo et al. |
| 2013/0097660 | A1 | 4/2013 | Das et al. |
| 2013/0191516 | A1 | 7/2013 | Sears |
| 2014/0019597 | A1 | 1/2014 | Nath et al. |
| 2014/0177638 | A1 | 6/2014 | Bragg et al. |
| 2014/0222996 | A1 | 8/2014 | Vasseur et al. |
| 2014/0304831 | A1 | 10/2014 | Hidlreth et al. |
| 2014/0307556 | A1 | 10/2014 | Zhang |
| 2014/0321277 | A1 | 10/2014 | Lynn, Jr. et al. |

(56) References Cited

U.S. PATENT DOCUMENTS

| | | |
|---|---|---|
| 2014/0379915 A1 | 12/2014 | Yang et al. |
| 2015/0019756 A1 | 1/2015 | Masuda |
| 2015/0113143 A1 | 4/2015 | Stuart et al. |
| 2015/0124826 A1 | 5/2015 | Edsall et al. |
| 2015/0186206 A1 | 7/2015 | Bhattacharya et al. |
| 2015/0234695 A1 | 8/2015 | Cuthbert et al. |
| 2015/0244617 A1 | 8/2015 | Nakil et al. |
| 2015/0271104 A1 | 9/2015 | Chikkamath et al. |
| 2015/0295771 A1 | 10/2015 | Cuni et al. |
| 2015/0365314 A1 | 12/2015 | Hiscock et al. |
| 2015/0381484 A1 | 12/2015 | Hira et al. |
| 2016/0020993 A1 | 1/2016 | Wu et al. |
| 2016/0021141 A1 | 1/2016 | Liu et al. |
| 2016/0026631 A1 | 1/2016 | Salam et al. |
| 2016/0036636 A1 | 2/2016 | Erickson et al. |
| 2016/0048420 A1 | 2/2016 | Gourlay et al. |
| 2016/0078220 A1 | 3/2016 | Scharf et al. |
| 2016/0080350 A1 | 3/2016 | Chaturvedi et al. |
| 2016/0099883 A1 | 4/2016 | Voit et al. |
| 2016/0105317 A1 | 4/2016 | Zimmermann et al. |
| 2016/0112246 A1 | 4/2016 | Singh et al. |
| 2016/0112269 A1 | 4/2016 | Singh et al. |
| 2016/0149751 A1 | 5/2016 | Pani et al. |
| 2016/0164748 A1 | 6/2016 | Kim |
| 2016/0224277 A1 | 8/2016 | Batra et al. |
| 2016/0241436 A1 | 8/2016 | Fourie et al. |
| 2016/0254964 A1 | 9/2016 | Benc |
| 2016/0255117 A1* | 9/2016 | Sinha ...................... G06F 21/56 726/1 |
| 2016/0267384 A1 | 9/2016 | Salam et al. |
| 2016/0323319 A1 | 11/2016 | Gourlay et al. |
| 2016/0330076 A1 | 11/2016 | Tiwari et al. |
| 2016/0330125 A1 | 11/2016 | Mekkattuparamban et al. |
| 2016/0352566 A1 | 12/2016 | Mekkattuparamban et al. |
| 2016/0380892 A1 | 12/2016 | Mahadevan et al. |
| 2017/0026292 A1 | 1/2017 | Smith et al. |
| 2017/0031800 A1 | 2/2017 | Shani et al. |
| 2017/0031970 A1 | 2/2017 | Burk et al. |
| 2017/0048110 A1 | 2/2017 | Wu et al. |
| 2017/0048126 A1 | 2/2017 | Handige Shankar et al. |
| 2017/0054758 A1 | 2/2017 | Maino et al. |
| 2017/0063599 A1 | 3/2017 | Wu et al. |
| 2017/0093630 A1 | 3/2017 | Foulkes |
| 2017/0093664 A1 | 3/2017 | Lynam et al. |
| 2017/0093750 A1 | 3/2017 | McBride et al. |
| 2017/0093918 A1 | 3/2017 | Banerjee et al. |
| 2017/0111259 A1 | 4/2017 | Wen et al. |
| 2017/0118167 A1 | 4/2017 | Subramanya et al. |
| 2017/0126740 A1 | 5/2017 | Bejarano Ardila et al. |
| 2017/0126792 A1 | 5/2017 | Halpern et al. |
| 2017/0134233 A1 | 5/2017 | Dong et al. |
| 2017/0163442 A1 | 6/2017 | Shen et al. |
| 2017/0187577 A1 | 6/2017 | Nevrekar et al. |
| 2017/0195187 A1 | 7/2017 | Bennett et al. |
| 2017/0206129 A1 | 7/2017 | Yankilevich et al. |
| 2017/0222873 A1 | 8/2017 | Lee et al. |
| 2017/0353355 A1 | 12/2017 | Danait et al. |
| 2018/0069754 A1 | 3/2018 | Dasu et al. |
| 2018/0167294 A1 | 6/2018 | Gupta et al. |
| 2018/0367405 A1 | 12/2018 | Harneja et al. |

FOREIGN PATENT DOCUMENTS

| | | |
|---|---|---|
| CN | 105721193 A | 6/2016 |
| CN | 105721297 A | 6/2016 |
| CN | 106130766 A | 11/2016 |
| CN | 106603264 A | 4/2017 |
| CN | 103701926 B | 6/2017 |
| WO | 2015014177 A1 | 2/2015 |
| WO | 2015187337 A1 | 12/2015 |
| WO | 2016039730 A1 | 3/2016 |
| WO | 2016085516 A1 | 6/2016 |
| WO | 2016093861 A1 | 6/2016 |
| WO | 2016119436 A1 | 8/2016 |
| WO | 2016130108 A1 | 8/2016 |
| WO | 2016161127 A1 | 10/2016 |
| WO | 2017031922 A1 | 3/2017 |
| WO | 2017039606 A1 | 3/2017 |
| WO | 2017105452 A1 | 6/2017 |

OTHER PUBLICATIONS

"Check Point Endpoint Security"—Check Point Software Technologies, LTD., Aug. 18, 2010 https://www.techmaxkenya.com/resources/checkpoint_endpoint_security_datasheet.pdf (Year: 2010).*

Akella A., et al., "A Highly Available Software Defined Fabric," HotNets-XIII, Los Angeles, CA, USA, Copyright 2014, ACM, Oct. 27-28, 2014, 7 Pages.

Alsheikh M.A., et al., "Machine Learning in Wireless Sensor Networks: Algorithms, Strategies, and Applications," arxiv.org, Mar. 19, 2015, pp. 1-23.

"Check point Endpoint Security Firewall Compliance," Check Point Software Technologies Ltd, Mar. 21, 2017, 2 pages, Retrieved from URL: https://www.checkpoint.com/downloads/product-related/datasheets/ds-endpoint-firewall-compliance.pdf.

Cisco: Cisco Application Centric Infrastructure (ACI) Design Guide, May 2014, pp. 1-298.

Cisco, "Cisco Application Centric Infrastructure (ACI) Endpoint Groups (EPG) Usage and Design," White Paper, Cisco Systems, Inc., May 2014, 14 Pages.

Cisco Systems, Inc., "The Cisco Application Policy Infrastructure Controller Introduction," What is the Cisco Application Policy Infrastructure Controller? White Paper, Jul. 31, 2014, 19 Pages.

Cisco, "Verify Contracts and Rules in the ACI Fabric," Cisco, Updated on Aug. 19, 2016, Document ID: 119023, 20 Pages.

De Silva H.M.G.R., "Network-Wide Security Analysis", Department of Information Systems, Brno University of Technology, Oct. 25, 2011, 2017, pp. 1-11.

De Silva., "Network-Wide Security Analysis," Semantic Scholar, Oct. 25, 2011, pp. 1-11.

Dhawan M., et al., "SPHINX: Detecting Security Attacks in Software-Defined Networks," NDSS, San Diego, CA, USA, Feb. 8-11, 2015, pp. 1-15, Copyright 2015 Internet Society.

FaultLocalization-TR01-CADlab, "Aids to Pro-active Management of Distributed Resources through Dynamic Fault-Localization and Availability Prognosis," May 2006, pp. 1-9.

Fayaz S.K., et al., "Efficient Network Reachability Analysis using a Succinct Control Plane Representation," 2016, 16 Pages, Retrieved from URL: http://Fatul.org.

Feldmann A., et al., "IP Network Configuration for Intradomain Traffic Engineering," Semantic Scholar, Accessed on Jul. 20, 2017, 27 Pages.

Han W., et al., "LPM: Layered Policy Management for Software-Defined Networks," Mar. 8, 2016, pp. 1-8.

Han Y., et al., "An Intent-based Network Virtualization Platform for SDN," IEEE, 2016, 10 Pages.

ITU-T, "Requirements for Applying Formal Methods to Software-defined Networking," Telecommunication Standardization Sector of ITU, Series Y: Global Information Infrastructure, Internet Protocol Aspects and Next-Generation Networks, Aug. 2014, pp. 1-20.

Jain P., et al., "In-Line Distributed and Stateful Security Policies for Applications in a Network Environment," Cisco Systems, Inc., Aug. 16, 2016, 13 Pages.

Kazemian P., et al., "Real Time Network Policy Checking using Header Space Analysis," USENIX Association, 10th USENIX Symposium on Networked Systems Design and Implementation (NSDI 13), 2013, pp. 99-111.

Khatkar P.K., "Firewall Rule Set Analysis and Visualization, A Thesis Presented in Partial Fulfillment of the Requirements for the Degree Master of Science," Arizona State University, Dec. 2014, pp. 1-58.

Le F., et al., "Minerals: Using Data Mining to Detect Router Misconfigurations," CyLab, Carnegie Mellon University, May 23, 2006, pp. 1-14, CMU-CyLab-06-008.

Liang C-J.M., et al., "SIFT: Building an Internet of Safe Things," Microsoft, International Conference on Information Processing in

(56) References Cited

OTHER PUBLICATIONS

Sensor Networks (IPSN '15), Association for Computing Machinery (ACM) 978, Seattle, WA, Apr. 14-16, 2015, 12 Pages.
Lindem A., et al., "Network Device YANG Organizational Model draft-rtgyangdt-rtgwg-device-model-01," Network Working Group, Internet-draft, Sep. 21, 2015, pp. 1-33.
Liu J., et al., "A Real-Time Network Simulation Infrastructure Based on Open VPN," Journal of Systems and Software, Aug. 4, 2008, pp. 1-45.
Lopes N.P., et al., "Automatically Verifying Reachability and Well-formedness in P4 Networks," Microsoft, accessed on Jul. 18, 2017, pp. 1-13.
Mai H., et al., "Debugging the Data Plane with Anteater," SIGCOMM11, Aug. 15-19, 2011, pp. 1-12.
Maldonado-Lopez F.A., et al., "Detection and Prevention of Firewall-rule Conflicts on Software-Defined Networking," 7th International Workshop On Reliable Networks Design And Modeling (RNDM), IEEE, Oct. 5-7, 2015, pp. 259-265, doi:10.1109/RNDM.2015. 7325238, ISBN 978-1-4673-8050-8, XP032808317.
Miller N., et al., "Collecting Network Status Information for Network-Aware Applications," International Conference on Computer Communications IEEE (INFOCOM), 2000, pp. 1-10.
Miranda J.S.H., "Fault Isolation in Software Defined Networks," Extended Abstract of the MSc Disseration, 2016, pp. 1-10, Retrieved from URL: www.gsd.inescid.pt.
Moon D., et al., "Bridging the Software/Hardware Forwarding Divide," Dec. 18, 2010, pp. 1-15, Retrieved from URL: http:// Berkeley.edu.

Panda A., et al., "SCL: Simplifying Distributed SDN Control Planes," Mar. 2017, pp. 1-17, Retrieved from URL: People. Eecs. Berkeley.Edu.
Shin S., et al., "FRESCO: Modular Composable Security Services for Software-Defined Networks," To appear in the ISOC Network and Distributed System Security Symposium, Feb. 2013, pp. 1-16.
Shukla A., et al., "Towards Meticulous Data Plane Monitoring," Accessed on Aug. 1, 2017, pp. 1-2, Retrieved from URL: http:// kaust.edu.sa.
Tang Y., et al., "Automatic Belief Network Modeling via Policy Interference for SDN Fault Localization," Journal of Internet Services and Applications, Biomed Central Ltd., London, UK, Jan. 20, 2016, vol. 7, No. 1, pp. 1-13.
Tomar K., et al., "Enhancing Network Security And Performance Using Optimized ACLs," International Journal in Foundations of Computer Science Technology (IJFCST), Nov. 2014, vol. 4, No. 6, pp. 25-35.
Tongaonkar A., et al., "Inferring Higher Level Policies from Firewall Rules," Proceedings of the 21st Large Installation System Administration Conference (LISA'07), Nov. 11-16, 2007, pp. 1-14.
Vega A., et al., "Troubleshooting Cisco Application Centric Infrastructure: Analytical Problem Solving Applied to the Policy Driven Data Center," Cisco, Feb. 15, 2016, 84 Pages.
Xia W., et al., "A Survey on Software-Defined Networking," IEEE Communications Surveys and Tutorials, Mar. 16, 2015, vol. 17, No. 1, pp. 27-51.
Yu H-C., et al., "A Flexible Framework for Wireless-Based Intelligent Sensor with Reconfigurability, Dynamic adding, and Web interface," ResearchGate, IEEE, Jul. 24, 2006, pp. 1-7.
Zhou S., et al., "High-Performance Packet Classification on GPU," IEEE, 2014, pp. 1-6.

* cited by examiner

INPUT AND OUTPUT OF STATIC POLICY ANALYZER

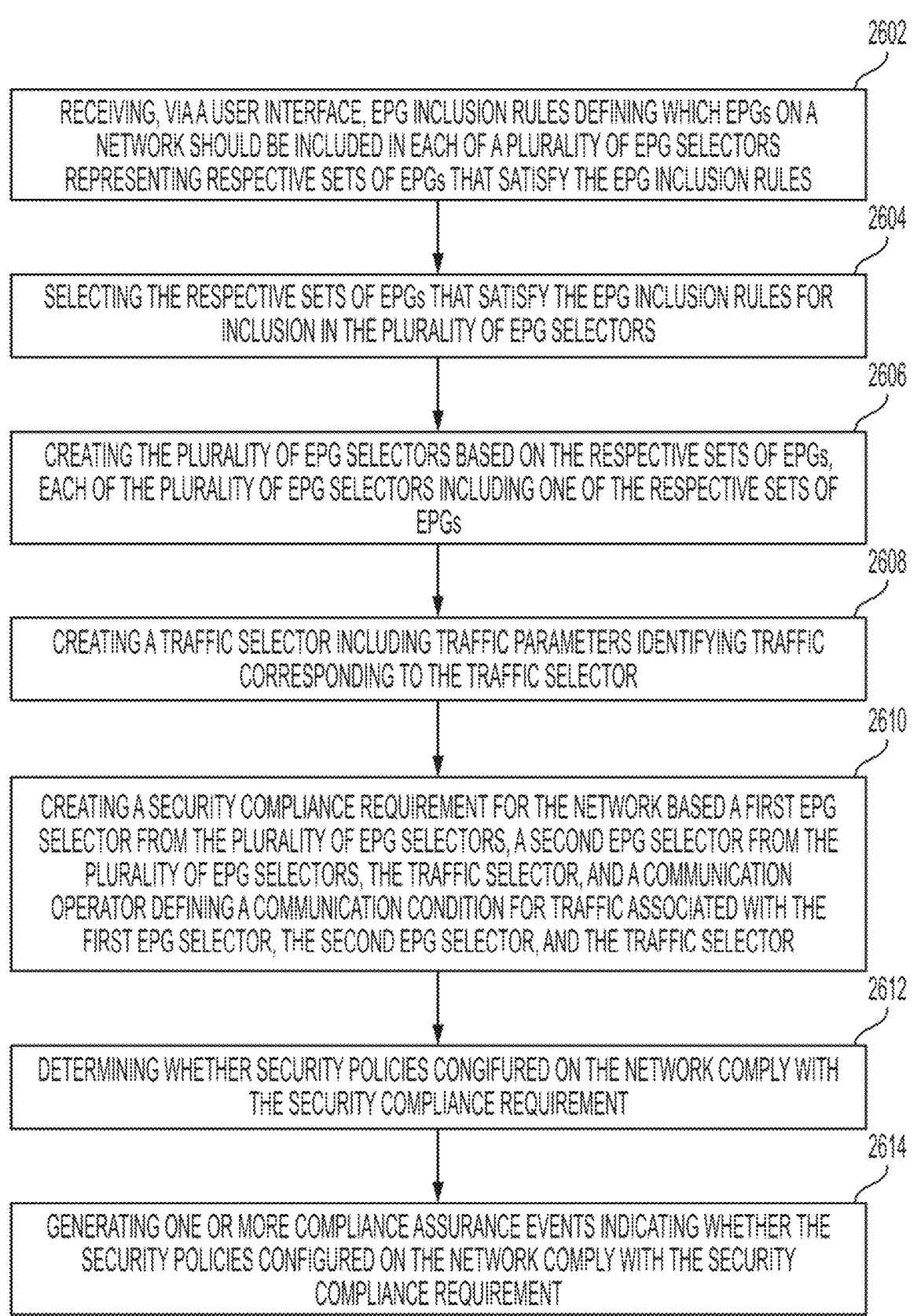

2602

RECEIVING, VIA A USER INTERFACE, EPG INCLUSION RULES DEFINING WHICH EPGs ON A NETWORK SHOULD BE INCLUDED IN EACH OF A PLURALITY OF EPG SELECTORS REPRESENTING RESPECTIVE SETS OF EPGs THAT SATISFY THE EPG INCLUSION RULES

2604

SELECTING THE RESPECTIVE SETS OF EPGs THAT SATISFY THE EPG INCLUSION RULES FOR INCLUSION IN THE PLURALITY OF EPG SELECTORS

2606

CREATING THE PLURALITY OF EPG SELECTORS BASED ON THE RESPECTIVE SETS OF EPGs, EACH OF THE PLURALITY OF EPG SELECTORS INCLUDING ONE OF THE RESPECTIVE SETS OF EPGs

2608

CREATING A TRAFFIC SELECTOR INCLUDING TRAFFIC PARAMETERS IDENTIFYING TRAFFIC CORRESPONDING TO THE TRAFFIC SELECTOR

2610

CREATING A SECURITY COMPLIANCE REQUIREMENT FOR THE NETWORK BASED A FIRST EPG SELECTOR FROM THE PLURALITY OF EPG SELECTORS, A SECOND EPG SELECTOR FROM THE PLURALITY OF EPG SELECTORS, THE TRAFFIC SELECTOR, AND A COMMUNICATION OPERATOR DEFINING A COMMUNICATION CONDITION FOR TRAFFIC ASSOCIATED WITH THE FIRST EPG SELECTOR, THE SECOND EPG SELECTOR, AND THE TRAFFIC SELECTOR

2612

DETERMINING WHETHER SECURITY POLICIES CONGIFURED ON THE NETWORK COMPLY WITH THE SECURITY COMPLIANCE REQUIREMENT

2614

GENERATING ONE OR MORE COMPLIANCE ASSURANCE EVENTS INDICATING WHETHER THE SECURITY POLICIES CONFIGURED ON THE NETWORK COMPLY WITH THE SECURITY COMPLIANCE REQUIREMENT

FIG. 26

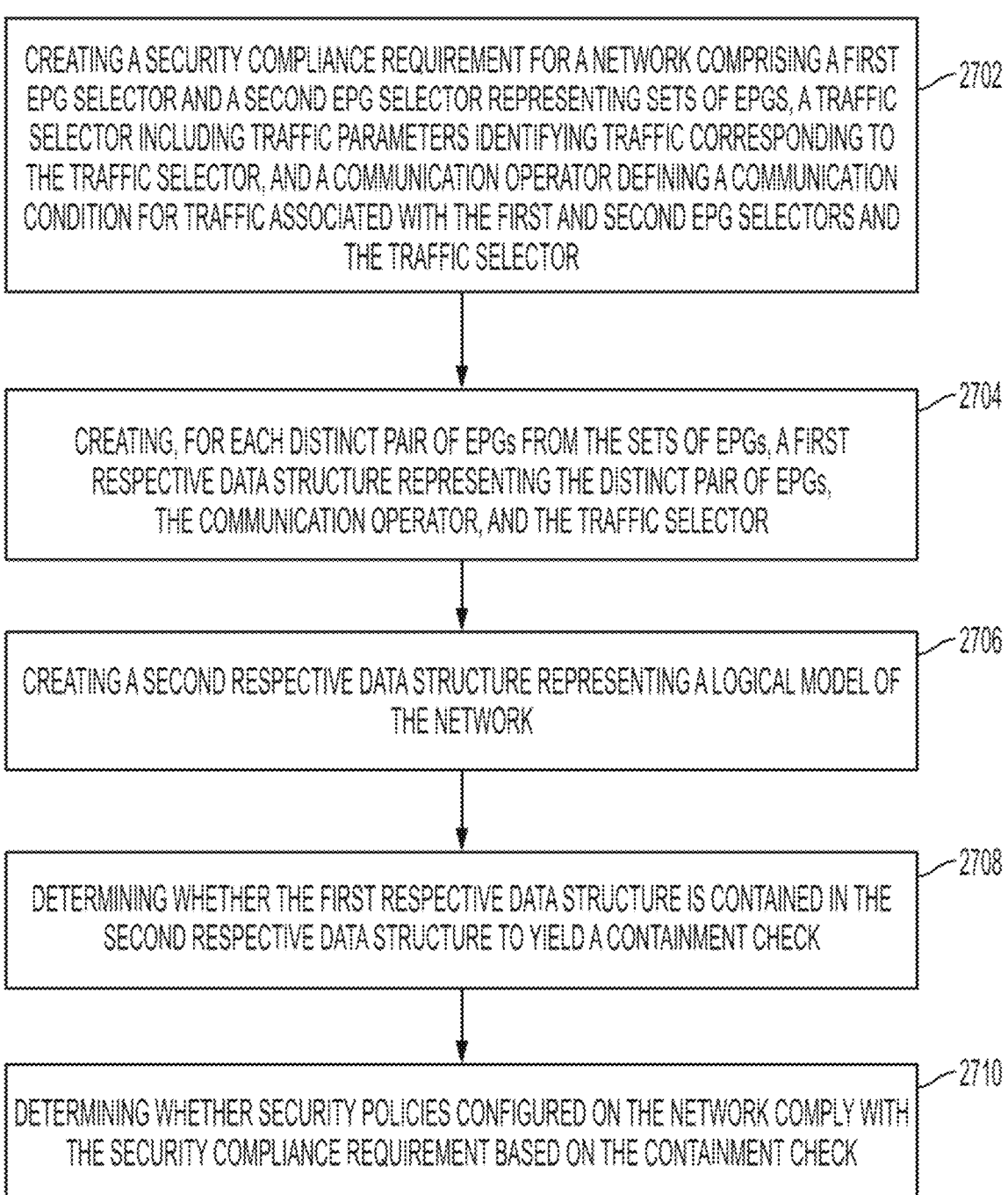

CREATING A SECURITY COMPLIANCE REQUIREMENT FOR A NETWORK COMPRISING A FIRST EPG SELECTOR AND A SECOND EPG SELECTOR REPRESENTING SETS OF EPGS, A TRAFFIC SELECTOR INCLUDING TRAFFIC PARAMETERS IDENTIFYING TRAFFIC CORRESPONDING TO THE TRAFFIC SELECTOR, AND A COMMUNICATION OPERATOR DEFINING A COMMUNICATION CONDITION FOR TRAFFIC ASSOCIATED WITH THE FIRST AND SECOND EPG SELECTORS AND THE TRAFFIC SELECTOR — 2702

CREATING, FOR EACH DISTINCT PAIR OF EPGs FROM THE SETS OF EPGs, A FIRST RESPECTIVE DATA STRUCTURE REPRESENTING THE DISTINCT PAIR OF EPGs, THE COMMUNICATION OPERATOR, AND THE TRAFFIC SELECTOR — 2704

CREATING A SECOND RESPECTIVE DATA STRUCTURE REPRESENTING A LOGICAL MODEL OF THE NETWORK — 2706

DETERMINING WHETHER THE FIRST RESPECTIVE DATA STRUCTURE IS CONTAINED IN THE SECOND RESPECTIVE DATA STRUCTURE TO YIELD A CONTAINMENT CHECK — 2708

DETERMINING WHETHER SECURITY POLICIES CONFIGURED ON THE NETWORK COMPLY WITH THE SECURITY COMPLIANCE REQUIREMENT BASED ON THE CONTAINMENT CHECK — 2710

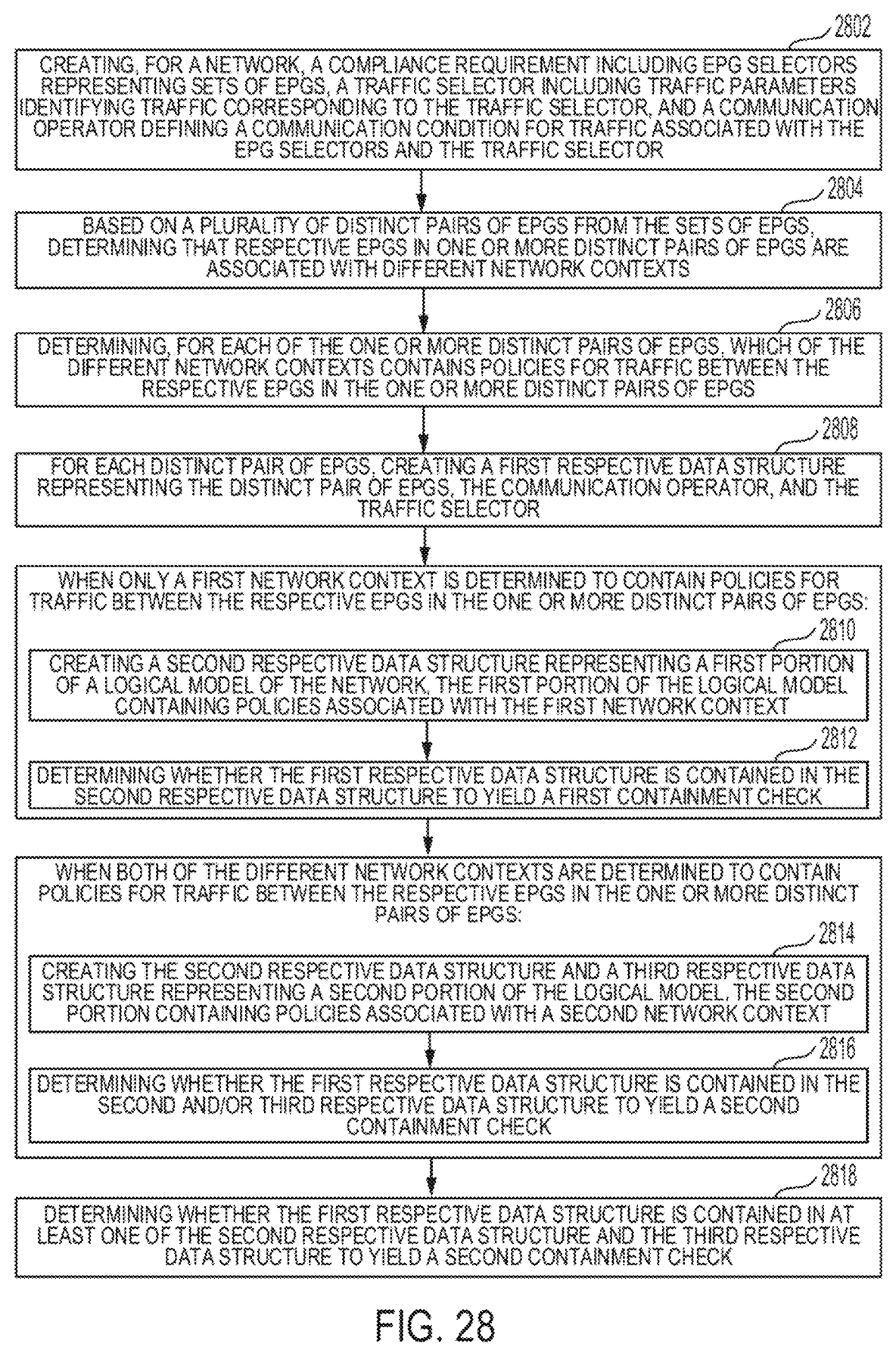

CREATING, FOR A NETWORK, A COMPLIANCE REQUIREMENT INCLUDING EPG SELECTORS REPRESENTING SETS OF EPGS, A TRAFFIC SELECTOR INCLUDING TRAFFIC PARAMETERS IDENTIFYING TRAFFIC CORRESPONDING TO THE TRAFFIC SELECTOR, AND A COMMUNICATION OPERATOR DEFINING A COMMUNICATION CONDITION FOR TRAFFIC ASSOCIATED WITH THE EPG SELECTORS AND THE TRAFFIC SELECTOR

2804

BASED ON A PLURALITY OF DISTINCT PAIRS OF EPGS FROM THE SETS OF EPGS, DETERMINING THAT RESPECTIVE EPGS IN ONE OR MORE DISTINCT PAIRS OF EPGS ARE ASSOCIATED WITH DIFFERENT NETWORK CONTEXTS

2806

DETERMINING, FOR EACH OF THE ONE OR MORE DISTINCT PAIRS OF EPGS, WHICH OF THE DIFFERENT NETWORK CONTEXTS CONTAINS POLICIES FOR TRAFFIC BETWEEN THE RESPECTIVE EPGS IN THE ONE OR MORE DISTINCT PAIRS OF EPGS

2808

FOR EACH DISTINCT PAIR OF EPGS, CREATING A FIRST RESPECTIVE DATA STRUCTURE REPRESENTING THE DISTINCT PAIR OF EPGS, THE COMMUNICATION OPERATOR, AND THE TRAFFIC SELECTOR

WHEN ONLY A FIRST NETWORK CONTEXT IS DETERMINED TO CONTAIN POLICIES FOR TRAFFIC BETWEEN THE RESPECTIVE EPGS IN THE ONE OR MORE DISTINCT PAIRS OF EPGS:

2810

CREATING A SECOND RESPECTIVE DATA STRUCTURE REPRESENTING A FIRST PORTION OF A LOGICAL MODEL OF THE NETWORK, THE FIRST PORTION OF THE LOGICAL MODEL CONTAINING POLICIES ASSOCIATED WITH THE FIRST NETWORK CONTEXT

2812

DETERMINING WHETHER THE FIRST RESPECTIVE DATA STRUCTURE IS CONTAINED IN THE SECOND RESPECTIVE DATA STRUCTURE TO YIELD A FIRST CONTAINMENT CHECK

WHEN BOTH OF THE DIFFERENT NETWORK CONTEXTS ARE DETERMINED TO CONTAIN POLICIES FOR TRAFFIC BETWEEN THE RESPECTIVE EPGS IN THE ONE OR MORE DISTINCT PAIRS OF EPGS:

2814

CREATING THE SECOND RESPECTIVE DATA STRUCTURE AND A THIRD RESPECTIVE DATA STRUCTURE REPRESENTING A SECOND PORTION OF THE LOGICAL MODEL, THE SECOND PORTION CONTAINING POLICIES ASSOCIATED WITH A SECOND NETWORK CONTEXT

2816

DETERMINING WHETHER THE FIRST RESPECTIVE DATA STRUCTURE IS CONTAINED IN THE SECOND AND/OR THIRD RESPECTIVE DATA STRUCTURE TO YIELD A SECOND CONTAINMENT CHECK

2818

DETERMINING WHETHER THE FIRST RESPECTIVE DATA STRUCTURE IS CONTAINED IN AT LEAST ONE OF THE SECOND RESPECTIVE DATA STRUCTURE AND THE THIRD RESPECTIVE DATA STRUCTURE TO YIELD A SECOND CONTAINMENT CHECK

FIG. 28

ASSURANCE OF SECURITY RULES IN A NETWORK

CROSS-REFERENCE TO RELATED APPLICATIONS

This application is a continuation of U.S. Non-Provisional patent application Ser. No. 17/157,957, filed Jan. 25, 2021, entitled "ASSURANCE OF SECURITY RULES IN A NET-WORK", which is a continuation of Ser. No. 16/217,607, filed Dec. 12, 2018, entitled "ASSURANCE OF SECU-RITY RULES IN A NETWORK", which has issued as U.S. Pat. No. 10,911,495 on Feb. 2, 2021, which claims the benefit of U.S. Provisional Patent Application No. 62/690, 454, filed Jun. 27, 2018, entitled "ASSURANCE OF SECU-RITY RULES IN A NETWORK", the full disclosures of which are incorporated herein by reference in their entire-ties.

TECHNICAL FIELD

The present technology pertains to assurance of security rules in a network.

BACKGROUND

Computer networks are becoming increasingly complex, often involving low level and high level configurations at various layers of the network. For example, computer net-works generally include numerous security, routing, and service policies, which together define the behavior and operation of the network. Network operators have a wide array of configuration options for tailoring the network to the needs of users. While the different configuration options provide network operators significant flexibility and control over the network, they also add complexity to the network. In addition, network operators often add, delete, and edit policies throughout the life of the network. Given the high complexity of networks and the vast number of policies and policy changes typically implemented in a network, it can be extremely difficult to keep track of the policies in the network, avoid conflicts between policies in the network, and ensure that the policies in the network comply with the intended behavior and operation of the network.

BRIEF DESCRIPTION OF THE DRAWINGS

In order to describe the manner in which the above-recited and other advantages and features of the disclosure can be obtained, a more particular description of the principles described above will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which:

FIG. 26 illustrates an example method for creating and verifying security compliance requirements;

FIG. 27 illustrates an example method for creating a security compliance requirement and checking a compliance of policies associated with objects on a same network context;

FIG. 28 illustrates an example method for creating a security compliance requirement and checking a compliance of policies associated with objects on different network contexts;

DETAILED DESCRIPTION

Figure 1A:
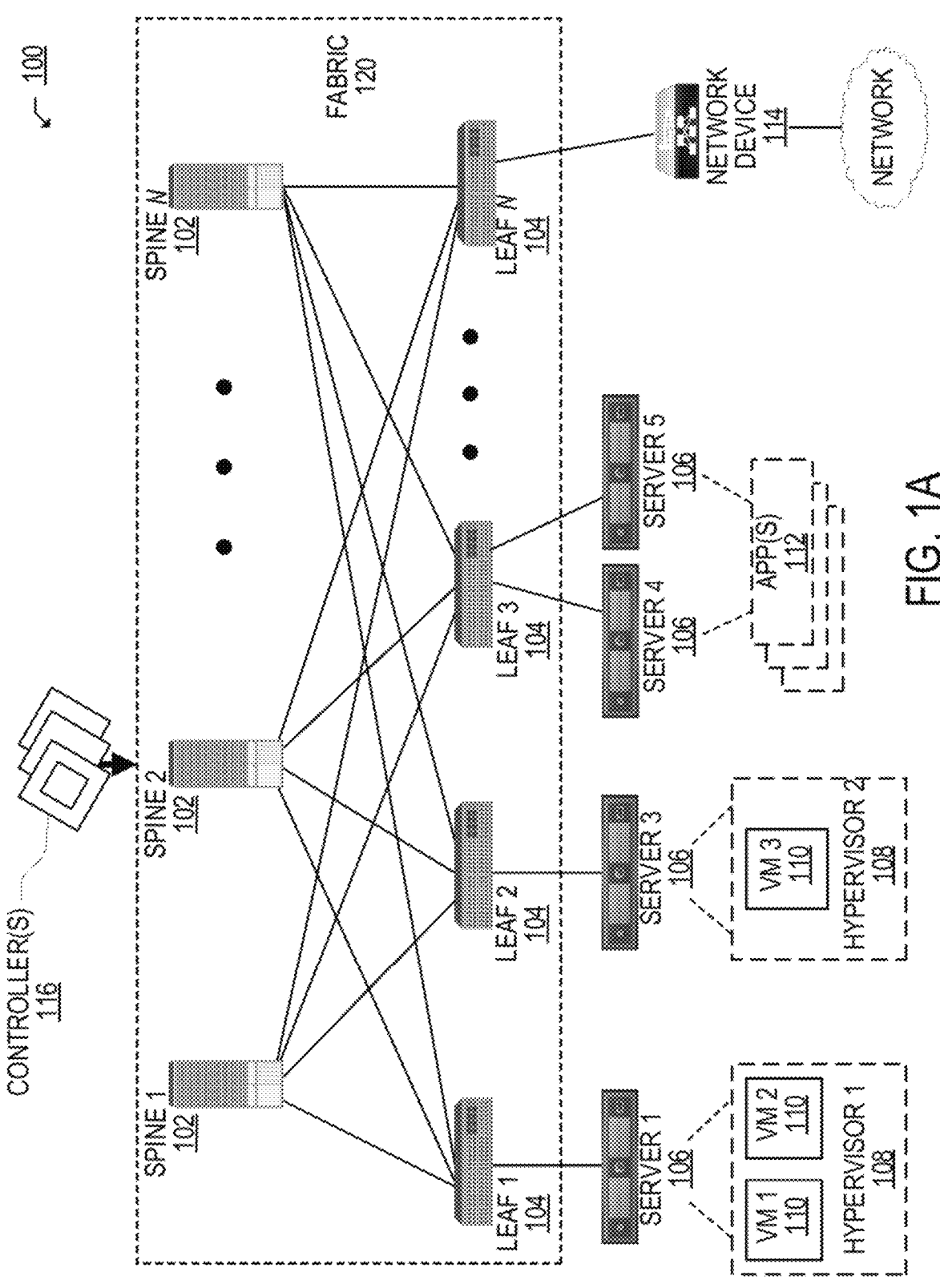
FIGS. 1A and 1B illustrate example network environ-ments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Software-defined networks (SDNs) and data centers, such as application-centric infrastructure (ACI) networks, can be managed from one or more centralized elements, such as application policy infrastructure controllers (APICs) in an ACI network or network managers in other SDN networks. A network operator can define various configurations, objects, rules, etc., for the network, which can be implemented by the one or more centralized elements. The configurations provided by the network operator can reflect the network operator's intent for the network, meaning, how the network operator intends for the network and its components to operate. Such user intents can be programmatically encapsulated in network models stored at the centralized elements. The models can represent the user intents and reflect the configuration of the network. For example, the models can represent the object and policy universe (e.g., endpoints, tenants, endpoint groups, contexts, application profiles, policies, etc.) as defined for the particular network by the user intents and/or centralized elements.

In many cases, various nodes and/or controllers in a network may contain respective information or representations of the network and network state. For example, different controllers may store different logical models of the network and each node in a fabric of the network may contain its own model for the network. The approaches set forth herein provide assurance of contracts or policies in the network. A network operator can specify a compliance requirement and check that it is accurately enforced across the network and does not conflict with other rules in the network. For example, a network operator can specify a security rule that indicates which endpoint groups (EPGs) a particular EPG should or should not be able to communicate with, and how such communications can be conducted (if allowed). A network assurance appliance can retrieve and analyze one or more logical, concrete, and/or hardware models of the network to determine whether the specified security rule(s) are violated, satisfied, applied, etc. The network assurance appliance can generate events indicating whether the specified security rule(s) are violated, satisfied, applied, etc., and how the security rule(s) are violated or unenforced if such is the case.

Disclosed herein are systems, methods, and computer-readable media for assurance of security rules in a network, including rules associated with different network contexts (e.g., virtual routing and forwarding instances, private networks, network address domains, etc.). In some examples, a system or method can create a security compliance requirement for a network, including a first endpoint group (EPG) selector, a second EPG selector, a traffic selector, and a communication operator. The first and second EPG selectors can represent sets of EPGs. The traffic selector can include traffic parameters identifying traffic corresponding to the traffic selector, and the communication operator can define a communication condition for traffic associated with the first and second EPG selectors and the traffic selector.

The system or method can determine, based on a plurality of distinct pairs of EPGs from the sets of EPGs, that respective EPGs in one or more distinct pairs of EPGs are associated with different network contexts in the network. Each of the plurality of distinct pairs of EPGs can include a respective EPG from the first EPG selector and the second EPG selector. The system or method can, for each of the one or more distinct pairs of EPGs, determine, which network context from the different network contexts contains policies for traffic between the respective EPGs in the one or more distinct pairs of EPGs, and create a first respective data structure representing the distinct pair of EPGs, the communication operator, and the traffic selector.

The system or method can also create a second respective data structure representing a portion of a logical model of the network corresponding to the network context that contains policies for traffic between the respective EPGs in the one or more distinct pairs of EPGs, determine whether the first respective data structure is contained in the second respective data structure to yield a containment check, and determine whether policies for traffic between respective EPGs in the one or more distinct pairs of EPGs comply (e.g., satisfy, violate, apply) with the security compliance requirement based on the containment check.

In some aspects, the first respective data structure and second respective data structure can include binary decision diagrams (BDDs), reduced ordered binary decision diagrams (ROBDDs), or n-bit vectors, and the different network contexts can include virtual routing and forwarding (VRF) instances, private networks, network domains, and the like.

In some aspects, the determination of which network context contains policies for traffic between the respective EPGs in the one or more distinct pairs of EPGs can be based on an indication of an identity of each of the respective EPGs and/or a role of each of the respective EPGs. The role can include a consumer role or a provider role, and the indication of the identity or the role can be based on a tag, a label, an identifier, or the like. In some cases, the indication of the identity or role is based on a tag, and determining which network context contains policies for traffic between respective EPGs in the one or more distinct pairs of EPGs is based on a value associated with the tag and/or a type of tag. The type of tag can include a global or local tag, and the value associated with the tag can indicate the role or a scope of the tag. The scope can include a global or local scope depending on the value associated with the tag.

Example Embodiments

Figure 1B:
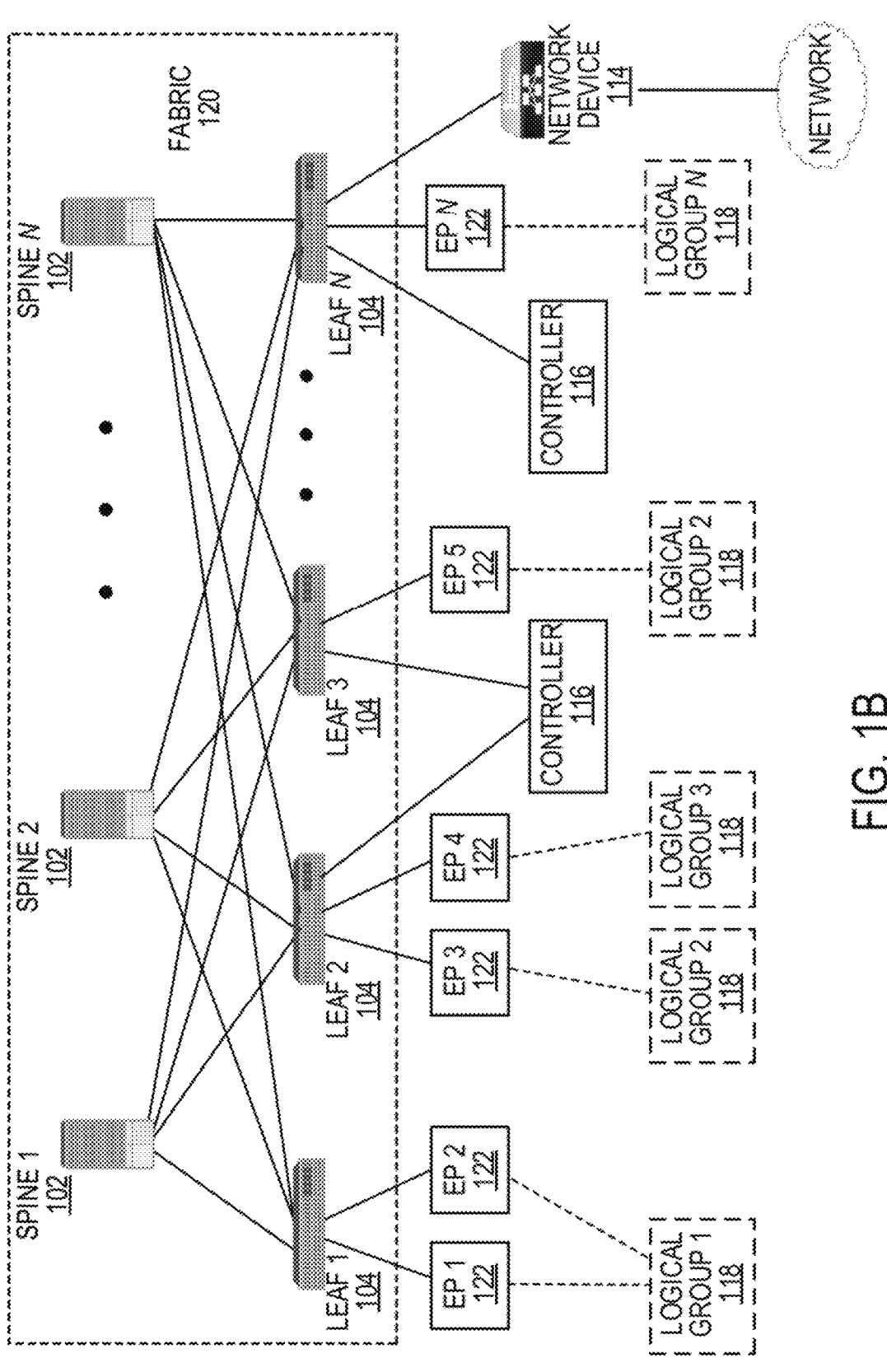
Figure 29:
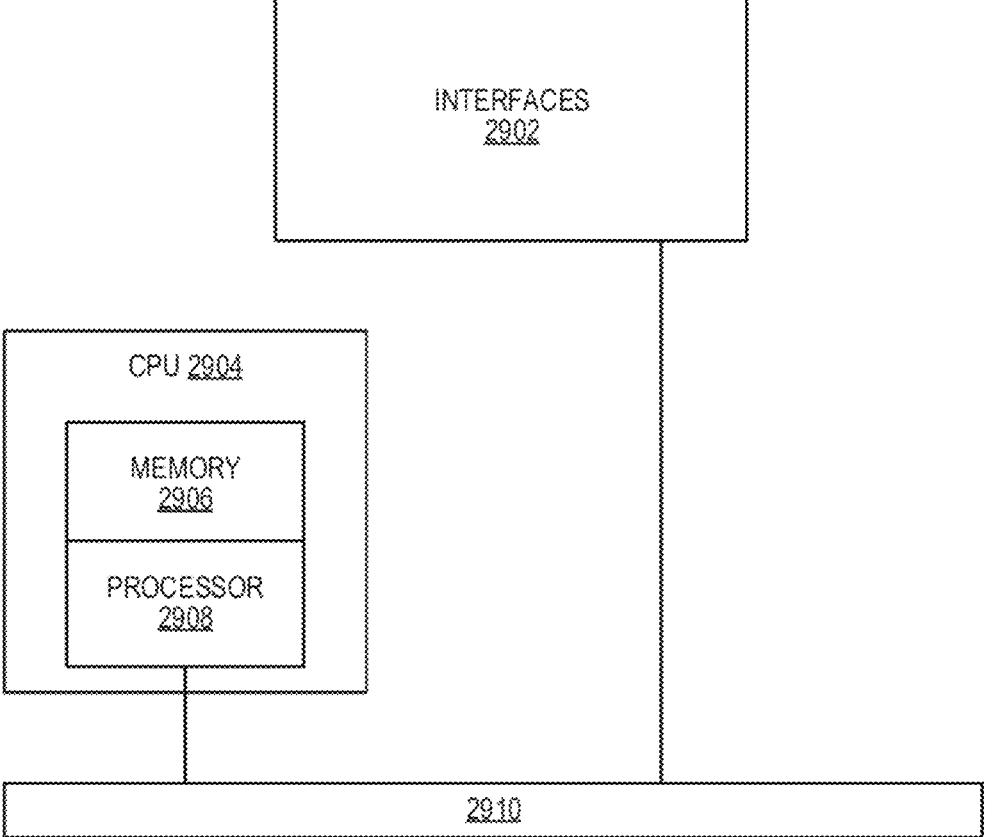
FIG. 29 illustrates an example network device.
Figure 30:
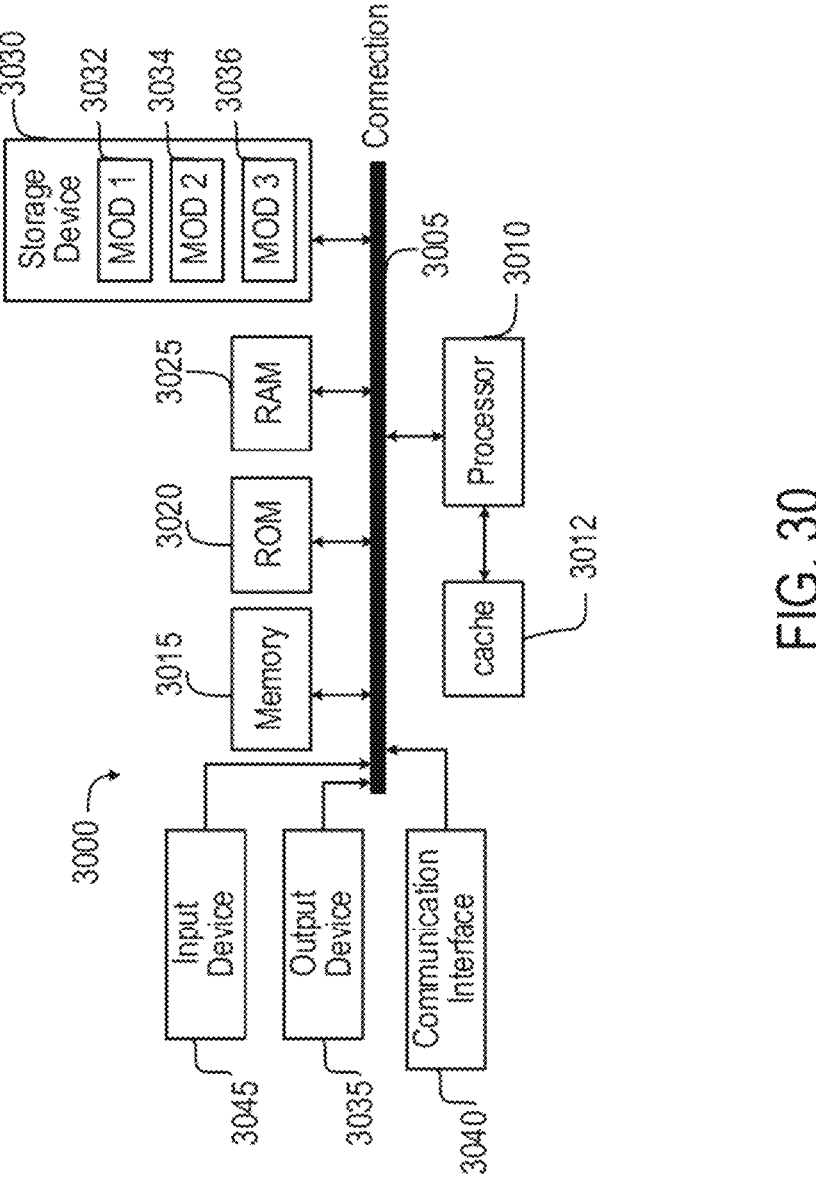
FIG. 30 illustrates an example computing system architecture.

The present technology involves system, methods, and computer-readable media for assurance of security rules in a network, including rules associated with different network contexts. The present technology will be described in the following disclosure as follows. The discussion begins with a discussion of network and compliance assurance, and a description of example computing environments, as shown in FIGS. 1A and 1B. A discussion of network models for network assurance, as shown in FIGS. 2A through 2D, and network modeling and assurance systems, as shown in FIGS. 3A-B, 4, 5A-C, 6A-C, and 7 will then follow. The discussion proceeds with a description of example security compliance requirements as well as methods and techniques for creating and checking security compliance requirements, as shown in FIGS. 8 through 28. The discussion concludes with a description of example network and computing devices, as shown in FIGS. 29 and 30, including example hardware components suitable for hosting software and performing computing operations. The disclosure now turns to a discussion of network and compliance assurance.

Network assurance is the guarantee or determination that the network is behaving as intended by the network operator and has been configured properly (e.g., the network is doing what it is intended to do). Intent can encompass various network operations, such as bridging, routing, security, service chaining, endpoints, compliance, QoS (Quality of Service), audits, etc. Intent can be embodied in one or more policies, configurations, etc., defined for the network and individual network elements (e.g., switches, routers, applications, resources, etc.). In some cases, the configurations, policies, etc., defined by a network operator may not be accurately reflected in the actual behavior of the network. For example, a network operator specifies configuration A for a type of traffic but later finds that the network is actually applying configuration B to that traffic or otherwise processing that traffic in a manner that is inconsistent with configuration A. This can be a result of many different causes, such as hardware errors, software bugs, varying priorities, configuration conflicts, misconfigured settings, improper rule rendering by devices, upgrades, configuration changes, failures, etc. As another example, a network operator defines configuration C for the network, but one or more configurations in the network cause the network to behave in a manner that is inconsistent with the intent reflected by configuration C.

The approaches herein can provide network compliance assurance by modeling various aspects of the network, performing consistency, compliance, and/or other network assurance checks. The network assurance approaches herein can be implemented in various types of networks, including private networks, such as local area networks (LANs); enterprise networks; standalone or traditional networks, such as data center networks; networks including a physical or underlay layer and a logical or overlay layer, such as a VXLAN or SDN network (e.g., Application Centric Infrastructure (ACI) or VMware NSX networks); etc.

Network models can be constructed for a network and implemented for network assurance. A network model can provide a representation of one or more aspects of a network, including, without limitation the network's policies, configurations, requirements, security, routing, topology, applications, hardware, filters, contracts, access control lists, infrastructure, etc. For example, a network model can provide a mathematical representation of configurations in the network. As will be further explained below, different types of models can be generated for a network.

Such models can be implemented to ensure that the behavior of the network will be consistent (or is consistent) with the intended behavior reflected through specific configurations (e.g., policies, settings, definitions, etc.) implemented by the network operator. Unlike traditional network monitoring, which involves sending and analyzing data packets and observing network behavior, network assurance can be performed through modeling without necessarily ingesting packet data or monitoring traffic or network behavior. This can result in foresight, insight, and hindsight: problems can be prevented before they occur, identified when they occur, and fixed immediately after they occur.

Thus, network assurance can involve modeling properties of the network to deterministically predict the behavior of the network. The network can be determined to be healthy if the model(s) indicate proper behavior (e.g., no inconsistencies, conflicts, errors, etc.). The network can be determined to be functional, but not fully healthy, if the modeling indicates proper behavior but some inconsistencies. The network can be determined to be non-functional and not healthy if the modeling indicates improper behavior and errors. If inconsistencies or errors are detected by the modeling, a detailed analysis of the corresponding model(s) can allow one or more underlying or root problems to be identified with great accuracy.

The approaches herein also enable a network administrator or operator to specify a compliance requirement(s) and check that the specified compliance requirement(s) is being enforced across the network and is not otherwise being violated or contradicted by other rules or policies in the network. For example, a network administrator can specify a security rule that indicates which EPGs a specific EPG should or should not be able or allowed to communicate with, and how the specific EPG should communicate with those EPGs it should be able or allowed to communicate with. A network assurance appliance can retrieve and analyze a logical, concrete, and/or hardware models of the network to determine whether or not the specified security rule(s) are being violated, satisfied, applied, etc., based on a comparison of the specified security rule(s) and the network model(s) (e.g., the logical, concrete, and/or hardware models). The network assurance appliance can generate events indicating whether or not the specified security rule(s) complies with the network models and is being violated, satisfied, applied, etc., in the network. The network administrator or operator can specify (e.g., via a user interface) one or more security or policy requirements (e.g., rules, conditions, nodes, etc.) that should or should not be satisfied, applied, violated, etc., in the network, and quickly receive compliance results indicating whether such security or policy requirements are being applied, violated, satisfied, etc.

Defining a Security Requirement

A network administrator can define a security requirement that includes, for example, a requirement name, a requirement description, a requirement type, a first EPG set, a communication operator, a second EPG set, and a traffic selector or communication filter. The compliance assurance system can then check or verify whether the security requirement and associated parameters are being violated, enforced, applied, satisfied, etc., in the network.

To define an EPG set, the network administrator can specify one or more EPGs, tenants, domain names, VRFs (virtual routing and forwarding instances), application profiles, bridge domains, EPG tags/categories, or other container/grouping of EPGs or other parameters. The network administrator can explicitly include or exclude certain EPGs. Because the EPGs in certain groupings (e.g., Application Profiles, VRFs, etc.) may be dynamic and change from epoch to epoch, the assurance appliance may identify the EPGs in the EPG set in each epoch being assured.

The communication operator can include, for example, conditions such as must not talk to, must talk to, may talk to, etc. A must talk to condition can mean that one must be able to talk to on all specified ports, while may talk to condition can mean that one may be able to talk on one or more of the specified ports.

The traffic selector or communication filter can include, for example, an Ethernet protocol or EtherType for communication (e.g., IPv6, IPv4, MPLS Unicast, ARP, MAC security, etc.); an IP protocol (e.g., ICMP, IGMP, IGP, TCP, UDP, etc.); a TCP session state; one or more ports for communication; a number of steps/hops within the network for indirect communications (e.g., less that 5 hops, more than 1 hop, etc.), which may be used to check that communications are routed through a middle box such as a firewall; hops from one EPG to another EPG; etc.

For example, a network administrator can create a security requirement named "Security Requirement 1", and define it as "EPG Set 1 must talk to EPG Set 2 on TCP ports 80-100." Here, the security requirement includes a name, an indication of which EPG sets are associated with the security requirement, a condition or communication operator indicating that one EPG set must talk to another EPG set, and the specific protocol and ports for such communications.

Once the assurance appliance receives the security rule, the assurance appliance can retrieve the configuration data from the network (e.g., via a network controller such as an APIC). The configuration data may include, for example, contracts, settings, hardware (e.g., ternary content-addressable memory) rules, etc. In some cases, the configuration data may also include forwarding plane configuration data such as, for example, FIB (forwarding information base) entries on one or more network devices (e.g., one or more leaf switches), subnet configurations for one or more bridge domains (BDs) and/or EPGs on a network controller such as an APIC, etc. The assurance appliance may check that the configuration data complies with the security rule. Based on the check, the assurance appliance may generate events that specify whether the configurations in the network violate, satisfy, apply, etc., the security rule. In some cases, the events may be generated on a per-EPG basis. For example, for the "Security Requirement 1" example above, if EPG Set 1 contained 3 EPGs and EPG Set 2 contained 5 EPGs, the assurance appliance may generate 15 events specifying whether the communications from each EPG in EPG Set 1 to each EPG in EPG Set 2 satisfy or violate the Security Requirement 1.

In order to check compliance with the security rule, the assurance appliance may retrieve (e.g., via a network controller such as an APIC) one or more network models for the network, such as a logical, concrete, and/or hardware model, as further explained below, to check if the security rule complies with the rules or policies in the one or more network models. In some implementations, hardware rules, such as TCAM rules, in fabric nodes such as leaf nodes can also be checked for compliance with the security rule. Depending on which policy definition or implementation level (e.g., the logical model, the concrete model, the TCAM/hardware model, etc.) is checked, different events and/or types of events may be generated.

In some examples, a network administrator may also specify a requirement set that includes one or more security requirements. For example, Requirement Set 1 may include security requirements Security Requirement 1, Security Requirement 5, and Security Requirement 7. The network administrator may also specify which network fabrics the requirement set should be applied to. For example, the network administrator may specify that the Requirement Set 1 should be applied to Fabric 1 and Fabric 3.

Checking Compliance with the Security Requirement

The process for checking compliance with one or more security requirements can include obtaining a network model, such as a logical model identifying contracts, VRFs, EPGs, etc., specified in the network. The process can involve checking EPG-EPG pairs in EPG sets. A modeling library can be implemented to perform the actual checks. Each contract, taboo, VRF mode, EPG mode, etc., can be inspected and used to construct a BDD (Binary Decision Diagram) or ROBDD (Reduced Ordered Binary Decision Diagram), which is used to check compliance with the security requirement, as further described herein. The various contracts in the network model(s) can be converted into a flat list of rules. BDDs or ROBDDs can be used to represent each rule/action in a contract as a Boolean function, which can then be used to perform compliance checks between the rules/actions.

Below are example compliance cases:

Example 1—EPG1 and EPG2 are in the Same VRF

The system constructs two ROBDDs for that VRF, including an ROBDD representing traffic that is permitted in the VRF (VRF_permit_ROBDD) and an ROBDD representing traffic that is denied in the VRF (VRF_deny_ROBDD), and an ROBDD for the security requirement (Sec_ROBDD). The system then checks whether the Sec_ROBDD is contained in the VRF_deny_ROBDD or the VRF_permit_ROBDD. For example, in some cases, if the security requirement specifies a deny requirement, the system can check whether the Sec_ROBDD is contained in the VRF_deny_ROBDD, and if the security requirement specifies a permit requirement, the system can check whether the Sec_ROBDD is contained in the VRF_permit_ROBDD.

Based on this containment check, the system can determine whether the security requirement is satisfied and which contracts satisfy or do not satisfy the security requirement. To illustrate, assume a security requirement specifies that "EPG1 must not talk to EPG2". The system can check whether the Sec_ROBDD for the security requirement specifying that "EPG1 must not talk to EPG2" is contained in the VRF_deny_ROBDD associated with the VRF to determine if the security requirement is satisfied or violated. Assume instead that the security requirement specifies that "EPG1 must talk to EPG2". Here, the system can check whether the Sec_ROBDD for the security requirement specifying that "EPG1 must talk to EPG2" is contained in the VRF_permit_ROBDD associated with the VRF to determine if the security requirement is satisfied or violated.

This example case can have several sub-use cases, such as (1) Enforced VRF mode or Unenforced VRF mode; (2) Enforced EPG mode or Unenforced EPG mode; Taboo contract versus Permit contract; etc.

Example 2—EPG1 and EPG2 are in Separate VRFs

The system determines that EPG1 and EPG2 are in different VRFs. The system then determines which VRF contains the rules for traffic between EPG1 and EPG2.

Suppose that EPG1 is a consumer EPG in VRF1, EPG2 is a provider EPG in VRF2, and the system determines that the rules for traffic between EPG1 and EPG2 are in VRF1. Here, the system constructs an ROBDD for VRF1 (VRF1_ROBDD) and an ROBDD for the Security Requirement (Sec_ROBDD). The system then checks that Sec_ROBDD is contained in VRF1_ROBDD. Based on this containment check, the system can determine whether the security requirement is satisfied and which contracts satisfy or violate the security requirement.

Reporting Compliance

Based on the compliance check, the assurance appliance may generate an interface that shows the EPG pairs for a security rule and whether each EPG pair is in compliance or non-compliance with the security rule. This compliance check and reporting system provides significant advantages.

When designing a network fabric, a network administrator may know or understand how communications in the network fabric should be configured, how or which communications should be restricted, how the network should behave, etc. However, during operation of the network, this information may become unclear, forgotten, obsolete, incorrect, or improper, particularly as the complexity of the network grows, the network changes or evolves, and network policies are added or removed. It can be indeed very difficult to keep track of the rules, behavior, state, and requirements of the network. As a result, it can be very difficult to ensure that network configurations are respected (e.g., are enforced, satisfied, not violated, etc.) and there are few safeguards that protect the configurations or restrictions in the network.

The subject technology allows for the configuration of the network to be specified as invariants for the network. These invariants may be specified in one or more security rules/requirements, for example. The subject technology allows for such invariants to be tested or checked to determine whether such invariants are being enforced, satisfied, violated, etc., in view of the current state of the network (e.g., the current network configuration and policies). Thus, the network administrator or operator can simply define a specific rule or requirement that should be enforced or satisfied in the network and run a check to determine whether such rule or requirement is indeed being enforced or satisfied by the network. This allows the network administrator or operator to ensure that the network continues to behave as it should and identify any conflicting, obsolete, or improper rules or policies that may be causing the network to behave otherwise, even as the complexity of the network grows, old policies are removed or forgotten, new policies are implemented, or other changes take place in the network over time.

Having described various aspects of network and compliance assurance, the disclosure now turns to a discussion of example network environments for network and compliance assurance.

FIG. 1A illustrates a diagram of an example Network Environment 100, such as a data center. The Network Environment 100 can include a Fabric 120 which can represent the physical layer or infrastructure (e.g., underlay) of the Network Environment 100. Fabric 120 can include Spines 102 (e.g., spine routers or switches) and Leafs 104 (e.g., leaf routers or switches) which can be interconnected for routing or switching traffic in the Fabric 120. Spines 102 can interconnect Leafs 104 in the Fabric 120, and Leafs 104 can connect the Fabric 120 to an overlay or logical portion of the Network Environment 100, which can include application services, servers, virtual machines, containers, endpoints, etc. Thus, network connectivity in the Fabric 120 can flow from Spines 102 to Leafs 104, and vice versa. The interconnections between Leafs 104 and Spines 102 can be redundant (e.g., multiple interconnections) to avoid a failure in routing. In some examples, Leafs 104 and Spines 102 can be fully connected, such that any given Leaf is connected to each of the Spines 102, and any given Spine is connected to each of the Leafs 104. Leafs 104 can be, for example, top-of-rack ("ToR") switches, aggregation switches, gateways, ingress and/or egress switches, provider edge devices, and/or any other type of routing or switching device.

Leafs 104 can be responsible for routing and/or bridging tenant or customer packets and applying network policies or rules. Network policies and rules can be driven by one or more Controllers 116, and/or implemented or enforced by one or more devices, such as Leafs 104. Leafs 104 can connect other elements to the Fabric 120. For example, Leafs 104 can connect Servers 106, Hypervisors 108, Virtual Machines (VMs) 110, Applications 112, Network Device 114, etc., with Fabric 120. Such elements can reside in one or more logical or virtual layers or networks, such as an overlay network. In some cases, Leafs 104 can encapsulate and decapsulate packets to and from such elements (e.g., Servers 106) in order to enable communications throughout Network Environment 100 and Fabric 120. Leafs 104 can also provide any other devices, services, tenants, or workloads with access to Fabric 120. In some cases, Servers 106 connected to Leafs 104 can similarly encapsulate and decapsulate packets to and from Leafs 104. For example, Servers 106 can include one or more virtual switches or routers or tunnel endpoints for tunneling packets between an overlay or logical layer hosted by, or connected to, Servers 106 and an underlay layer represented by Fabric 120 and accessed via Leafs 104.

Applications 112 can include software applications, services, containers, appliances, functions, service chains, etc. For example, Applications 112 can include a firewall, a database, a CDN server, an IDS/IPS, a deep packet inspection service, a message router, a virtual switch, etc. An application from Applications 112 can be distributed, chained, or hosted by multiple endpoints (e.g., Servers 106, VMs 110, etc.), or may run or execute entirely from a single endpoint.

VMs 110 can be virtual machines hosted by Hypervisors 108 or virtual machine managers running on Servers 106. VMs 110 can include workloads running on a guest operating system on a respective server. Hypervisors 108 can provide a layer of software, firmware, and/or hardware that creates, manages, and/or runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can host one or more VMs 110.

In some cases, VMs 110 and/or Hypervisors 108 can be migrated to other Servers 106. Servers 106 can similarly be migrated to other locations in Network Environment 100. For example, a server connected to a leaf can be changed to connect to a different or additional leaf. Such configuration or deployment changes can involve modifications to settings, configurations and policies that are applied to the resources being migrated as well as other network components.

In some cases, one or more Servers 106, Hypervisors 108, and/or VMs 110 can represent or reside in a tenant space. Tenant space can include workloads, services, applications, devices, networks, and/or resources associated with one or more clients or subscribers. Accordingly, traffic in Network Environment 100 can be routed based on specific tenant policies, agreements, configurations, etc. Moreover, addressing can vary between tenants. In some configurations, tenant spaces can be divided into logical segments and/or networks and separated from logical segments and/or networks associated with other tenants. Addressing, policy, security and configuration information between tenants can be managed by Controllers 116, Servers 106, Leafs 104, etc.

Configurations in Network Environment 100 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 116, which can implement or propagate such configurations through Network Environment 100. In some examples, Controllers 116 can be Application Policy Infrastructure Controllers (APICs) in an ACI framework. In other examples, Controllers 116 can be one or more management components for associated with other SDN solutions, such as NSX Managers.

Such configurations can define rules, policies, priorities, protocols, attributes, objects, etc., for routing and/or classifying traffic in Network Environment 100. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 100, such as Leafs 104, Servers 106, Hypervisors 108, Controllers 116, etc. As previously explained, Network Environment 100 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 100. Endpoints can have one or more attributes such as a VM name, guest OS name, a security tag, application profile, etc. Application configurations can be applied between EPGs, instead of endpoints directly, in the form of contracts. Leafs 104 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 104 can tie packets with their attribute EPGs based on their identifiers and enforce policies, which can be implemented and/or managed by one or more Controllers 116. Leaf 104 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning to FIG. 1A, Network Environment 100 can deploy different hosts via Leafs 104, Servers 106, Hypervisors 108, VMs 110, Applications 112, and Controllers 116, such as VMWARE ESXi hosts, WINDOWS HYPER-V hosts, bare metal physical hosts, etc. Network Environment 100 may interoperate with a variety of Hypervisors 108, Servers 106 (e.g., physical and/or virtual servers), orchestration platforms, etc. Network Environment 100 may implement a declarative model to allow its integration with application design and holistic network policy.

Controllers 116 can provide centralized access to fabric information, application configuration, resource configuration, application-level configuration modeling for a software-defined network (SDN) infrastructure, integration with management systems or servers, etc. Controllers 116 can form a control plane that interfaces with an application plane via northbound APIs and a data plane via southbound APIs.

As previously noted, Controllers 116 can define and manage application-level model(s) for configurations in Network Environment 100. In some cases, application or device configurations can also be managed and/or defined by other components. For example, a hypervisor or virtual appliance, such as a VM or container, can run a server or management tool to manage software and services in Network Environment 100, including configurations and settings for virtual appliances.

As illustrated above, Network Environment 100 can include one or more different types of SDN solutions, hosts, etc. For the sake of clarity and explanation purposes, various examples in the disclosure will be described with reference to an ACI framework, and Controllers 116 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 106 (e.g., physical or logical), Hypervisors 108, VMs 110, containers (e.g., Applications 112), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

FIG. 1B illustrates another example of Network Environment 100. In this example, Network Environment 100 includes Endpoints 122 connected to Leafs 104 in Fabric 120. Endpoints 122 can be physical and/or logical or virtual entities, such as servers, clients, VMs, hypervisors, software containers, applications, resources, network devices, workloads, etc. For example, an Endpoint 122 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 122 can be associated with respective Logical Groups 118. Logical Groups 118 can be logical entities containing endpoints (physical and/or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 118 are EPGs in an ACI environment and/or other logical groups (e.g., SGs) in another SDN environment.

Traffic to and/or from Endpoints 122 can be classified, processed, managed, etc., based Logical Groups 118. For example, Logical Groups 118 can be used to classify traffic to or from Endpoints 122, apply policies to traffic to or from Endpoints 122, define relationships between Endpoints 122, define roles of Endpoints 122 (e.g., whether an endpoint consumes or provides a service, etc.), apply rules to traffic to or from Endpoints 122, apply filters or access control lists (ACLs) to traffic to or from Endpoints 122, define communication paths for traffic to or from Endpoints 122, enforce requirements associated with Endpoints 122, implement security and other configurations associated with Endpoints 122, etc.

In an ACI environment, Logical Groups 118 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

Figure 2A:
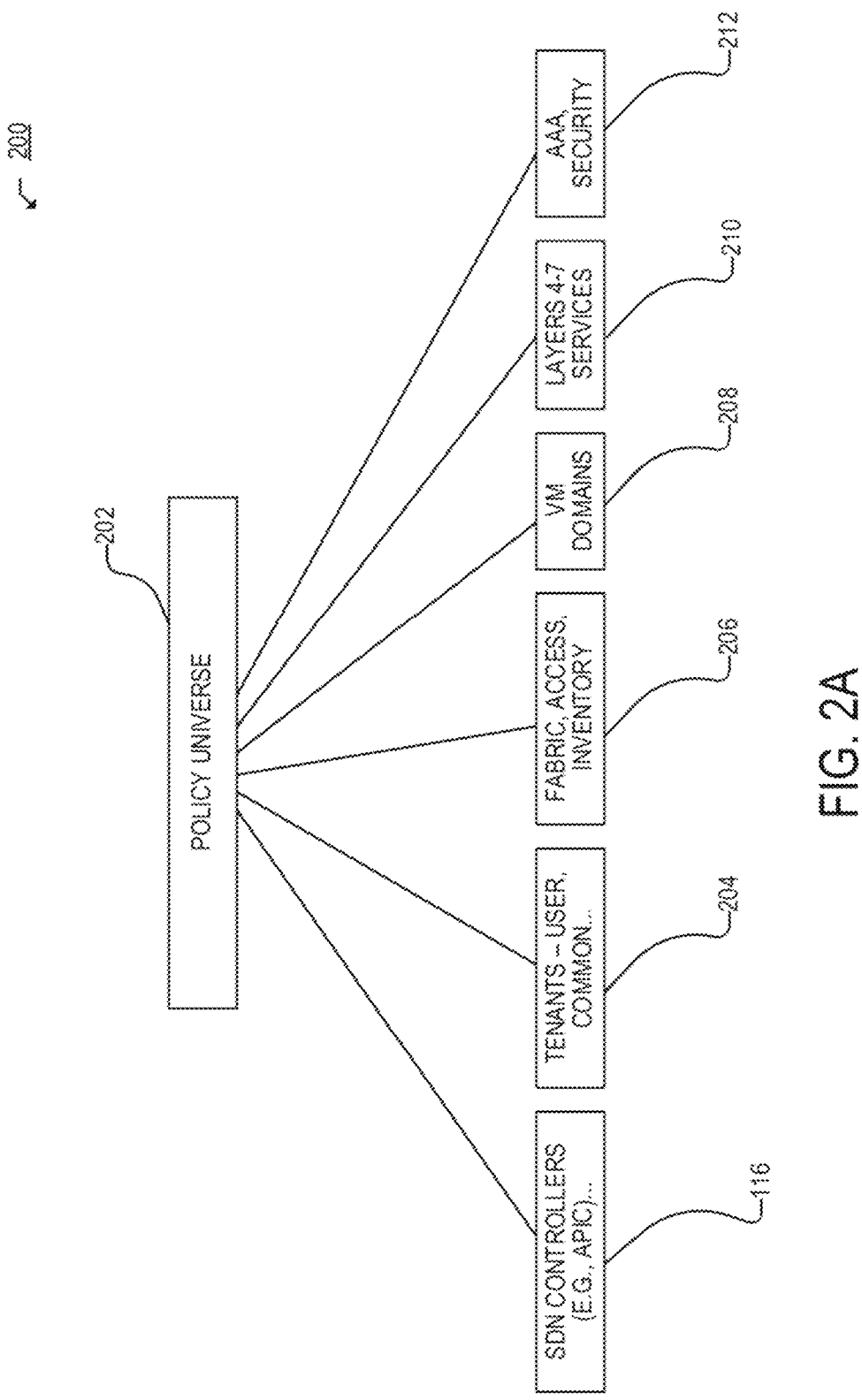
FIG. 2A illustrates an example object model of an example network.

FIG. 2A illustrates a diagram of an example schema of an SDN network, such as Network Environment 100. The schema can define objects, properties, and relationships associated with the SDN network. In this example, the schema is a Management Information Model 200 as further described below. However, in other configurations and implementations, the schema can be a different model or specification associated with a different type of network.

The following discussion of Management Information Model 200 references various terms which shall also be used throughout the disclosure. Accordingly, for clarity, the disclosure shall first provide below a list of terminology, which will be followed by a more detailed discussion of Management Information Model 200.

As used herein, an "Alias" can refer to a changeable name for a given object. Even if the name of an object, once created, cannot be changed, the Alias can be a field that can be changed. The term "Aliasing" can refer to a rule (e.g., contracts, policies, configurations, etc.) that overlaps other rules. For example, Contract 1 defined in a logical model of a network can be said to be aliasing Contract 2 defined in the logical model of the network if Contract 1 completely overlaps Contract 2. In this example, by aliasing Contract 2, Contract 1 renders Contract 2 redundant or inoperable. For example, if Contract 1 has a higher priority than Contract 2, such aliasing can render Contract 2 redundant based on Contract 1's overlapping and higher priority characteristics.

As used herein, the term "APIC" can refer to one or more controllers (e.g., Controllers 116) in an ACI framework. The APIC can provide a unified point of automation and management, policy programming, application deployment, health monitoring for an ACI multitenant fabric. The APIC can be implemented as a single controller, a distributed controller, or a replicated, synchronized, and/or clustered controller.

As used herein, the term "BDD" can refer to a binary decision diagram and the term "ROBDD" can refer to a reduced ordered binary decision diagram. A binary decision diagram or reduced ordered binary decision diagram can be a data structure representing variables and/or functions, such as Boolean functions.

As used herein, the term "BD" can refer to a bridge domain. A bridge domain can be a set of logical ports that share the same flooding or broadcast characteristics. Like a virtual LAN (VLAN), bridge domains can span multiple devices. A bridge domain can be a Layer 2 construct.

As used herein, a "Consumer" can refer to an endpoint, resource, and/or EPG that consumes a service.

As used herein, a "Context" can refer to an address or network domain, such as a Layer 3 (L3) address domain. In some cases, a context can allow multiple instances of a routing table to exist and work simultaneously. This increases functionality by allowing network paths to be segmented without using multiple devices. Non-limiting examples of a context can include a Virtual Routing and Forwarding (VRF) instance, a private network, and so forth.

As used herein, the term "Contract" can refer to rules or configurations that specify what and how communications in a network are conducted (e.g., allowed, denied, filtered, processed, etc.). In an ACI network, contracts can specify how communications between endpoints and/or EPGs take place. In some examples, a contract can provide rules akin to an access control list.

As used herein, the term "Distinguished Name" (DN) can refer to a unique name that describes an object, such as an MO, and locates its place in Management Information Model 200. In some cases, the DN can be (or equate to) a Fully Qualified Domain Name (FQDN).

As used herein, the term "Endpoint Group" (EPG) can refer to a logical entity or object associated with a collection or group of endoints as previously described with reference to FIG. 1B.

As used herein, the term "Filter" can refer to a parameter or configuration for allowing communications. For example, in a whitelist model where communications are blocked by default, a communication must be given explicit permission to prevent such communication from being blocked. A filter can define permission(s) for one or more communications or packets. A filter can thus function similar to an ACL or Firewall rule. In some examples, a filter can be implemented in a packet (e.g., TCP/IP) header field, such as L3 protocol type, L4 (Layer 4) ports, and so on, which is used to allow inbound or outbound communications between endpoints or EPGs, for example.

As used herein, the term "L2 Out" can refer to a bridged connection. A bridged connection can connect two or more segments of the same network so that they can communicate. In an ACI framework, an L2 out can be a bridged (Layer 2) connection between an ACI fabric (e.g., Fabric 120) and an outside Layer 2 network, such as a switch.

As used herein, the term "L3 Out" can refer to a routed connection. A routed Layer 3 connection uses a set of protocols that determine the path that data follows in order to travel across networks from its source to its destination. Routed connections can perform forwarding (e.g., IP forwarding) according to a protocol selected, such as BGP (border gateway protocol), OSPF (Open Shortest Path First), EIGRP (Enhanced Interior Gateway Routing Protocol), etc.

As used herein, the term "Managed Object" (MO) can refer to an abstract representation of objects managed in a network (e.g., Network Environment 100). The objects can be concrete objects (e.g., a switch, server, adapter, etc.), or logical objects (e.g., an application profile, an EPG, a fault, etc.).

As used herein, the term "Management Information Tree" (MIT) can refer to a hierarchical management information tree containing the MOs of a system. For example, in ACI, the MIT contains the MOs of the ACI fabric (e.g., Fabric 120). The MIT can also be referred to as a Management Information Model (MIM), such as Management Information Model 200.

As used herein, the term "Policy" can refer to one or more specifications for controlling some aspect of system or network behavior. For example, a policy can include a named entity that contains specifications for controlling some aspect of system behavior. To illustrate, a Layer 3 Outside Network Policy can contain the BGP protocol to enable BGP routing functions when connecting Fabric 120 to an outside Layer 3 network.

As used herein, the term "Profile" can refer to the configuration details associated with a policy. For example, a profile can include a named entity that contains the configuration details for implementing one or more instances of a policy. To illustrate, a switch node profile for a routing policy can contain the switch-specific configuration details to implement the BGP routing protocol.

As used herein, the term "Provider" refers to an object or entity providing a service. For example, a provider can be an EPG that provides a service.

As used herein, the term "Subject" refers to one or more parameters in a contract for defining communications. For example, in ACI, subjects in a contract can specify what information can be communicated and how. Subjects can function similar to ACLs.

As used herein, the term "Tenant" refers to a unit of isolation in a network. For example, a tenant can be a secure and exclusive computing environment. A tenant can be a unit of isolation from a policy perspective, but does not necessarily represent a private network. Indeed, ACI tenants can contain multiple private networks (e.g., VRFs). Tenants can represent a customer in a service provider setting, an organization or domain in an enterprise setting, or just a grouping of policies.

As used herein, the term "VRF" refers to a virtual routing and forwarding instance. The VRF can define a Layer 3 address domain that allows multiple instances of a routing table to exist and work simultaneously. This increases functionality by allowing network paths to be segmented without using multiple devices. Also known as a context or private network.

Having described various terms used herein, the disclosure now returns to a discussion of Management Information Model (MIM) 200 in FIG. 2A. As previously noted, MIM 200 can be a hierarchical management information tree or MIT. Moreover, MIM 200 can be managed and processed by Controllers 116, such as APICs in an ACI. Controllers 116 can enable the control of managed resources by presenting their manageable characteristics as object properties that can be inherited according to the location of the object within the hierarchical structure of the model.

The hierarchical structure of MIM 200 starts with Policy Universe 202 at the top (Root) and contains parent and child nodes 116, 204, 206, 208, 210, 212. Nodes 116, 202, 204, 206, 208, 210, 212 in the tree represent the managed objects (MOs) or groups of objects. Each object in the fabric (e.g., Fabric 120) has a unique distinguished name (DN) that describes the object and locates its place in the tree. The Nodes 116, 202, 204, 206, 208, 210, 212 can include the various MOs, as described below, which contain policies that govern the operation of the system.

Controllers 116 (e.g., APIC controllers) can provide management, policy programming, application deployment, and health monitoring for Fabric 120.

Node 204 includes a tenant container for policies that enable an administrator to exercise domain-based access control. Non-limiting examples of tenants can include:

User tenants defined by the administrator according to the needs of users. They contain policies that govern the operation of resources such as applications, databases, web servers, network-attached storage, virtual machines, and so on.

A common tenant provided by the system but can be configured by the administrator. It contains policies that govern the operation of resources accessible to all tenants, such as firewalls, load balancers, Layer 4 to Layer 7 services, intrusion detection appliances, and so on.

An infrastructure tenant which can be provided by the system but can be configured by the administrator. It contains policies that govern the operation of infrastructure resources such as the fabric overlay (e.g., VXLAN). It also enables a fabric provider to selectively deploy resources to one or more user tenants. Infrastructure tenant polices can be configurable by the administrator.

A management tenant which can be provided by the system but can be configured by the administrator. It contains policies that govern the operation of fabric management functions used for in-band and out-of-band configuration of fabric nodes. The management tenant contains a private out-of-bound address space for the Controller/Fabric internal communications that is outside the fabric data path that provides access through the management port of the switches. The management tenant enables discovery and automation of communications with VM controllers.

Node 206 can contain access policies that govern the operation of switch access ports that provide connectivity to resources such as storage, compute, Layer 2 and Layer 3 (bridged and routed) connectivity, virtual machine hypervisors, Layer 4 to Layer 7 devices, and so on. If a tenant requires interface configurations other than those provided in the default link, Cisco Discovery Protocol (CDP), Link Layer Discovery Protocol (LLDP), Link Aggregation Control Protocol (LACP), or Spanning Tree Protocol (STP), an administrator can configure access policies to enable such configurations on the access ports of Leafs 104.

Node 206 can contain fabric policies that govern the operation of the switch fabric ports, including such functions as Network Time Protocol (NTP) server synchronization, Intermediate System-to-Intermediate System Protocol (IS-IS), Border Gateway Protocol (BGP) route reflectors, Domain Name System (DNS) and so on. The fabric MO contains objects such as power supplies, fans, chassis, and so on.

Node 208 can contain VM domains that group VM controllers with similar networking policy requirements. VM controllers can share virtual space (e.g., VLAN or VXLAN space) and application EPGs. Controllers 116 communicate with the VM controller to publish network configurations such as port groups that are then applied to the virtual workloads.

Node 210 can contain Layer 4 to Layer 7 service integration life cycle automation framework that enables the system to dynamically respond when a service comes online or goes offline. Policies can provide service device package and inventory management functions.

Node 212 can contain access, authentication, and accounting (AAA) policies that govern user privileges, roles, and security domains of Fabric 120.

The hierarchical policy model can fit well with an API, such as a REST API interface. When invoked, the API can read from or write to objects in the MIT. URLs can map directly into distinguished names that identify objects in the MIT. Data in the MIT can be described as a self-contained structured tree text document encoded in XML or JSON, for example.

Figure 2B:
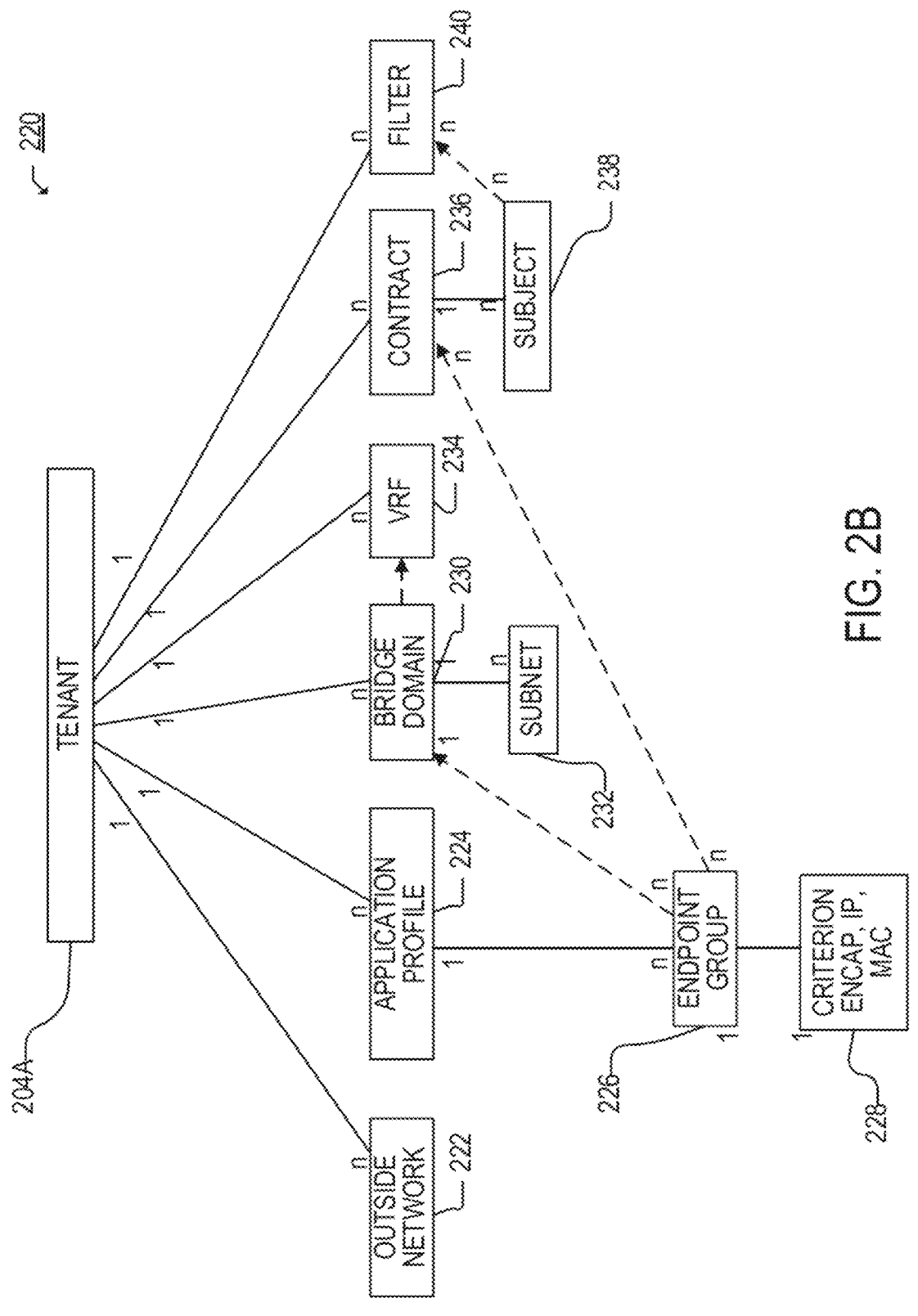
FIG. 2B illustrates an example object model for a tenant object in the example object model from FIG. 2A.

FIG. 2B illustrates an example object model 220 for a tenant portion of MIM 200. As previously noted, a tenant is a logical container for application policies that enable an administrator to exercise domain-based access control. A tenant thus represents a unit of isolation from a policy perspective, but does not necessarily represent a private network. Tenants can represent a customer in a service provider setting, an organization or domain in an enterprise setting, or just a convenient grouping of policies. Moreover, tenants can be isolated from one another or can share resources.

Tenant portion 204A of MIM 200 can include various entities, and the entities in Tenant Portion 204A can inherit policies from parent entities. Non-limiting examples of entities in Tenant Portion 204A can include Filters 240, Contracts 236, Outside Networks 222, Bridge Domains 230, VRF Instances 234, and Application Profiles 224.

Bridge Domains 230 can include Subnets 232. Contracts 236 can include Subjects 238. Application Profiles 224 can contain one or more EPGs 226. Some applications can contain multiple components. For example, an e-commerce application could require a web server, a database server, data located in a storage area network, and access to outside resources that enable financial transactions. Application Profile 224 contains as many (or as few) EPGs as necessary that are logically related to providing the capabilities of an application.

EPG 226 can be organized in various ways, such as based on the application they provide, the function they provide (such as infrastructure), where they are in the the data center (such as DMZ), or whatever organizing principle that a fabric or tenant administrator chooses to use.

EPGs in the fabric can contain various types of EPGs, such as application EPGs, Layer 2 external outside network instance EPGs, Layer 3 external outside network instance EPGs, management EPGs for out-of-band or in-band access, etc. EPGs 226 can also contain Attributes 228, such as encapsulation-based EPGs, IP-based EPGs, or MAC-based EPGs.

As previously mentioned, EPGs can contain endpoints (e.g., EPs 122) that have common characteristics or attributes, such as common policy requirements (e.g., security, virtual machine mobility (VMM), QoS, or Layer 4 to Layer 7 services). Rather than configure and manage endpoints individually, they can be placed in an EPG and managed as a group.

Policies apply to EPGs, including the endpoints they contain. An EPG can be statically configured by an administrator in Controllers 116, or dynamically configured by an automated system such as VCENTER or OPENSTACK.

To activate tenant policies in Tenant Portion 204A, fabric access policies should be configured and associated with tenant policies. Access policies enable an administrator to configure other network configurations, such as port channels and virtual port channels, protocols such as LLDP, CDP, or LACP, and features such as monitoring or diagnostics.

Figure 2C:
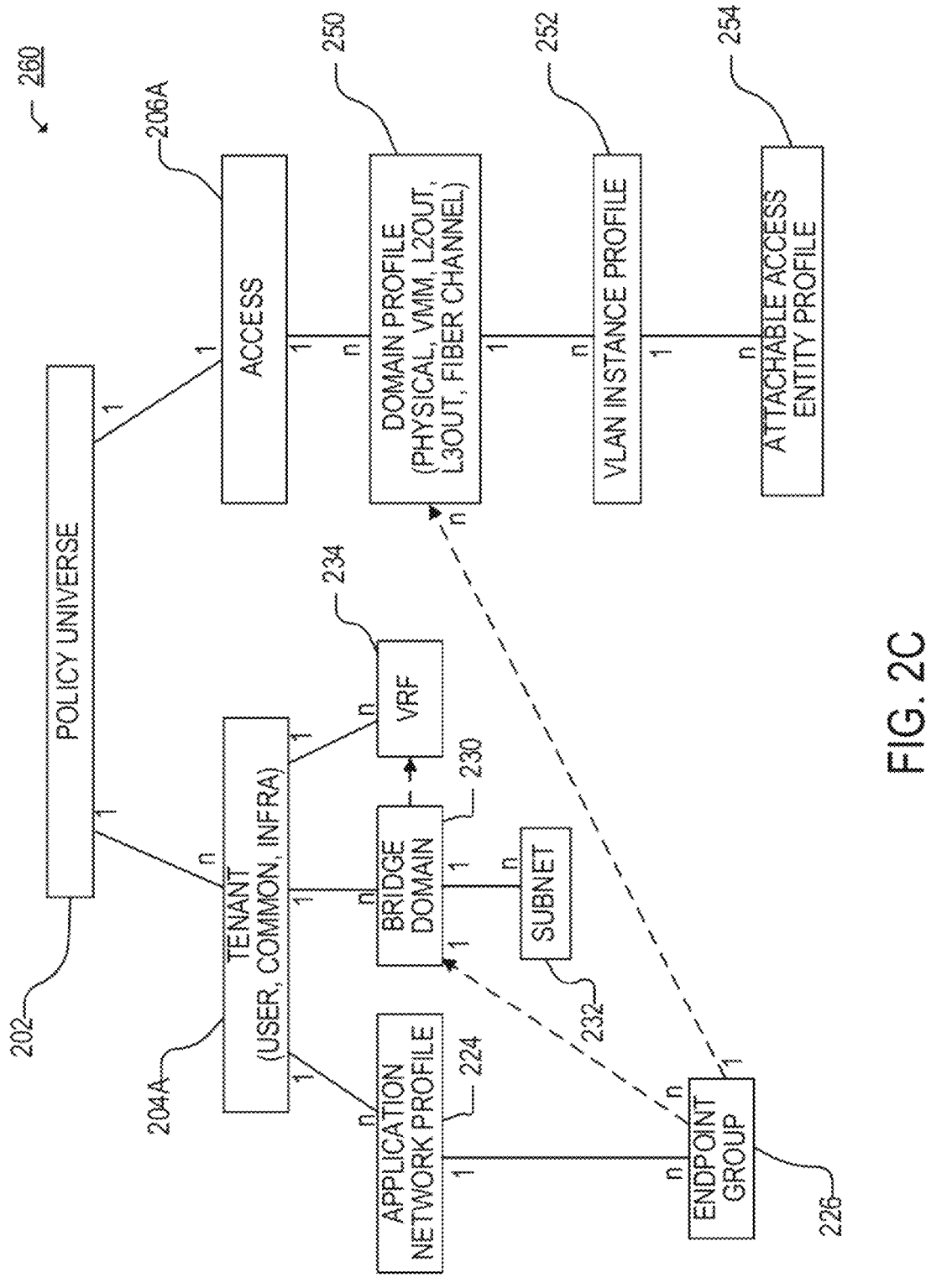
FIG. 2C illustrates an example association of various objects in the example object model from FIG. 2A.

FIG. 2C illustrates an example Association 260 of tenant entities and access entities in MIM 200. Policy Universe 202 contains Tenant Portion 204A and Access Portion 206A. Thus, Tenant Portion 204A and Access Portion 206A are associated through Policy Universe 202.

Access Portion 206A can contain fabric and infrastructure access policies. Typically, in a policy model, EPGs are coupled with VLANs. For traffic to flow, an EPG is deployed on a leaf port with a VLAN in a physical, VMM, L2 out, L3 out, or Fiber Channel domain, for example.

Access Portion 206A thus contains Domain Profile 236 which can define a physical, VMM, L2 out, L3 out, or Fiber Channel domain, for example, to be associated to the EPGs. Domain Profile 236 contains VLAN Instance Profile 238 (e.g., VLAN pool) and Attacheable Access Entity Profile (AEP) 240, which are associated directly with application EPGs. The AEP 240 deploys the associated application EPGs to the ports to which it is attached, and automates the task of assigning VLANs. While a large data center can have thousands of active VMs provisioned on hundreds of VLANs, Fabric 120 can automatically assign VLAN IDs from VLAN pools. This saves time compared with trunking down VLANs in a traditional data center.

Figure 2D:
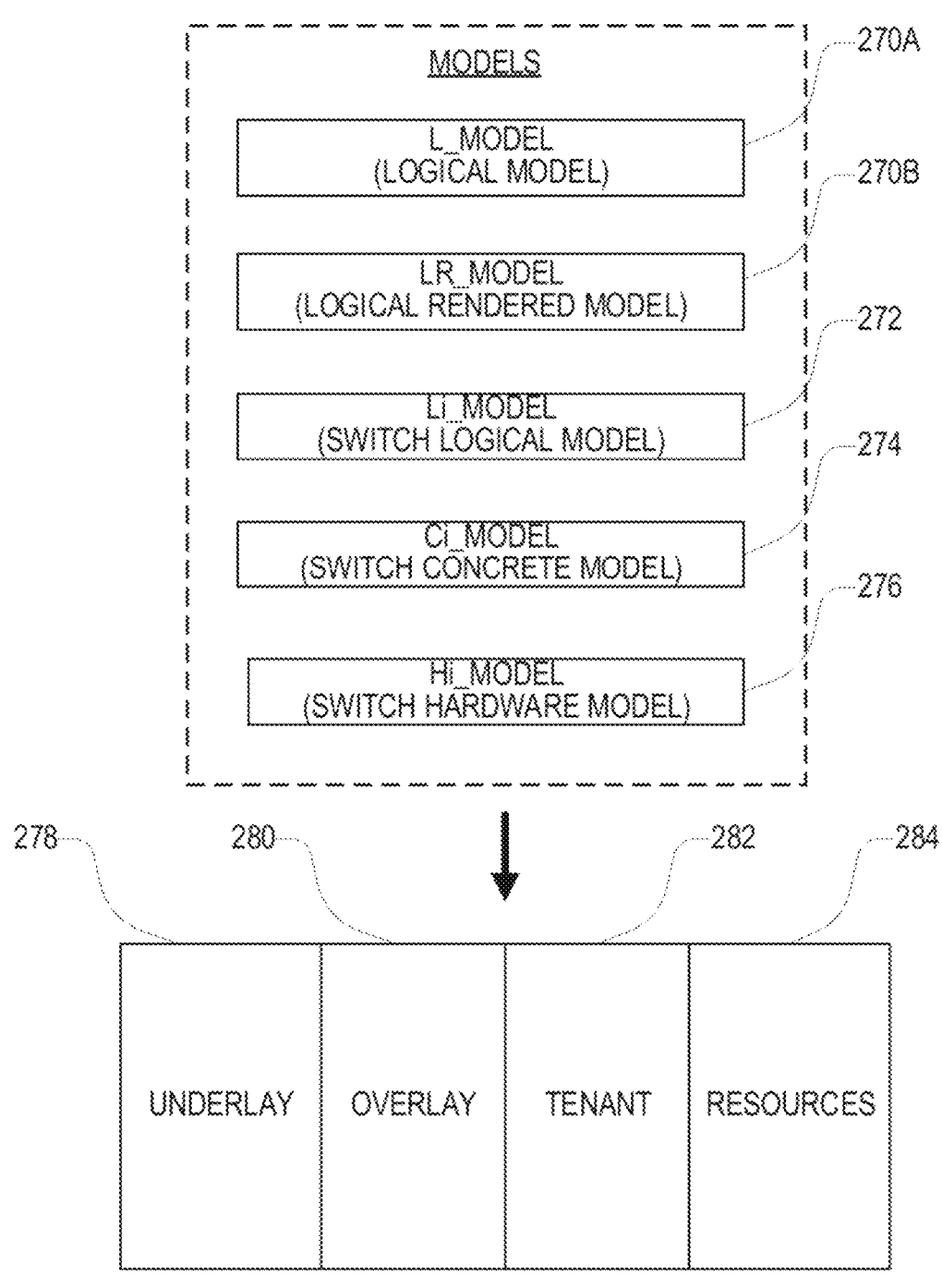
FIG. 2D illustrates a schematic diagram of example models implemented based on the example object model from FIG. 2A.

FIG. 2D illustrates a schematic diagram of example models for a network, such as Network Environment 100. The models can be generated based on specific configurations and/or network state parameters associated with various objects, policies, properties, and elements defined in MIM 200. The models can be implemented for network analysis and assurance, and may provide a depiction of the network at various stages of implementation and levels of the network.

As illustrated, the models can include L_Model 270A (Logical Model), LR_Model 270B (Logical Rendered Model or Logical Runtime Model), Li_Model 272 (Logical Model for i), Ci_Model 274 (Concrete model for i), and/or Hi_Model 276 (Hardware Model for i).

L_Model 270A is the logical representation of various elements in MIM 200 as configured in a network (e.g., Network Environment 100), such as objects, object properties, object relationships, and other elements in MIM 200 as configured in a network. L_Model 270A can be generated by Controllers 116 based on configurations entered in Controllers 116 for the network, and thus represents the logical configuration of the network at Controllers 116. This is the declaration of the "end-state" expression that is desired when the elements of the network entities (e.g., applications, tenants, etc.) are connected and Fabric 120 is provisioned by Controllers 116. Because L_Model 270A represents the configurations entered in Controllers 116, including the objects and relationships in MIM 200, it can also reflect the "intent" of the administrator: how the administrator wants the network and network elements to behave.

L_Model 270A can be a fabric or network-wide logical model. For example, L_Model 270A can account configurations and objects from each of Controllers 116. As previously explained, Network Environment 100 can include multiple Controllers 116. In some cases, two or more Controllers 116 may include different configurations or logical models for the network. In such cases, L_Model 270A can obtain any of the configurations or logical models from Controllers 116 and generate a fabric or network wide logical model based on the configurations and logical models from all Controllers 116. L_Model 270A can thus incorporate configurations or logical models between Controllers 116 to provide a comprehensive logical model. L_Model 270A can also address or account for any dependencies, redundancies, conflicts, etc., that may result from the configurations or logical models at the different Controllers 116.

LR_Model 270B is the abstract model expression that Controllers 116 (e.g., APICs in ACI) resolve from L_Model 270A. LR_Model 270B can provide the configuration components that would be delivered to the physical infrastructure (e.g., Fabric 120) to execute one or more policies. For example, LR_Model 270B can be delivered to Leafs 104 in Fabric 120 to configure Leafs 104 for communication with attached Endpoints 122. LR_Model 270B can also incorporate state information to capture a runtime state of the network (e.g., Fabric 120).

In some cases, LR_Model 270B can provide a representation of L_Model 270A that is normalized according to a specific format or expression that can be propagated to, and/or understood by, the physical infrastructure of Fabric 120 (e.g., Leafs 104, Spines 102, etc.). For example, LR_Model 270B can associate the elements in L_Model 270A with specific identifiers or tags that can be interpreted and/or compiled by the switches in Fabric 120, such as hardware plane identifiers used as classifiers.

Li_Model 272 is a switch-level or switch-specific model obtained from L_Model 270A and/or LR_Model 270B. Li_Model 272 can project L_Model 270A and/or LR_Model 270B on a specific switch or device i, and thus can convey how L_Model 270A and/or LR_Model 270B should appear or be implemented at the specific switch or device i.

For example, Li_Model 272 can project L_Model 270A and/or LR_Model 270B pertaining to a switch i to capture a switch-level representation of L_Model 270A and/or LR_Model 270B at switch i. To illustrate, Li_Model 272 $L_1$ can represent L_Model 270A and/or LR_Model 270B projected to, or implemented at, Leaf 1 (104). Thus, Li_Model 272 can be generated from L_Model 270A and/or LR_Model 270B for individual devices (e.g., Leafs 104) on Fabric 120.

In some cases, Li_Model 272 can be represented using JSON (JavaScript Object Notation). For example, Li_Model 272 can include JSON objects, such as Rules, Filters, Entries, and Scopes.

Ci_Model 274 is the actual in-state configuration at the individual fabric member i (e.g., switch i). In other words, Ci_Model 274 is a switch-level or switch-specific model that is based on Li_Model 272. For example, Controllers 116 can deliver Li_Model 272 to Leaf 1 (104). Leaf 1 (104) can take Li_Model 272, which can be specific to Leaf 1 (104), and render the policies in Li_Model 272 into a concrete model, Ci_Model 274, that runs on Leaf 1 (104). Leaf 1 (104) can render Li_Model 272 via the OS on Leaf 1 (104), for example. Thus, Ci_Model 274 can be analogous to compiled software, as it is the form of Li_Model 272 that the switch OS at Leaf 1 (104) can execute.

In some cases, Li_Model 272 and Ci_Model 274 can have a same or similar format. For example, Li_Model 272 and Ci_Model 274 can be based on JSON objects. Having the same or similar format can facilitate objects in Li_Model 272 and Ci_Model 274 to be compared for equivalence or congruence. Such equivalence or congruence checks can be used for network analysis and assurance, as further described herein.

Hi_Model 276 is also a switch-level or switch-specific model for switch i, but is based on Ci_Model 274 for switch i. Hi_Model 276 is the actual configuration (e.g., rules) stored or rendered on the hardware or memory (e.g., TCAM memory) at the individual fabric member i (e.g., switch i). For example, Hi_Model 276 can represent the configurations (e.g., rules) which Leaf 1 (104) stores or renders on the hardware (e.g., TCAM memory) of Leaf 1 (104) based on Ci_Model 274 at Leaf 1 (104). The switch OS at Leaf 1 (104) can render or execute Ci_Model 274, and Leaf 1 (104) can store or render the configurations from Ci_Model 274 in storage, such as the TCAM at Leaf 1 (104). The configurations from Hi_Model 276 stored or rendered by Leaf 1 (104) represent the configurations that will be implemented by Leaf 1 (104) when processing traffic.

While Models 272, 274, 276 are shown as device-specific models, similar models can be generated or aggregated for a collection of fabric members (e.g., Leafs 104 and/or Spines 102) in Fabric 120. When combined, device-specific models, such as Model 272, Model 274, and/or Model 276, can provide a representation of Fabric 120 that extends beyond a particular device. For example, in some cases, Li_Model 272, Ci_Model 274, and/or Hi_Model 276 associated with some or all individual fabric members (e.g., Leafs 104 and Spines 102) can be combined or aggregated to generate one or more aggregated models based on the individual fabric members.

As referenced herein, the terms H Model, T Model, and TCAM Model can be used interchangeably to refer to a hardware model, such as Hi_Model 276. For example, Ti Model, Hi Model and TCAMi Model may be used interchangeably to refer to Hi_Model 276.

Models 270A, 270B, 272, 274, 276 can provide representations of various aspects of the network or various configuration stages for MIM 200. For example, one or more of Models 270A, 270B, 272, 274, 276 can be used to generate Underlay Model 278 representing one or more aspects of Fabric 120 (e.g., underlay topology, routing, etc.), Overlay Model 280 representing one or more aspects of the overlay or logical segment(s) of Network Environment 100

(e.g., COOP, MPBGP, tenants, VRFs, VLANs, VXLANs, virtual applications, VMs, hypervisors, virtual switching, etc.), Tenant Model 282 representing one or more aspects of Tenant portion 204A in MIM 200 (e.g., security, forwarding, service chaining, QoS, VRFs, BDs, Contracts, Filters, EPGs, subnets, etc.), Resources Model 284 representing one or more resources in Network Environment 100 (e.g., storage, computing, VMs, port channels, physical elements, etc.), etc.

In general, L_Model 270A can be the high-level expression of what exists in the LR_Model 270B, which should be present on the concrete devices as Ci_Model 274 and Hi_Model 276 expression. If there is a gap between models, there may be inconsistent configurations or problems.

Figure 3A:
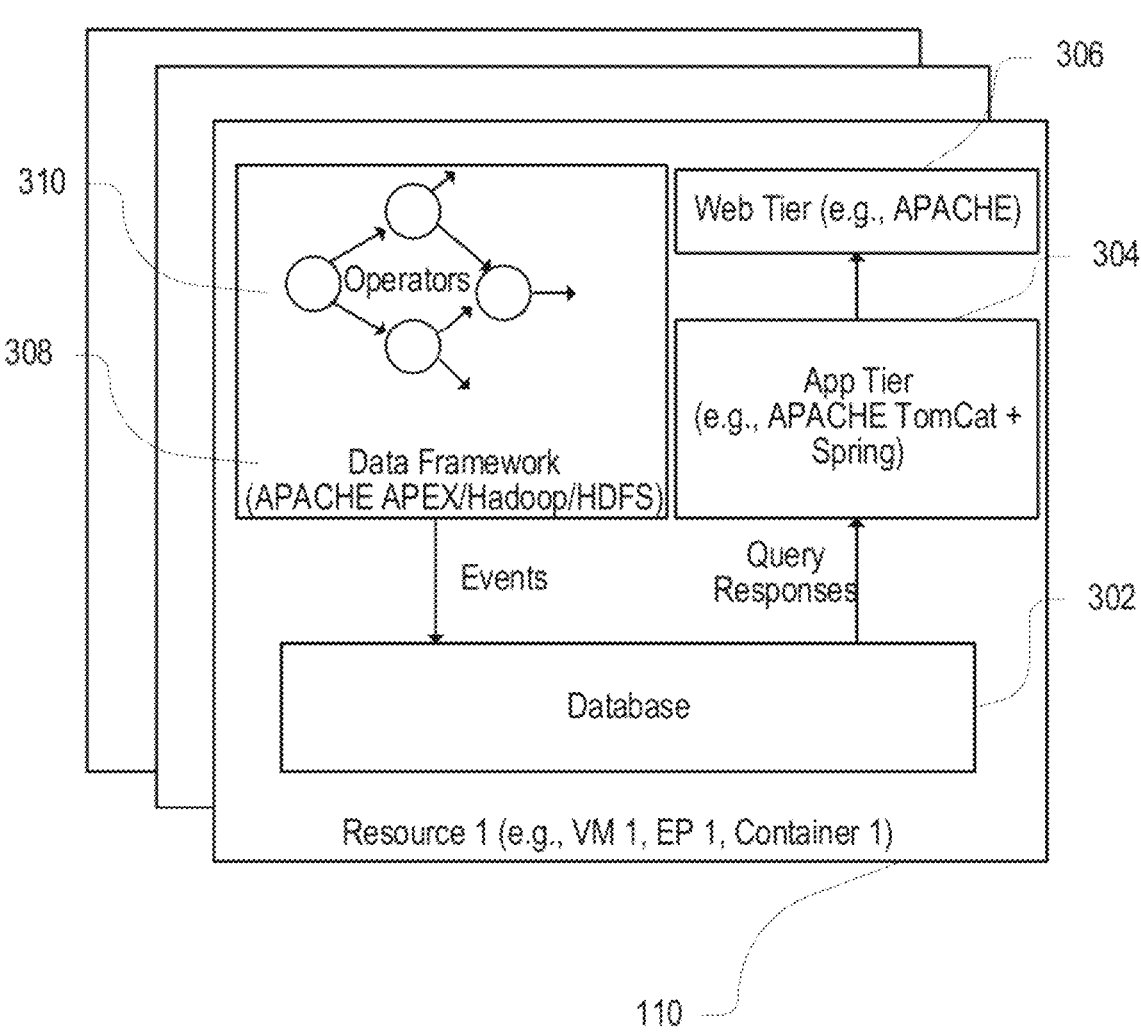
FIG. 3A illustrates an example assurance appliance sys-tem.

FIG. 3A illustrates a diagram of an example Assurance Appliance System 300 for network assurance. In this example, Assurance Appliance System 300 can include k Resources 110 (e.g., VMs) operating in cluster mode. Resources 110 can refer to VMs, software containers, bare metal devices, Endpoints 122, or any other physical or logical systems or components. It should be noted that, while FIG. 3A illustrates a cluster mode configuration, other configurations are also contemplated herein, such as a single mode configuration (e.g., single VM, container, or server) or a service chain for example.

Assurance Appliance System 300 can run on one or more Servers 106, Resources 110, Hypervisors 108, EPs 122, Leafs 104, Controllers 116, or any other system or resource. For example, Assurance Appliance System 300 can be a logical service or application running on one or more Resources 110 in Network Environment 100.

The Assurance Appliance System 300 can include Data Framework 308 (e.g., APACHE APEX, HADOOP, HDFS, ZOOKEEPER, etc.). In some cases, assurance checks can be written as, or provided by, individual operators that reside in Data Framework 308. This enables a natively horizontal scale-out architecture that can scale to arbitrary number of switches in Fabric 120 (e.g., ACI fabric).

Assurance Appliance System 300 can poll Fabric 120 at a configurable periodicity (e.g., an epoch). In some examples, the analysis workflow can be setup as a DAG (Directed Acyclic Graph) of Operators 310, where data flows from one operator to another and eventually results are generated and persisted to Database 302 for each interval (e.g., each epoch).

The north-tier implements API Server (e.g., APACHE TOMCAT, SPRING framework, etc.) 304 and Web Server 306. A graphical user interface (GUI) interacts via the APIs exposed to the customer. These APIs can also be used by the customer to collect data from Assurance Appliance System 300 for further integration into other tools.

Operators 310 in Data Framework 308 can together support assurance operations. Below are non-limiting examples of assurance operations that can be performed by Assurance Appliance System 300 via Operators 310.

Security Policy Adherence

Assurance Appliance System 300 can check to make sure the configurations or specification from L_Model 270A, which may reflect the user's intent for the network, including for example the security policies and contracts, are correctly implemented and/or rendered in Li_Model 272, Ci_Model 274, and Hi_Model 276, and thus properly implemented and rendered by the fabric members (e.g., Leafs 104), and report any errors, contract violations, or irregularities found.

Static Policy Analysis

Assurance Appliance System 300 can check for issues in the specification of the user's intent or intents (e.g., identify contradictory or conflicting policies in L_Model 270A). Assurance Appliance System 300 can identify lint events based on the intent specification of a network. The lint and policy analysis can include semantic and/or syntactic checks of the intent specification(s) of a network.

TCAM Utilization

TCAM is a scarce resource in the fabric (e.g., Fabric 120). However, Assurance Appliance System 300 can analyze the TCAM utilization by the network data (e.g., Longest Prefix Match (LPM) tables, routing tables, VLAN tables, BGP updates, etc.), Contracts, Logical Groups 118 (e.g., EPGs), Tenants, Spines 102, Leafs 104, and other dimensions in Network Environment 100 and/or objects in MIM 200, to provide a network operator or user visibility into the utilization of this scarce resource. This can greatly help for planning and other optimization purposes.

Endpoint Checks

Assurance Appliance System 300 can validate that the fabric (e.g. fabric 120) has no inconsistencies in the Endpoint information registered (e.g., two leafs announcing the same endpoint, duplicate subnets, etc.), among other such checks.

Tenant Routing Checks

Assurance Appliance System 300 can validate that BDs, VRFs, subnets (both internal and external), VLANs, contracts, filters, applications, EPGs, etc., are correctly programmed.

Infrastructure Routing

Assurance Appliance System 300 can validate that infrastructure routing (e.g., IS-IS protocol) has no convergence issues leading to black holes, loops, flaps, and other problems.

MP-BGP Route Reflection Checks

The network fabric (e.g., Fabric 120) can interface with other external networks and provide connectivity to them via one or more protocols, such as Border Gateway Protocol (BGP), Open Shortest Path First (OSPF), etc. The learned routes are advertised within the network fabric via, for example, MP-BGP. These checks can ensure that a route reflection service via, for example, MP-BGP (e.g., from Border Leaf) does not have health issues.

Logical Lint and Real-Time Change Analysis

Assurance Appliance System 300 can validate rules in the specification of the network (e.g., L_Model 270A) are complete and do not have inconsistencies or other problems. MOs in the MIM 200 can be checked by Assurance Appliance System 300 through syntactic and semantic checks performed on L_Model 270A and/or the associated configurations of the MOs in MIM 200. Assurance Appliance System 300 can also verify that unnecessary, stale, unused or redundant configurations, such as contracts, are removed.

Figure 3B:
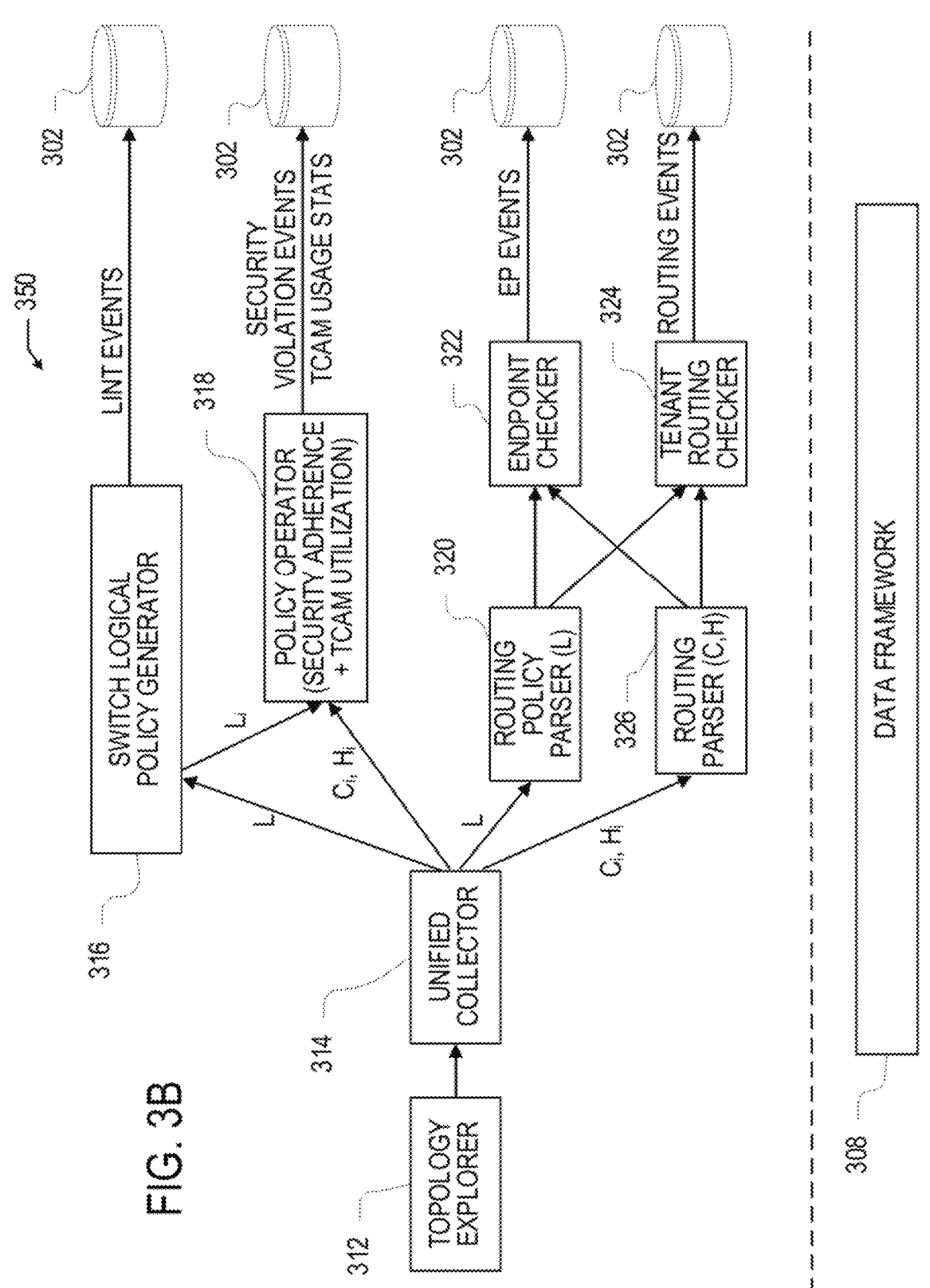
FIG. 3B illustrates an example system diagram for net-work assurance.

FIG. 3B illustrates an architectural diagram of an example system 350 for network assurance, such as Assurance Appliance System 300. In some cases, system 350 can correspond to the DAG of Operators 310 previously discussed with respect to FIG. 3A

In this example, Topology Explorer 312 communicates with Controllers 116 (e.g., APIC controllers) in order to discover or otherwise construct a comprehensive topological view of Fabric 120 (e.g., Spines 102, Leafs 104, Controllers 116, Endpoints 122, and any other components as well as their interconnections). While various architectural components are represented in a singular, boxed fashion, it is understood that a given architectural component, such as Topology Explorer 312, can correspond to one or more individual Operators 310 and may include one or more nodes or endpoints, such as one or more servers, VMs, containers, applications, service functions (e.g., functions in a service chain or virtualized network function), etc.

Topology Explorer 312 is configured to discover nodes in Fabric 120, such as Controllers 116, Leafs 104, Spines 102, etc. Topology Explorer 312 can additionally detect a majority election performed amongst Controllers 116, and determine whether a quorum exists amongst Controllers 116. If no quorum or majority exists, Topology Explorer 312 can trigger an event and alert a user that a configuration or other error exists amongst Controllers 116 that is preventing a quorum or majority from being reached. Topology Explorer 312 can detect Leafs 104 and Spines 102 that are part of Fabric 120 and publish their corresponding out-of-band management network addresses (e.g., IP addresses) to downstream services. This can be part of the topological view that is published to the downstream services at the conclusion of Topology Explorer's 312 discovery epoch (e.g., 5 minutes, or some other specified interval).

In some examples, Topology Explorer 312 can receive as input a list of Controllers 116 (e.g., APIC controllers) that are associated with the network/fabric (e.g., Fabric 120). Topology Explorer 312 can also receive corresponding credentials to login to each controller. Topology Explorer 312 can retrieve information from each controller using, for example, REST calls. Topology Explorer 312 can obtain from each controller a list of nodes (e.g., Leafs 104 and Spines 102), and their associated properties, that the controller is aware of Topology Explorer 312 can obtain node information from Controllers 116 including, without limitation, an IP address, a node identifier, a node name, a node domain, a node URI, a node_dm, a node role, a node version, etc.

Topology Explorer 312 can also determine if Controllers 116 are in quorum, or are sufficiently communicatively coupled amongst themselves. For example, if there are n controllers, a quorum condition might be met when (n/2+1) controllers are aware of each other and/or are communicatively coupled. Topology Explorer 312 can make the determination of a quorum (or identify any failed nodes or controllers) by parsing the data returned from the controllers, and identifying communicative couplings between their constituent nodes. Topology Explorer 312 can identify the type of each node in the network, e.g. spine, leaf, APIC, etc., and include this information in the topology information generated (e.g., topology map or model).

If no quorum is present, Topology Explorer 312 can trigger an event and alert a user that reconfiguration or suitable attention is required. If a quorum is present, Topology Explorer 312 can compile the network topology information into a JSON object and pass it downstream to other operators or services, such as Unified Collector 314.

Unified Collector 314 can receive the topological view or model from Topology Explorer 312 and use the topology information to collect information for network assurance from Fabric 120. Unified Collector 314 can poll nodes (e.g., Controllers 116, Leafs 104, Spines 102, etc.) in Fabric 120 to collect information from the nodes.

Unified Collector 314 can include one or more collectors (e.g., collector devices, operators, applications, VMs, etc.) configured to collect information from Topology Explorer 312 and/or nodes in Fabric 120. For example, Unified Collector 314 can include a cluster of collectors, and each of the collectors can be assigned to a subset of nodes within the topological model and/or Fabric 120 in order to collect information from their assigned subset of nodes. For performance, Unified Collector 314 can run in a parallel, multi-threaded fashion.

Unified Collector 314 can perform load balancing across collectors in order to streamline the efficiency of the overall collection process. Load balancing can be optimized by managing the distribution of subsets of nodes to collectors, for example by randomly hashing nodes to collectors.

In some cases, Assurance Appliance System 300 can run multiple instances of Unified Collector 314. This can also allow Assurance Appliance System 300 to distribute the task of collecting data for each node in the topology (e.g., Fabric 120 including Spines 102, Leafs 104, Controllers 116, etc.) via sharding and/or load balancing, and map collection tasks and/or nodes to a particular instance of Unified Collector 314 with data collection across nodes being performed in parallel by various instances of Unified Collector 314. Within a given node, commands and data collection can be executed serially. Assurance Appliance System 300 can control the number of threads used by each instance of Unified Collector 314 to poll data from Fabric 120.

Unified Collector 314 can collect models (e.g., L_Model 270A and/or LR_Model 270B) from Controllers 116, switch software configurations and models (e.g., Ci_Model 274) from nodes (e.g., Leafs 104 and/or Spines 102) in Fabric 120, hardware configurations and models (e.g., Hi_Model 276) from nodes (e.g., Leafs 104 and/or Spines 102) in Fabric 120, etc. Unified Collector 314 can collect Ci_Model 274 and Hi_Model 276 from individual nodes or fabric members, such as Leafs 104 and Spines 102, and L_Model 270A and/or LR_Model 270B from one or more controllers (e.g., Controllers 116) in Network Environment 100.

Unified Collector 314 can poll devices that Topology Explorer 312 discovers to collect data from Fabric 120 (e.g., from the constituent members of the fabric). Unified Collector 314 can collect the data using interfaces exposed by Controllers 116 and/or switch software (e.g., switch OS), including, for example, a Representation State Transfer Interface and a Secure Shell Interface.

In some cases, Unified Collector 314 collects L_Model 270A, LR_Model 270B, and/or Ci_Model 274 via a REST API, and the hardware information (e.g., configurations, tables, fabric card information, rules, routes, etc.) via SSH using utilities provided by the switch software, such as virtual shell (VSH or VSHELL) for accessing the switch command-line interface (CLI) or VSH_LC shell for accessing runtime state of the line card.

Unified Collector 314 can poll other information from Controllers 116, including, without limitation: topology information, tenant forwarding/routing information, tenant security policies, contracts, interface policies, physical domain or VMM domain information, OOB (out-of-band) management IP's of nodes in the fabric, etc.

Unified Collector 314 can poll information from nodes (e.g., Leafs 104 and Spines 102) in Fabric 120, including without limitation: Ci_Models 274 for VLANs, BDs, and security policies; Link Layer Discovery Protocol (LLDP) information of nodes (e.g., Leafs 104 and/or Spines 102); endpoint information from EPM/COOP; fabric card information from Spines 102; routing information base (RIB) tables from nodes in Fabric 120; security group hardware tables (e.g., TCAM tables) from nodes in Fabric 120; etc.

In some cases, Unified Collector 314 can obtain runtime state from the network and incorporate runtime state information into L_Model 270A and/or LR_Model 270B. Unified Collector 314 can also obtain multiple logical models from Controllers 116 and generate a comprehensive or network-wide logical model (e.g., L_Model 270A and/or LR_Model 270B) based on the logical models. Unified Collector 314 can compare logical models from Controllers 116, resolve dependencies, remove redundancies, etc., and generate a single L_Model 270A and/or LR_Model 270B for the entire network or fabric.

Unified Collector 314 can collect the entire network state across Controllers 116 and fabric nodes or members (e.g., Leafs 104 and/or Spines 102). For example, Unified Collector 314 can use a REST interface and an SSH interface to collect the network state. This information collected by Unified Collector 314 can include data relating to the link layer, VLANs, BDs, VRFs, security policies, etc. The state information can be represented in LR_Model 270B, as previously mentioned. Unified Collector 314 can then publish the collected information and models to any downstream operators that are interested in or require such information. Unified Collector 314 can publish information as it is received, such that data is streamed to the downstream operators.

Data collected by Unified Collector 314 can be compressed and sent to downstream services. In some examples, Unified Collector 314 can collect data in an online or real-time fashion, and send the data downstream as it is collected for further analysis. In some examples, Unified Collector 314 can collect data in an offline fashion, and compile the data for later analysis or transmission.

Assurance Appliance System 300 can contact Controllers 116, Spines 102, Leafs 104, and other nodes to collect various types of data. In some scenarios, Assurance Appliance System 300 may experience a failure (e.g., connectivity problem, hardware or software error, etc.) that prevents it from being able to collect data for a period of time. Assurance Appliance System 300 can handle such failures seamlessly, and generate events based on such failures.

Switch Logical Policy Generator 316 can receive L_Model 270A and/or LR_Model 270B from Unified Collector 314 and calculate Li_Model 272 for each network device i (e.g., switch i) in Fabric 120. For example, Switch Logical Policy Generator 316 can receive L_Model 270A and/or LR_Model 270B and generate Li_Model 272 by projecting a logical model for each individual node i (e.g., Spines 102 and/or Leafs 104) in Fabric 120. Switch Logical Policy Generator 316 can generate Li_Model 272 for each switch in Fabric 120, thus creating a switch logical model based on L_Model 270A and/or LR_Model 270B for each switch.

Each Li_Model 272 can represent L_Model 270A and/or LR_Model 270B as projected or applied at a network device i (e.g., switch i) in Fabric 120. In some cases, Li_Model 272 can be normalized or formatted in a manner that is compatible with the network device. For example, Li_Model 272 can be formatted in a manner that can be read or executed by the network device. To illustrate, Li_Model 272 can included specific identifiers (e.g., hardware plane identifiers used by Controllers 116 as classifiers, etc.) or tags (e.g., policy group tags) that can be interpreted by the respective network device. In some cases, Li_Model 272 can include JSON objects. For example, Li_Model 272 can include JSON objects to represent rules, filters, entries, scopes, etc.

The format used for Li_Model 272 can be the same as, or consistent with, the format of Ci_Model 274. For example, both Li_Model 272 and Ci_Model 274 may be based on JSON objects. Similar or matching formats can enable Li_Model 272 and Ci_Model 274 to be compared for equivalence or congruence. Such equivalency checks can aid in network analysis and assurance as further explained herein.

Switch Logical Configuration Generator 316 can also perform change analysis and generate lint events or records for problems discovered in L_Model 270A and/or LR_Model 270B. The lint events or records can be used to generate alerts for a user or network operator.

Policy Operator 318 can receive Ci_Model 274 and Hi_Model 276 for each switch from Unified Collector 314, and Li_Model 272 for each switch from Switch Logical Policy Generator 316, and perform assurance checks and analysis (e.g., security adherence checks, TCAM utilization analysis, etc.) based on Ci_Model 274, Hi_Model 276, and Li_Model 272. Policy Operator 318 can perform assurance checks on a switch-by-switch basis by comparing one or more models.

Returning to Unified Collector 314, Unified Collector 314 can also send L_Model 270A and/or LR_Model 270B to Routing Policy Parser 320, and Ci_Model 274 and Hi_Model 276 to Routing Parser 326.

Routing Policy Parser 320 can receive L_Model 270A and/or LR_Model 270B and parse the model(s) for information that may be relevant to downstream operators, such as Endpoint Checker 322 and Tenant Routing Checker 324. Similarly, Routing Parser 326 can receive Ci_Model 274 and Hi_Model 276 and parse each model for information for downstream operators, Endpoint Checker 322 and Tenant Routing Checker 324.

After Ci_Model 274, Hi_Model 276, L_Model 270A and/or LR_Model 270B are parsed, Routing Policy Parser 320 and/or Routing Parser 326 can send cleaned-up protocol buffers (Proto Buffs) to the downstream operators, Endpoint Checker 322 and Tenant Routing Checker 324. Endpoint Checker 322 can then generate events related to Endpoint violations, such as duplicate IPs, APIPA, etc., and Tenant Routing Checker 324 can generate events related to the deployment of BDs, VRFs, subnets, routing table prefixes, etc.

Figure 4:
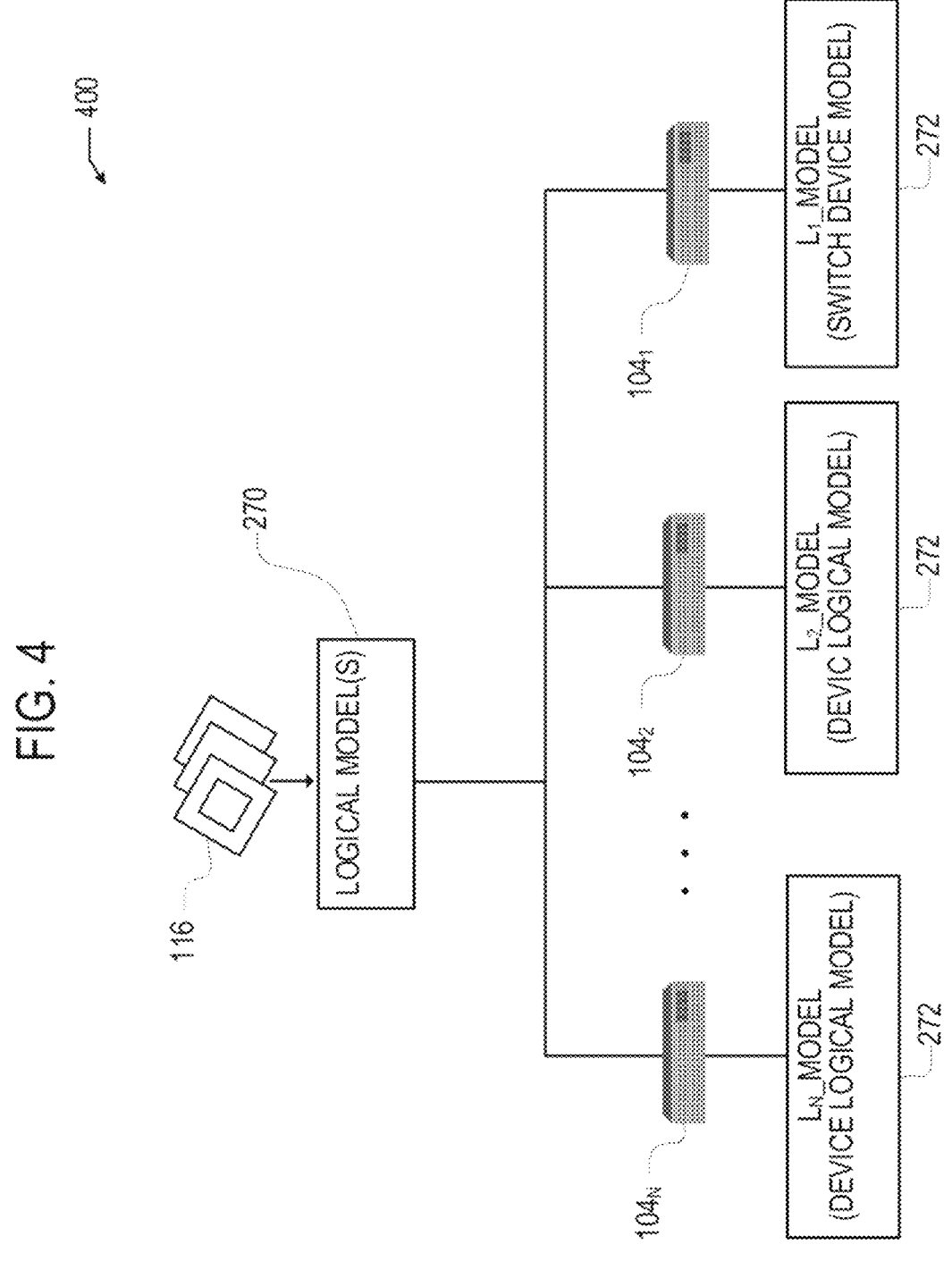
FIG. 4 illustrates an example diagram for constructing device-specific logical models based on a logical model of a network.

FIG. 4 illustrates an example diagram 400 for constructing node-specific logical networks (e.g., Li_Models 272) based on a Logical Model 270 of a network, such as Network Environment 100. Logical Model 270 can include L_Model 270A and/or LR_Model 270B, as shown in FIG. 2D. Logical Model 270 can include objects and configurations of the network to be pushed to the devices in Fabric 120, such as Leafs 104. Logical Model 270 can provide a network-wide representation of the network. Thus, Logical Model 270 can be used to construct a Node-Specific Logical Model (e.g., Li_Model 272) for nodes in Fabric 120 (e.g., Leafs 104).

Logical Model 270 can be adapted for each of the nodes (e.g., Leafs 104) in order to generate a respective logical model for each node, which represents, and/or corresponds to, the portion(s) and/or information from Logical Model 270 that is pertinent to the node, and/or the portion(s) and/or information from Logical Model 270 that should be, and/or is, pushed, stored, and/or rendered at the node. Each of the Node-Specific Logical Models, Li_Model 272, can contain those objects, properties, configurations, data, etc., from Logical Model 270 that pertain to the specific node, including any portion(s) from Logical Model 270 projected or rendered on the specific node when the network-wide intent specified by Logical Model 270 is propagated or projected to the individual node. In other words, to carry out the intent specified in Logical Model 270, the individual nodes (e.g., Leafs 104) can implement respective portions of Logical Model 270 such that together, the individual nodes can carry out the intent specified in Logical Model 270.

Figure 5A:
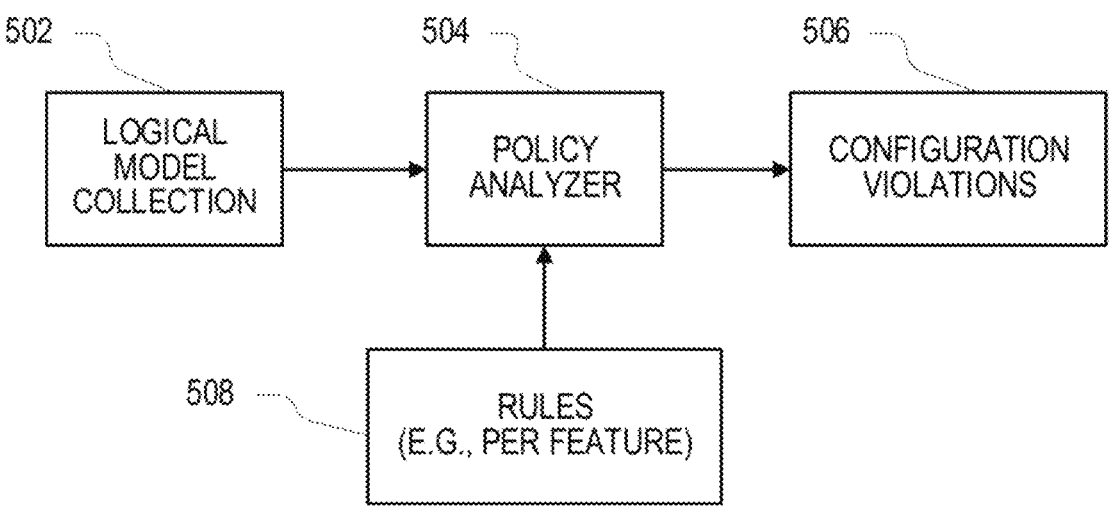
FIG. 5A illustrates a schematic diagram of example inputs and outputs of an example policy analyzer.

FIG. 5A illustrates a schematic diagram of an example system for policy analysis in a network (e.g., Network Environment 100). Policy Analyzer 504 can perform assurance checks to detect configuration violations, logical lint events, contradictory or conflicting policies, unused contracts, incomplete configurations, routing checks, rendering errors, incorrect rules, etc. Policy Analyzer 504 can check the specification of the user's intent or intents in L_Model 270A (or Logical Model 270 as shown in FIG. 4) to determine if any configurations in Controllers 116 are inconsistent with the specification of the user's intent or intents.

Policy Analyzer 504 can include one or more of the Operators 310 executed or hosted in Assurance Appliance System 300. However, in other configurations, Policy Analyzer 504 can run one or more operators or engines that are separate from Operators 310 and/or Assurance Appliance System 300. For example, Policy Analyzer 504 can be implemented via a VM, a software container, a cluster of VMs or software containers, an endpoint, a collection of endpoints, a service function chain, etc., any of which may be separate from Assurance Appliance System 300.

Policy Analyzer 504 can receive as input Logical Model Collection 502, which can include Logical Model 270 as shown in FIG. 4; and/or L_Model 270A, LR_Model 270B, and/or Li_Model 272 as shown in FIG. 2D. Policy Analyzer 504 can also receive as input Rules 508. Rules 508 can be defined, for example, per feature (e.g., per object, per object property, per contract, per rule, etc.) in one or more logical models from the Logical Model Collection 502. Rules 508 can be based on objects, relationships, definitions, configurations, and any other features in MIM 200. Rules 508 can specify conditions, relationships, parameters, and/or any other information for identifying configuration violations or issues.

Rules 508 can include information for identifying syntactic violations or issues. For example, Rules 508 can include one or more statements and/or conditions for performing syntactic checks. Syntactic checks can verify that the configuration of a logical model and/or the Logical Model Collection 502 is complete, and can help identify configurations or rules from the logical model and/or the Logical Model Collection 502 that are not being used. Syntactic checks can also verify that the configurations in the hierarchical MIM 200 have been properly or completely defined in the Logical Model Collection 502, and identify any configurations that are defined but not used. To illustrate, Rules 508 can specify that every tenant defined in the Logical Model Collection 502 should have a context configured; every contract in the Logical Model Collection 502 should specify a provider EPG and a consumer EPG; every contract in the Logical Model Collection 502 should specify a subject, filter, and/or port; etc.

Rules 508 can also include information for performing semantic checks and identifying semantic violations. Semantic checks can check conflicting rules or configurations. For example, Rule1 and Rule2 can overlap and create aliasing issues, Rule1 can be more specific than Rule2 and result in conflicts, Rule1 can mask Rule2 or inadvertently overrule Rule2 based on respective priorities, etc. Thus, Rules 508 can define conditions which may result in aliased rules, conflicting rules, etc. To illustrate, Rules 508 can indicate that an allow policy for a communication between two objects may conflict with a deny policy for the same communication between two objects if the allow policy has a higher priority than the deny policy. Rules 508 can indicate that a rule for an object renders another rule unnecessary due to aliasing and/or priorities. As another example, Rules 508 can indicate that a QoS policy in a contract conflicts with a QoS rule stored on a node.

Policy Analyzer 504 can apply Rules 508 to the Logical Model Collection 502 to check configurations in the Logical Model Collection 502 and output Configuration Violation Events 506 (e.g., alerts, logs, notifications, etc.) based on any issues detected. Configuration Violation Events 506 can include semantic or semantic problems, such as incomplete configurations, conflicting configurations, aliased rules, unused configurations, errors, policy violations, misconfigured objects, incomplete configurations, incorrect contract scopes, improper object relationships, etc.

In some cases, Policy Analyzer 504 can iteratively traverse each node in a tree generated based on the Logical Model Collection 502 and/or MIM 200, and apply Rules 508 at each node in the tree to determine if any nodes yield a violation (e.g., incomplete configuration, improper configuration, unused configuration, etc.). Policy Analyzer 504 can output Configuration Violation Events 506 when it detects any violations.

Figure 5B:
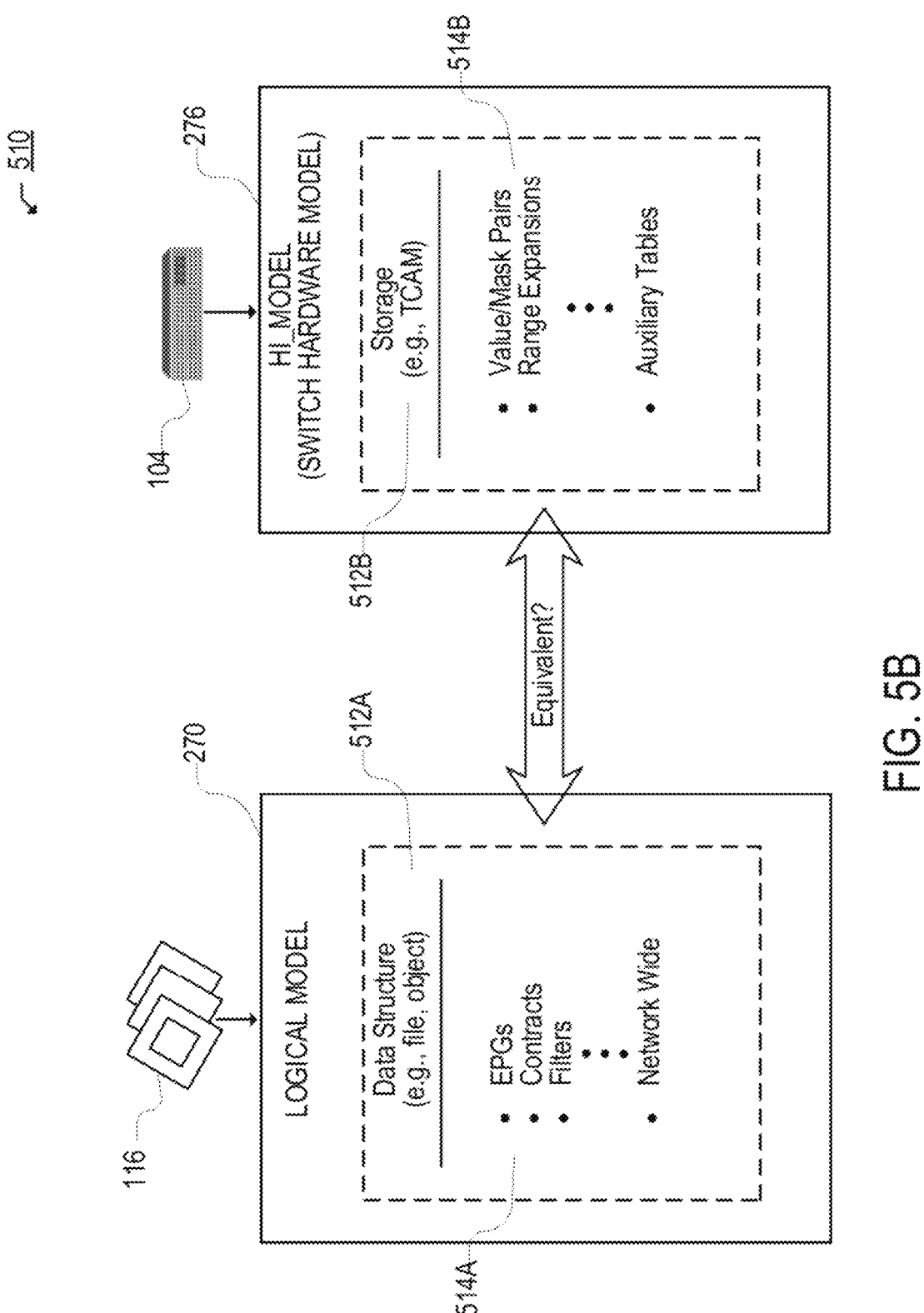
FIG. 5B illustrates an equivalency diagram for determin-ing equivalence between different network models.

FIG. 5B illustrates an example equivalency diagram 510 of network models. In this example, the Logical Model 270 can be compared with the Hi_Model 276 obtained from one or more Leafs 104 in the Fabric 120. This comparison can provide an equivalency check in order to determine whether the logical configuration of the Network Environment 100 at the Controller(s) 116 is consistent with, or conflicts with, the rules rendered on the one or more Leafs 104 (e.g., rules and/or configurations in storage, such as TCAM). For explanation purposes, Logical Model 270 and Hi_Model 276 are illustrated as the models compared in the equivalency check example in FIG. 5B. However, it should be noted that, in other examples, other models can be checked to perform an equivalency check for those models. For example, an equivalency check can compare Logical Model 270 with Ci_Model 274 and/or Hi_Model 276, Li_Model 272 with Ci_Model 274 and/or Hi_Model 276, Ci_Model 274 with Hi_Model 276, etc.

Equivalency checks can identify whether the network operator's configured intent is consistent with the network's actual behavior, as well as whether information propagated between models and/or devices in the network is consistent, conflicts, contains errors, etc. For example, a network operator can define objects and configurations for Network Environment 100 from Controller(s) 116. Controller(s) 116 can store the definitions and configurations from the network operator and construct a logical model (e.g., L_Model 270A) of the Network Environment 100. The Controller(s) 116 can push the definitions and configurations provided by the network operator and reflected in the logical model to each of the nodes (e.g., Leafs 104) in the Fabric 120. In some cases, the Controller(s) 116 may push a node-specific version of the logical model (e.g., Li_Model 272) that reflects the information in the logical model of the network (e.g., L_Model 270A) pertaining to that node.

The nodes in the Fabric 120 can receive such information and render or compile rules on the node's software (e.g., Operating System). The rules/configurations rendered or compiled on the node's software can be constructed into a Construct Model (e.g., Ci_Model 274). The rules from the Construct Model can then be pushed from the node's software to the node's hardware (e.g., TCAM) and stored or rendered as rules on the node's hardware. The rules stored or rendered on the node's hardware can be constructed into a Hardware Model (e.g., Hi_Model 276) for the node.

The various models (e.g., Logical Model 270 and Hi_Model 276) can thus represent the rules and configurations at each stage (e.g., intent specification at Controller(s) 116, rendering or compiling on the node's software, rendering or storing on the node's hardware, etc.) as the definitions and configurations entered by the network operator are pushed through each stage. Accordingly, an equivalency check of various models, such as Logical Model 270 and Hi_Model 276, Li_Model 272 and Ci_Model 274 or Hi_Model 276, Ci_Model 274 and Hi_Model 276, etc., can be used to determine whether the definitions and configurations have been properly pushed, rendered, and/or stored at any stage associated with the various models.

If the models pass the equivalency check, then the definitions and configurations at checked stage (e.g., Controller(s) 116, software on the node, hardware on the node, etc.) can be verified as accurate and consistent. By contrast, if there is an error in the equivalency check, then a misconfiguration can be detected at one or more specific stages. The equivalency check between various models can also be used to determine where (e.g., at which stage) the problem or misconfiguration has occurred. For example, the stage where the problem or misconfiguration occurred can be ascertained based on which model(s) fail the equivalency check.

The Logical Model 270 and Hi_Model 276 can store or render the rules, configurations, properties, definitions, etc., in a respective structure 512A, 512B. For example, Logical Model 270 can store or render rules, configurations, objects, properties, etc., in a data structure 512A, such as a file or object (e.g., JSON, XML, etc.), and Hi_Model 276 can store or render rules, configurations, etc., in a storage 512B, such as TCAM memory. The structure 512A, 512B associated with Logical Model 270 and Hi_Model 276 can influence the format, organization, type, etc., of the data (e.g., rules, configurations, properties, definitions, etc.) stored or rendered.

For example, Logical Model 270 can store the data as objects and object properties 514A, such as EPGs, contracts, filters, tenants, contexts, BDs, network wide parameters, etc. The Hi_Model 276 can store the data as values and tables 514B, such as value/mask pairs, range expressions, auxiliary tables, etc.

As a result, the data in Logical Model 270 and Hi_Model 276 can be normalized, canonized, diagramed, modeled, re-formatted, flattened, etc., to perform an equivalency between Logical Model 270 and Hi_Model 276. For example, the data can be converted using bit vectors, Boolean functions, ROBDDs, etc., to perform a mathematical check of equivalency between Logical Model 270 and Hi_Model 276.

Figure 5C:
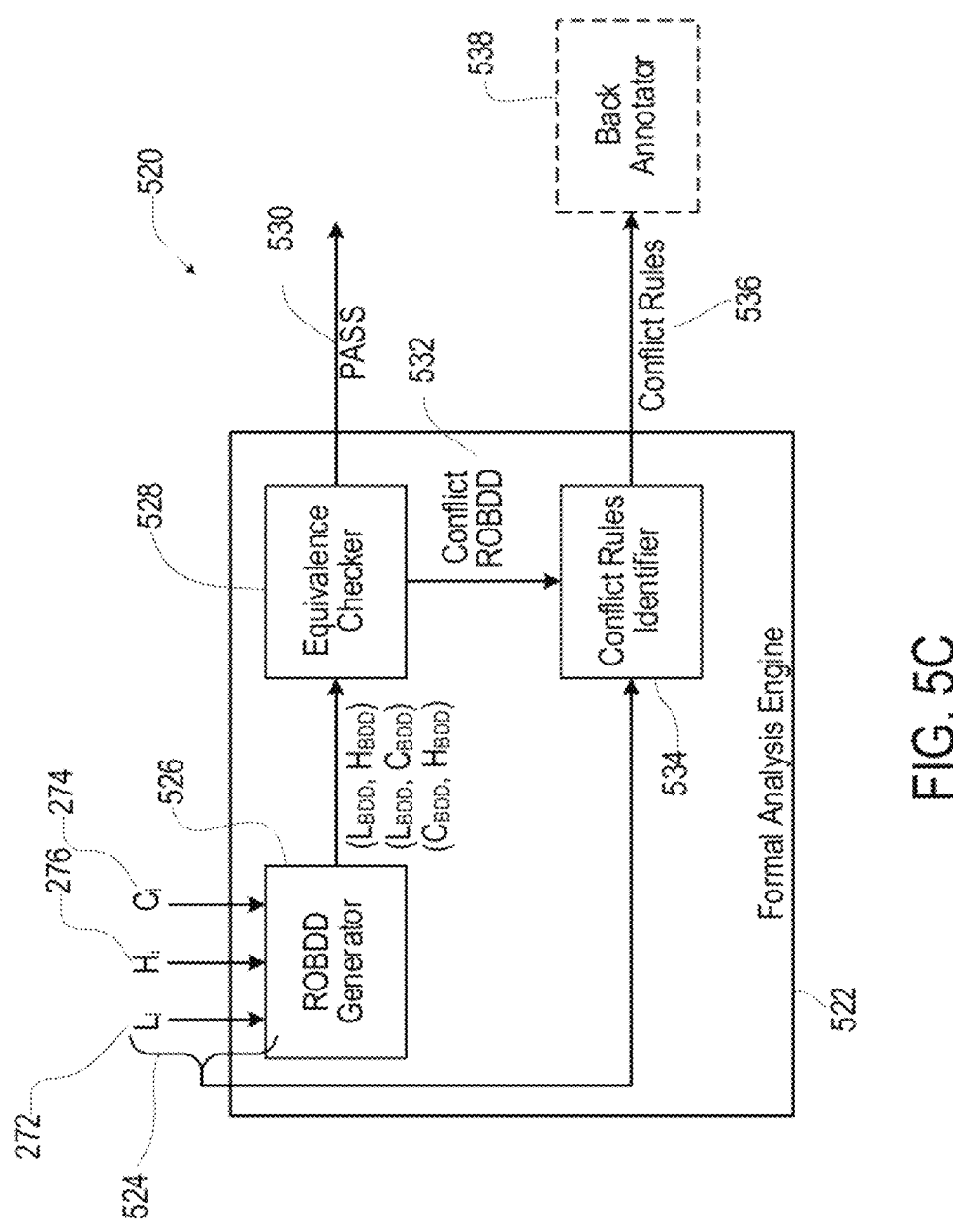
FIG. 5C illustrates an example architecture for perform-ing equivalence checks and identifying conflict rules.

FIG. 5C illustrates example Architecture 520 for performing equivalence checks of models. Rather than employing brute force to determine the equivalence of input models, the network models can instead be represented as specific data structures, such as Reduced Ordered Binary Decision Diagrams (ROBDDs) and/or bit vectors. In this example, input models are represented as ROBDDs, where each ROBDD is canonical (unique) to the input rules and their priority ordering.

Each network model is first converted to a flat list of priority ordered rules. In some examples, contracts can be specific to EPGs and thus define communications between EPGs, and rules can be the specific node-to-node implementation of such contracts. Architecture 520 includes a Formal Analysis Engine 522. In some cases, Formal Analysis Engine 522 can be part of Policy Analyzer 504 and/or Assurance Appliance System 300. For example, Formal Analysis Engine 522 can be hosted within, or executed by, Policy Analyzer 504 and/or Assurance Appliance System 300. To illustrate, Formal Analysis Engine 522 can be implemented via one or more operators, VMs, containers, servers, applications, service functions, etc., on Policy Analyzer 504 and/or Assurance Appliance System 300. In other cases, Formal Analysis Engine 522 can be separate from Policy Analyzer 504 and/or Assurance Appliance System 300. For example, Formal Analysis Engine 522 can be a standalone engine, a cluster of engines hosted on multiple systems or networks, a service function chain hosted on one or more systems or networks, a VM, a software container, a cluster of VMs or software containers, a cloud-based service, etc.

Formal Analysis Engine 522 includes an ROBDD Generator 526. ROBDD Generator 526 receives Input 524 including flat lists of priority ordered rules for Models 272, 274, 276 as shown in FIG. 2D. These rules can be represented as Boolean functions, where each rule consists of an action (e.g. Permit, Permit_Log, Deny, Deny_Log) and a set of conditions that will trigger that action (e.g. one or more configurations of traffic, such as a packet source, destination, port, header, QoS policy, priority marking, etc.). For example, a rule might be designed as Permit all traffic on port 80. In some examples, each rule might be an n-bit string with m-fields of key-value pairs. For example, each rule might be a 147 bit string with 13 fields of key-value pairs.

As a simplified example, consider a flat list of the priority ordered rules L1, L2, L3, and L4 in Li_Model 272, where L1 is the highest priority rule and L4 is the lowest priority rule. A given packet is first checked against rule L1. If L1 is triggered, then the packet is handled according to the action contained in rule L1. Otherwise, the packet is then checked against rule L2. If L2 is triggered, then the packet is handled according to the action contained in rule L2. Otherwise, the packet is then checked against rule L3, and so on, until the packet either triggers a rule or reaches the end of the listing of rules.

The ROBDD Generator 526 can calculate one or more ROBDDs or BDDs (binary decision diagrams) for the constituent rules L1-L4 of one or more models. An ROBDD can be generated for each action encoded by the rules L1-L4, or each action that may be encoded by the rules L1-L4, such that there is a one-to-one correspondence between the number of actions and the number of ROBDDs or BDDs generated. For example, the rules L1-L4 might be used to generate BDDs 540, including $L\_Permit_{BDD}$, $L\_Permit\_Log_{BDD}$, $L\_Deny_{BDD}$, and $L\_Deny\_Log_{BDD}$.

Generally, ROBDD Generator 526 begins its calculation with the highest priority rule of Input 524 in the listing of rules received. Continuing the example of rules L1-L4 in Li_Model 272, ROBDD Generator 526 begins with rule L1. Based on the action specified by rule L1 (e.g. Permit, Permit_Log, Deny, Deny_Log), rule L1 is added to the corresponding ROBDD for that action. Next, rule L2 will be added to the corresponding ROBDD for the action that it specifies. In some examples, a reduced form of L2 can be used, given by L1'L2, with L1' denoting the inverse of Li. This process is then repeated for rules L3 and L4, which have reduced forms given by (L1+L2)'L3 and (L1+L2+L3) 'L4, respectively.

Notably, $L\_Permit_{BDD}$ and each of the other action-specific ROBDDs encode the portion of each constituent rule L1, L2, L3, L4 that is not already captured by higher priority rules. That is, L1'L2 represents the portion of rule L2 that does not overlap with rule L1, (L1+L2)'L3 represents the portion of rule L3 that does not overlap with either rules L1 or L2, and (L1+L2+L3)'L4 represents the portion of rule L4 that does not overlap with either rules L1 or L2 or L3. This reduced form can be independent of the action specified by an overlapping or higher priority rule and can be calculated based on the conditions that will cause the higher priority rules to trigger.

ROBDD Generator 526 likewise can generate an ROBDD for each associated action of the remaining models associated with Input 524, such as Ci_Model 274 and Hi_Model 276 in this example, or any other models received by ROBDD Generator 526. From the ROBDDs generated, the formal equivalence of any two or more ROBDDs of models can be checked via Equivalence Checker 528, which builds a conflict ROBDD encoding areas of conflict between input ROBDDs.

In some examples, the ROBDDs being compared will be associated with the same action. For example, Equivalence Checker 528 can check the formal equivalence of $L\_Permit_{BDD}$ against $H\_Permit_{BDD}$ by calculating the exclusive disjunction between $L\_Permit_{BDD}$ and $H\_Permit_{BDD}$. More particularly, $L\_Permit_{BDD}$ (D $H\_Permit_{BDD}$ (i.e. $L\_Permit_{BDD}$ XOR $H\_Permit_{BDD}$) is calculated, although it is understood that the description below is also applicable to other network models (e.g., Logical Model 270, L_Model 270A, LR_Model 270B, Li_Model 272, Ci_Model 274, Hi_Model 276, etc.) and associated actions (Permit, Permit_Log, Deny, Deny_Log, etc.).

Figure 6A:
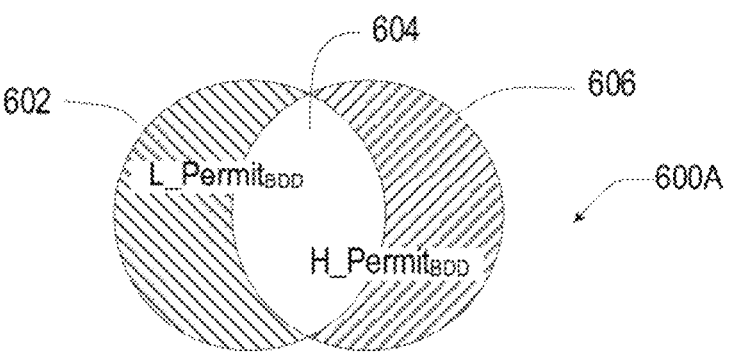
FIGS. 6A through 6C illustrate example Reduced Ordered Binary Decision Diagrams.

An example calculation is illustrated in FIG. 6A, which depicts a simplified representation of a Permit conflict ROBDD 600A calculated for $L\_Permit_{BDD}$ and $H\_Permit_{BDD}$. As illustrated, $L\_Permit_{BDD}$ includes a unique portion 602 (shaded) and an overlap 604 (unshaded). Similarly, $H\_Permit_{BDD}$ includes a unique portion 606 (shaded) and the same overlap 604.

The Permit conflict ROBDD 600A includes unique portion 602, which represents the set of packet configurations and network actions that are encompassed within $L\_Permit_{BDD}$ but not $H\_Permit_{BDD}$ (i.e. calculated as $L\_Permit_{BDD}*H\_Permit_{BDD}'$), and unique portion 606, which represents the set of packet configurations and network actions that are encompassed within $H\_Permit_{BDD}$ but not $L\_Permit_{BDD}$ (i.e. calculated as $L\_Permit_{BDD}'*H\_Permit_{BDD}$). Note that the unshaded overlap 604 is not part of Permit conflict ROBDD 600A.

Conceptually, the full circle illustrating $L\_Permit_{BDD}$ (e.g. unique portion 602 and overlap 604) represents the fully enumerated set of packet configurations that are encompassed within, or trigger, the Permit rules encoded by input model Li_Model 272. For example, assume Li_Model 272 contains the rules:

L1: port=[1-3] Permit; L2: port=4 Permit; L3: port=[6-8] Permit; L4: port=9 Deny;

where 'port' represents the port number of a received packet, then the circle illustrating $L\_Permit_{BDD}$ contains the set of all packets with port=[1-3], 4, [6-8] that are permitted. Everything outside of this full circle represents the space of packet conditions and/or actions that are different from those specified by the Permit rules contained in Li_Model 272. For example, rule L4 encodes port=9 Deny and would fall outside of the region carved out by $L\_Permit_{BDD}$.

Similarly, the circle illustrating $H\_Permit_{BDD}$ (e.g., unique portion 606 and overlap 604) represents the fully enumerated set of packet configurations and network actions encompassed within, or triggering, the Permit rules encoded by the input model Hi_Model 276, which contains the rules and/or configurations rendered in hardware. Assume that Hi_Model 276 contains rules:

> H1: port=[1-3] Permit; H2: port=5 Permit; H3: port=[6-8] Deny; H4: port=10 Deny_Log.

In the comparison between $L\_Permit_{BDD}$ and $H\_Permit_{BDD}$, only rules L1 and H1 are equivalent, because they match on both packet condition and action. L2 and H2 are not equivalent because even though they specify the same action (Permit), this action is triggered on a different port number (4 vs. 5). L3 and H3 are not equivalent because even though they trigger on the same port number (6-8), they trigger different actions (Permit vs. Deny). L4 and H4 are not equivalent because they trigger on a different port number (9 vs. 10) and also trigger different actions (Deny vs. Deny_Log). As such, overlap 604 contains only the set of packets that are captured by Permit rules L1 and H1, i.e., the packets with port=[1-3] that are permitted. Unique portion 602 contains only the set of packets that are captured by Permit rules L2 and L3, while unique portion 606 contains only the set of packets that are captured by Permit rule H2. These two unique portions encode conflicts between the packet conditions upon which Li_Model 272 will trigger a Permit, and the packet conditions upon which the hardware rendered Hi_Model 276 will trigger a Permit. Consequently, it is these two unique portions 602 and 606 that make up Permit conflict ROBDD 600A. The remaining rules L4, H3, and H4 are not Permit rules and consequently are not represented in $L\_Permit_{BDD}$, $H\_Permit_{BDD}$, or Permit conflict ROBDD 600A.

In general, the action-specific overlaps between any two models contain the set of packets that will trigger the same action no matter whether the rules of the first model or the rules of the second model are applied, while the action-specific conflict ROBDDs between these same two models contains the set of packets that result in conflicts by way of triggering on a different condition, triggering a different action, or both.

It should be noted that in the example above with respect to FIG. 6A, Li_Model 272 and Hi_Model 276 are used as example input models for illustration purposes, but other models may be used. For example, in some cases, a conflict ROBDD can be calculated based on Logical Model 270, shown in FIG. 4, and/or any of the models 270A, 270B, 272, 274, 276 shown in FIG. 2D.

Figure 6B:
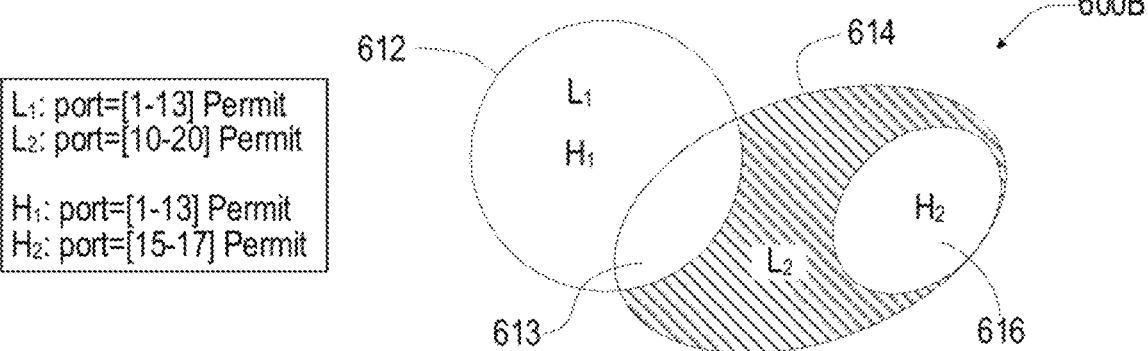
Figure 6C:
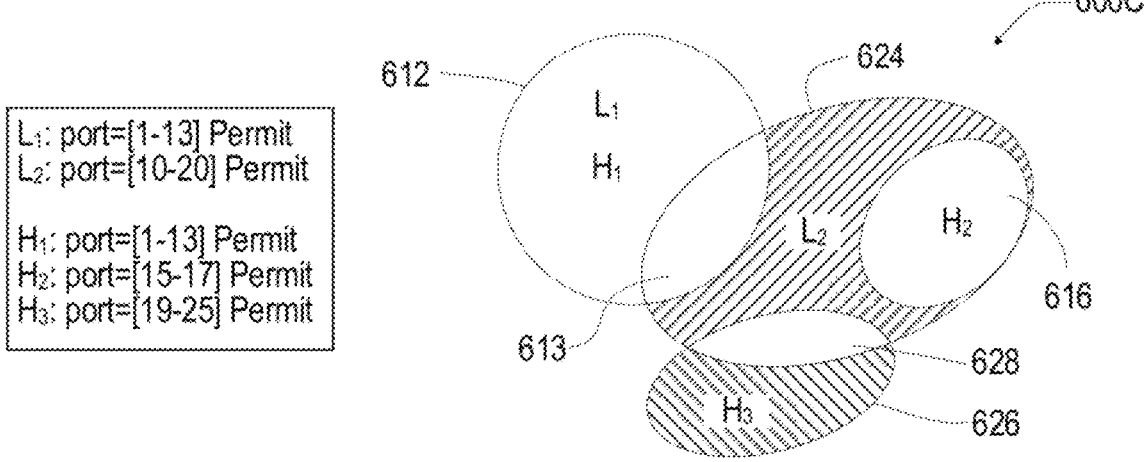

Moreover, for purposes of clarity in the discussion above, Permit conflict ROBDD 600A portrays $L\_Permit_{BDD}$ and $H\_Permit_{BDD}$ as singular entities rather than illustrating the effect of each individual rule. Accordingly, FIGS. 6B and 6C present Permit conflict ROBDDs with individual rules depicted. FIG. 6B presents a Permit conflict ROBDD 600B taken between the listing of rules L1, L2, H1, and H2. FIG. 6C presents a Permit conflict ROBDD 600C that adds rule H3 to Permit conflict ROBDD 600B. Both Figures maintain the same shading convention introduced in FIG. 6A, wherein a given conflict ROBDD comprises only the shaded regions that are shown.

Turning to FIG. 6B, illustrated is a Permit conflict ROBDD 600B that is calculated across a second $L\_Permit_{BDD}$ consisting of rules L1 and L2, and a second $H\_Permit_{BDD}$ consisting of rules H1 and H2. As illustrated, rules L1 and H1 are identical, and entirely overlap with one another—both rules consists of the overlap 612 and overlap 613. Overlap 612 is common between rules L1 and H1, while overlap 613 is common between rules L1, H1, and L2. For purposes of subsequent explanation, assume that rules L1 and H1 are both defined by port=[1-13] Permit.

Rules L2 and H2 are not identical. Rule L2 consists of overlap 613, unique portion 614, and overlap 616. Rule H2 consists only of overlap 616, as it is contained entirely within the region encompassed by rule L2. For example, rule L2 might be port=[10-20] Permit, whereas rule H2 might be port=[15-17] Permit. Conceptually, this is an example of an error that might be encountered by a network assurance check, wherein an Li_Model 272 rule (e.g., L2) specified by a user intent was incorrectly rendered into a node's memory (e.g., switch TCAM) as an Hi_Model 276 rule (e.g., H2). In particular, the scope of the rendered Hi_Model 276 rule H2 is smaller than the intended scope specified by the user intent contained in L2. For example, such a scenario could arise if a switch TCAM runs out of space, and does not have enough free entries to accommodate a full representation of an Li_Model 272 rule.

Regardless of the cause, this error is detected by the construction of the Permit conflict ROBDD 600B as $L\_Permit_{BDD} \oplus Permit_{BDD}$, where the results of this calculation are indicated by the shaded unique portion 614. This unique portion 614 represents the set of packet configurations and network actions that are contained within $L\_Permit_{BDD}$ but not $H\_Permit_{BDD}$. In particular, unique portion 614 is contained within the region encompassed by rule L2 but is not contained within either of the regions encompassed by rules H1 and H2, and specifically comprises the set defined by port=[14,18-20] Permit.

To understand how this is determined, recall that rule L2 is represented by port=[10-20] Permit. Rule H1 carves out the portion of L2 defined by port=[10-13] Permit, represented as overlap 613. Rule H2 carves out the portion of L2 defined by port=[15-17] Permit, represented as overlap 616. This leaves port=[14,18-20] Permit as the non-overlap portion of the region encompassed by L2. In other words, unique portion 614 includes Permit conflict ROBDD 600B.

FIG. 6C illustrates Permit conflict ROBDD 600C which is identical to Permit conflict ROBDD 600B with the exception of a newly added rule, H3: port=[19-25] Permit. Rule H3 includes an overlap portion 628, which represents the set of conditions and actions contained in rules H3 and L2, and further consists of a unique portion 626, which represents the set of conditions and actions that are contained only in rule H3. Conceptually, this could represent an error wherein an Li_Model 272 rule (e.g., L2) specified by a user intent was incorrectly rendered into node memory as two Hi_Model 276 rules (e.g., H2 and H3). There is no inherent fault with a single Li_Model 272 rule being represented as multiple Hi_Model 276 rules. Rather, the fault herein lies in the fact that the two corresponding Hi_Model 276 rules do not adequately capture the full extent of the set of packet configurations encompassed by Permit rule L2. Rule H2 is too narrow in comparison to rule L2, as discussed above with respect to FIG. 6B, and rule H3 is both too narrow and improperly extended beyond the boundary of the region encompasses by rule L2.

As was the case before, this error is detected by the construction of the conflict ROBDD 600C, as $L\_Permit_{BDD} \oplus H\_Permit_{BDD}$, where the results of this calculation are indicated by the shaded unique portion 624, representing the set of packet configurations and network actions that are contained within $L\_Permit_{BDD}$ but not $H\_Permit_{BDD}$, and the shaded unique portion 626, representing the set of packet configurations and network actions that are contained within $H\_Permit_{BDD}$ but not $L\_Permit_{BDD}$. In particular, unique portion 624 is contained only within rule L2, and comprises the set defined by port=[14, 18] Permit, while unique portion 626 is contained only within rule H3, and comprises the set defined by port=[21-25] Permit. Thus, Permit conflict ROBDD 600C comprises the set defined by port=[14, 18, 21-25] Permit.

Reference is made above only to Permit conflict ROBDDs, although it is understood that conflict ROBDDs are generated for each action associated with a given model. For example, a complete analysis of the Li_Model 272 and Hi_Model 276 mentioned above might entail using ROBDD Generator 526 to generate the eight ROBDDs L_Permit$_{BDD}$, L_Permit_Log$_{BDD}$, L_Deny$_{BDD}$, and L_Deny_Log$_{BDD}$, H_Permit$_{BDD}$, H_Permit_Log$_{BDD}$, H_Deny$_{BDD}$, and H_Deny_Log$_{BDD}$, and then using Equivalence Checker 528 to generate a Permit conflict ROBDD, Permit_Log conflict ROBDD, Deny conflict ROBDD, and Deny_Log conflict ROBDD.

In general, Equivalence Checker 528 generates action-specific conflict ROBDDs based on input network models, or input ROBDDs from ROBDD Generator 526. As illustrated in FIG. 5C, Equivalence Checker 528 receives the input pairs (L$_{BDD}$, H$_{BDD}$), (L$_{BDD}$, C$_{BDD}$), (C$_{BDD}$, H$_{BDD}$), although it is understood that these representations are for clarity purposes, and may be replaced with any of the action-specific ROBDDs discussed above. From these action-specific conflict ROBDDs, Equivalence Checker 528 may determine that there is no conflict between the inputs— that is, a given action-specific conflict ROBDD is empty. In the context of the examples of FIGS. 6A-6C, an empty conflict ROBDD would correspond to no shaded portions being present. In the case where this determination is made for the given action-specific conflict ROBDD, Equivalence Checker 528 might generate a corresponding action-specific "PASS" indication 530 that can be transmitted externally from formal analysis engine 522.

However, if Equivalence Checker 528 determines that there is a conflict between the inputs, and that a given action-specific conflict ROBDD is not empty, then Equivalence Checker 528 will not generate PASS indication 530, and can instead transmit the given action-specific conflict ROBDD 532 to a Conflict Rules Identifier 534, which identifies the specific conflict rules that are present. In some examples, an action-specific "PASS" indication 530 can be generated for every action-specific conflict ROBDD that is determined to be empty. In some examples, the "PASS" indication 530 might only be generated and/or transmitted once every action-specific conflict ROBDD has been determined to be empty.

If one or more action-specific conflict ROBDDs are received, Conflict Rules Identifier 534 may receive as input the flat listing of priority ordered rules that are represented in each of the conflict ROBDDs 532. For example, if Conflict Rules Identifier 534 receives the Permit conflict ROBDD corresponding to L_Permit$_{BDD}$⊕H_Permit$_{BDD}$, the flat listings of priority ordered rules Li, Hi used to generate L_Permit$_{BDD}$ and H_Permit$_{BDD}$ are also received as input.

The Conflict Rules Identifier 534 then identifies specific conflict rules from each listing of priority ordered rules and builds a listing of conflict rules 536. In order to do so, Conflict Rules Identifier 534 iterates through the rules contained within a given listing and calculates the intersection between the set of packet configurations and network actions that is encompassed by each given rule, and the set that is encompassed by the action-specific conflict ROBDD. For example, assume that a list of j rules was used to generate L_Permit$_{BDD}$. For each rule j, Conflict Rules Identifier 534 computes:

$$(L\_Permit_{BDD} \oplus H\_Permit_{BDD})^*L_j$$

If this calculation equals zero, then the given rule L$_j$ is not part of the conflict ROBDD and therefore is not a conflict rule. If this calculation does not equal zero, the given rule L$_j$ is part of the Permit conflict ROBDD and is a conflict rule that is added to the listing of conflict rules 536.

For example, in FIG. 6C, Permit conflict ROBDD 600C includes the shaded portions 624 and 626. Starting with the two rules L1, L2 used to generate L_Permit$_{BDD}$, it can be calculated that:

$$(L\_Permit_{BDD} \oplus H\_Permit_{BDD})^*L1=0$$

Thus, rule L1 does not overlap with Permit conflict ROBDD 600C and therefore is not a conflict rule. However, it can be calculated that:

$$(L\_Permit_{BDD} \oplus H\_Permit_{BDD})^*L2 \neq 0$$

Meaning that rule L2 does overlap with Permit conflict ROBDD 600C at overlap portion 624 and therefore is a conflict rule and is added to the listing of conflict rules 536.

The same form of computation can also be applied to the list of rules H1, H2, H3, used to generate H_Permit$_{BDD}$. It can be calculated that:

$$(L\_Permit_{BDD} \oplus H\_Permit_{BDD})^*H1=0$$

Thus, rule H1 does not overlap with Permit conflict ROBDD 600C and therefore is not a conflict rule. It can also be calculated that:

$$(L\_Permit_{BDD} \oplus H\_Permit_{BDD})^*H2=0$$

Thus, rule H2 does not overlap with Permit conflict ROBDD 600C and therefore is not a conflict rule. Finally, it can be calculated that:

$$(L\_Permit_{BDD} \oplus H\_Permit_{BDD})^*H3 \neq 0$$

Meaning that rule H2 does overlap with Permit conflict ROBDD 600C at overlap portion 626 and therefore is a conflict rule and can be added to the listing of conflict rules 552. In the context of the present example, the complete listing of conflict rules 536 derived from Permit conflict ROBDD 600C is {L2, H3}, as one or both of these rules have been configured or rendered incorrectly.

In some examples, one of the models associated with the Input 524 may be treated as a reference or standard, meaning that the rules contained within that model are assumed to be correct. As such, Conflict Rules Identifier 536 only needs to compute the intersection of a given action-specific conflict ROBDD and the set of associated action-specific rules from the non-reference model. For example, the Li_Model 272 can be treated as a reference or standard, because it is directly derived from user inputs used to define L_Model 270A, 270B. The Hi_Model 276, on the other hand, passes through several transformations before being rendered into a node's hardware, and is therefore more likely to be subject to error. Accordingly, the Conflict Rules Identifier 534 would only compute $$(L\_Permit_{BDD} \oplus H\_Permit_{BDD})^*H_j$$

for each of the rules (or each of the Permit rules) j in the Hi_Model 276, which can cut the required computation time significantly.

Additionally, Conflict Rules Identifier 534 need not calculate the intersection of the action-specific conflict ROBDD and the entirety of each rule, but instead, can use a priority-reduced form of each rule. In other words, this is the form in which the rule is represented within the ROBDD. For example, the priority reduced form of rule H2 is H1'H2, or the contribution of rule H2 minus the portion that is already captured by rule H1. The priority reduced form of rule H3 is (H1+H2)'H3, or the contribution of rule H3 minus the portion that is already captured by rules H1 or H2. The priority reduced form of rule H4 is (H1+H2+H3)'H4, or the contribution of rule H4 minus the portion that is already captured by rules H1 and H2 and H3.

As such, the calculation instead reduces to:

$$(L\_Permit_{BDD} \oplus H\_Permit_{BDD})*(H1+ \ldots +H_{j-1})'H_j$$

for each rule (or each Permit rule) j that is contained in the Hi_Model 276. While there are additional terms introduced in the equation above as compared to simply calculating:

$$(L\_Permit_{BDD} \oplus H\_Permit_{BDD})*H_j,$$

the priority-reduced form is computationally more efficient. For each rule j, the priority-reduced form (H1+ . . . +H$_{j-1}$)'H$_j$ encompasses a smaller set of packet configurations and network actions, or an equally-sized set as compared to the non-reduced form H$_j$. The smaller the set for which intersection calculation is performed against the conflict ROBDD, the more efficient the computation.

In some cases, Conflict Rules Identifier 534 can output a listing of conflict rules 536 (whether generated from both input models, or a single, non-reference input model) to a destination external to Formal Analysis Engine 522. For example, the conflict rules 536 can be provided to a user to help the user better understand the specific reason that a conflict occurred between models.

In some examples, a Back Annotator 538 can be disposed between Conflict Rules Identifier 534 and the external output. Back Annotator 538 can associate each given rule from the conflict rules listing 536 with the specific parent contract or other high-level intent that led to the given rule being generated. In this manner, not only is a formal equivalence failure explained to a user in terms of the specific rules that are in conflict, the equivalence failure is also explained to the user in terms of the high-level user action, configuration, or intent that was entered into the network and ultimately created the conflict rule. In this manner, a user can more effectively address conflict rules, by adjusting or otherwise targeting them at their source or parent.

In some examples, the listing of conflict rules 536 may be maintained and/or transmitted internally to Formal Analysis Engine 522, to enable further network assurance analyses and operations such as event generation, counter-example generation, QoS assurance, etc.

Figure 7:
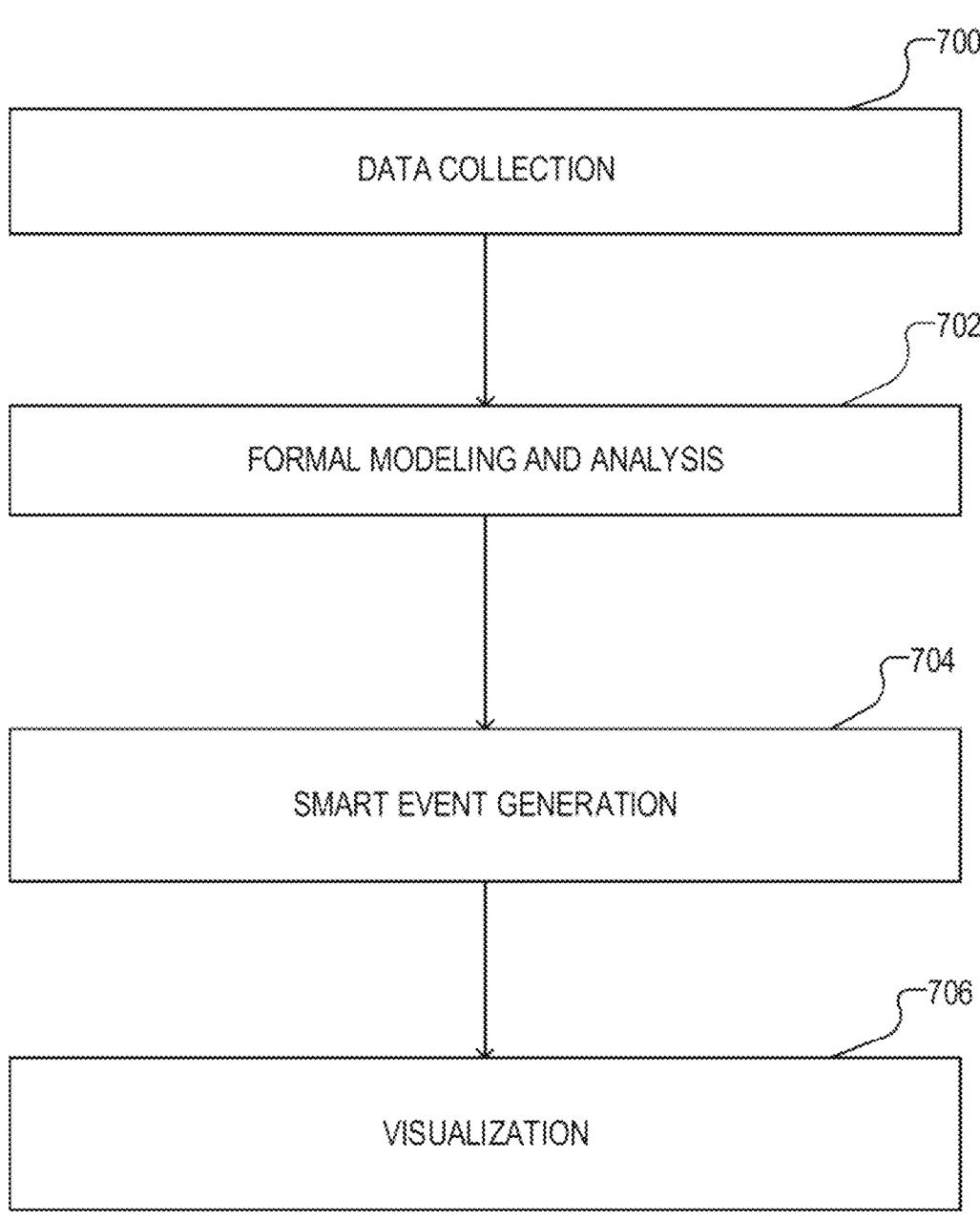
FIG. 7 illustrates an example method for network assur-ance.

The disclosure now turns to FIG. 7, which illustrate an example method for general network assurance. The method is provided by way of example, as there are a variety of ways to carry out the method. Additionally, while the example method is illustrated with a particular order of blocks or steps, those of ordinary skill in the art will appreciate that FIG. 7, and the blocks shown therein, can be executed in any order and can include fewer or more blocks than illustrated.

Each block shown in FIG. 7 represents one or more steps, processes, methods or routines in the method. For the sake of clarity and explanation purposes, the blocks in FIG. 7 are described with reference to Network Environment 100, Assurance Appliance System 300, and Network Models 270, 270A-B, 272, 274, 276, Policy Analyzer 504, and Formal Equivalence Engine 522, as shown in FIGS. 1A-B, 2D, 3A, 5A, and 5C.

With reference to FIG. 7, at step 700, Assurance Appliance System 300 can collect data and obtain models associated with Network Environment 100. The models can include Logical Model 270, as shown in FIG. 4, and/or any of Models 270A-B, 272, 274, 276, as shown in FIG. 2D. The data can include fabric data (e.g., topology, switch, interface policies, application policies, etc.), network configurations (e.g., BDs, VRFs, L2 Outs, L3 Outs, protocol configurations, etc.), QoS policies (e.g., DSCP, priorities, bandwidth, queuing, transfer rates, SLA rules, performance settings, etc.), security configurations (e.g., contracts, filters, etc.), application policies (e.g., EPG contracts, application profile settings, application priority, etc.), service chaining configurations, routing configurations, etc. Other non-limiting examples of information collected or obtained can include network data (e.g., RIB/FIB, VLAN, MAC, ISIS, DB, BGP, OSPF, ARP, VPC, LLDP, MTU, network or flow state, logs, node information, routes, etc.), rules and tables (e.g., TCAM rules, ECMP tables, routing tables, etc.), endpoint dynamics (e.g., EPM, COOP EP DB, etc.), statistics (e.g., TCAM rule hits, interface counters, bandwidth, packets, application usage, resource usage patterns, error rates, latency, dropped packets, etc.).

At step 702, Assurance Appliance System 300 can analyze and model the received data and models. For example, Assurance Appliance System 300 can perform formal modeling and analysis, which can involve determining equivalency between models, including configurations, policies, etc. Assurance Appliance System 300 can analyze and/or model some or all portions of the data and models. For example, in some cases, Assurance Appliance System 300 may analyze and model contracts, policies, rules, and state data, but exclude other portions of information available.

At step 704, Assurance Appliance System 300 can generate one or more smart events. Assurance Appliance System 300 can generate smart events using deep object hierarchy for detailed analysis, such as tenants, switches, VRFs, filters, prefixes, ports, contracts, subjects, etc. At step 706, Assurance Appliance System 300 can visualize the smart events, analysis and/or models. Assurance Appliance System 300 can display, in a GUI, problems/alerts for analysis/debugging.

Figure 8:
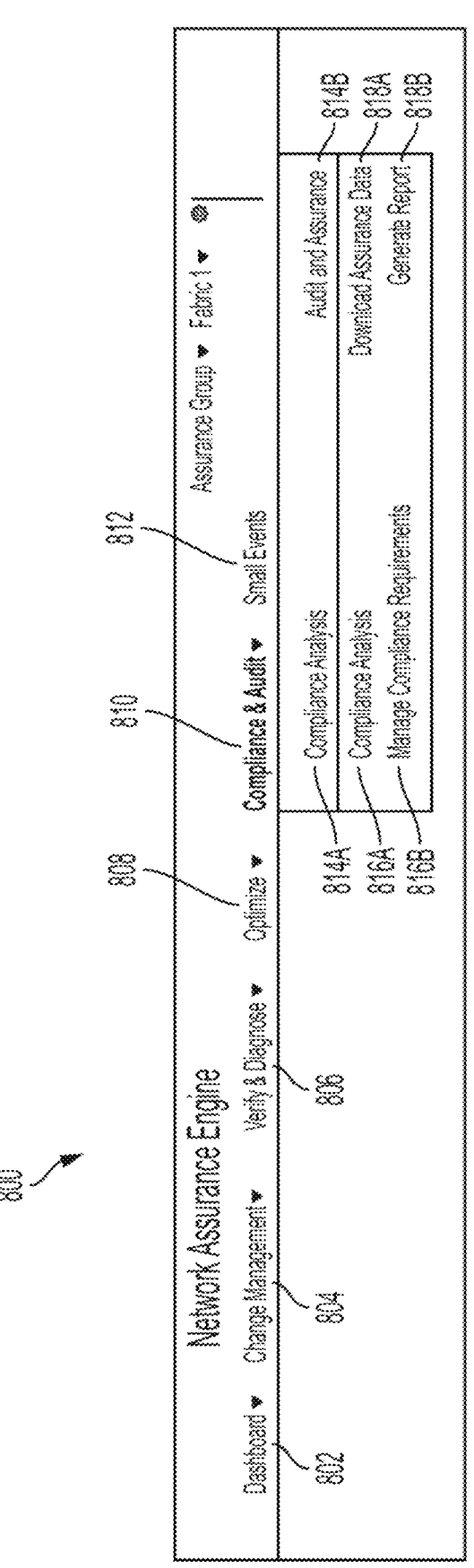
FIG. 8 illustrates an example user interface for accessing assurance compliance menus of an assurance compliance tool.

FIG. 8 illustrates an example User Interface 800 for accessing Assurance Compliance Menus 802-812 of an assurance compliance tool. In this example, the Assurance Compliance Menus 802-812 include a Dashboard Menu 802 which can be selected to access a dashboard page, interface, tool, sub-menu, etc.; a Change Management Menu 804 which can be selected to access a change management page, interface, tool, sub-menu, etc.; a Verify and Diagnose Menu 806 which can be selected to access a page, interface, tool, sub-menu, etc., for verification and diagnosis functions and information; an Optimization Menu 808 which can be selected to access a page, interface, tool, sub-menu, etc., for viewing and/or implementing assurance and/or network optimizations; a Compliance and Audit Menu 810 for accessing compliance and audit features such as pages, interfaces, tools, sub-menus, functions, etc., and a Smart Events Menu 812 for accessing smart events and/or smart event pages, interfaces, tools, sub-menus, etc.

The Compliance and Audit Menu 810 can include a Compliance Analysis Menu 814A and an Audit and Assurance Menu 814B. The Compliance Analysis Menu 814A includes Menu Sub-items 816A-B, which include a Compliance Analysis Menu Sub-item 816A for accessing a compliance analysis feature and a Manage Compliance Requirements Menu Sub-item 816B for managing compliance requirements. The Audit and Assurance Menu 814B includes Menu Sub-items 818A-B, which include a Download Assurance Data Menu Sub-item 818A for downloading assurance data and a Reports Menu Sub-item 818B for generating assurance reports.

Figure 9:
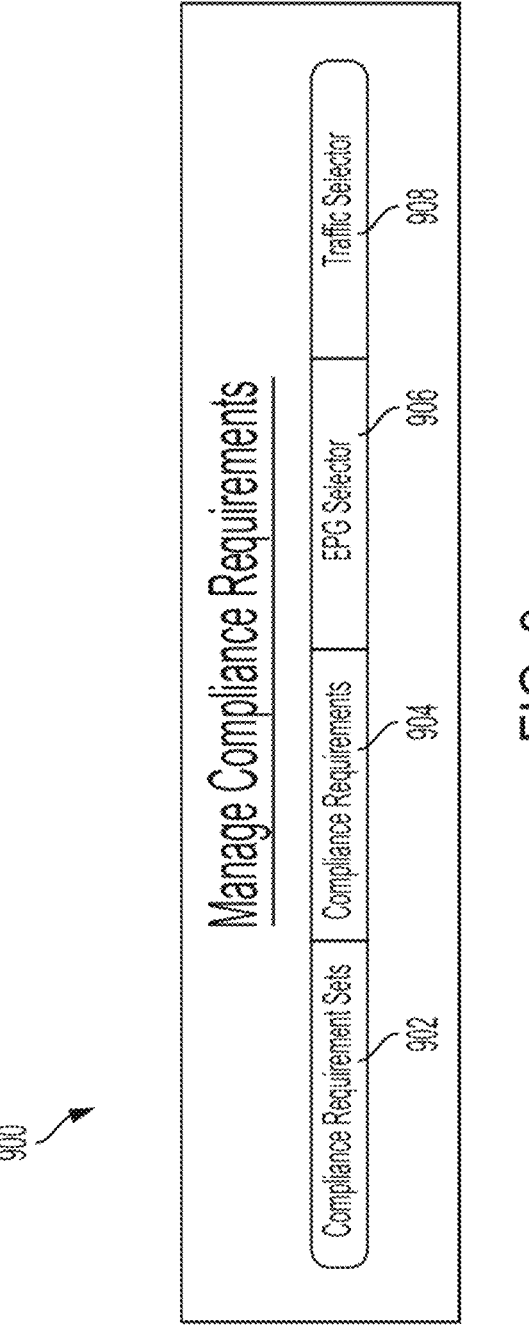
FIG. 9 illustrates an example compliance requirement management interface which allows a user to manage com-pliance requirements.

FIG. 9 illustrates a Compliance Requirement Management Interface 900 which allows a user to manage compliance requirements. The Compliance Requirement Management Interface 900 can be accessed through the Manage Compliance Requirements Menu Sub-item 816B from Compliance Analysis Menu 814A in Compliance and Audit Menu 810 of User Interface 800 shown in FIG. 8. The Compliance Requirement Management Interface 900 includes various Tabs 902-908 for managing compliance requirements. The Tabs 902-908 can be menus, navigation links, navigation pages or tools, selectable interface elements, etc. The Tabs 902-908 can include a Compliance Requirement Sets Tab 902, a Compliance Requirements Tab 904, an EPG Selector Tab 906, and a Traffic Selector Tab 908.

The Compliance Requirement Sets Tab 902 can be used to access, modify, and/or create sets or groups of compliance requirements. In some cases, the Compliance Requirement Sets Tab 902 allows a user to view any compliance requirement sets that have been configured, including their respective names, descriptions, status (e.g., active, inactive, etc.), settings (e.g., compliance requirements, compliance requirement details and policies, etc.), and so forth. Compliance requirement sets can be created using compliance requirements configured in the system (e.g., via Compliance Requirements Tab 904).

The Compliance Requirements Tab 904 allows a user to access, modify, and/or create compliance requirements; the EPG Selector Tab 906 allows a user to access, modify, and/or create EPG selectors which define rules and/or attributes for determining which EPGs to include or exclude in specific sets of EPGs associated with the EPG selectors; and the Traffic Selector Tab 908 allows a user to access, modify, and/or create traffic selectors which provide traffic filters and/or parameters such as traffic protocols, ports, etc. A more detailed description of the Tabs 902-908 in the Compliance Requirement Management Interface 900 will be further described below.

Figure 10:
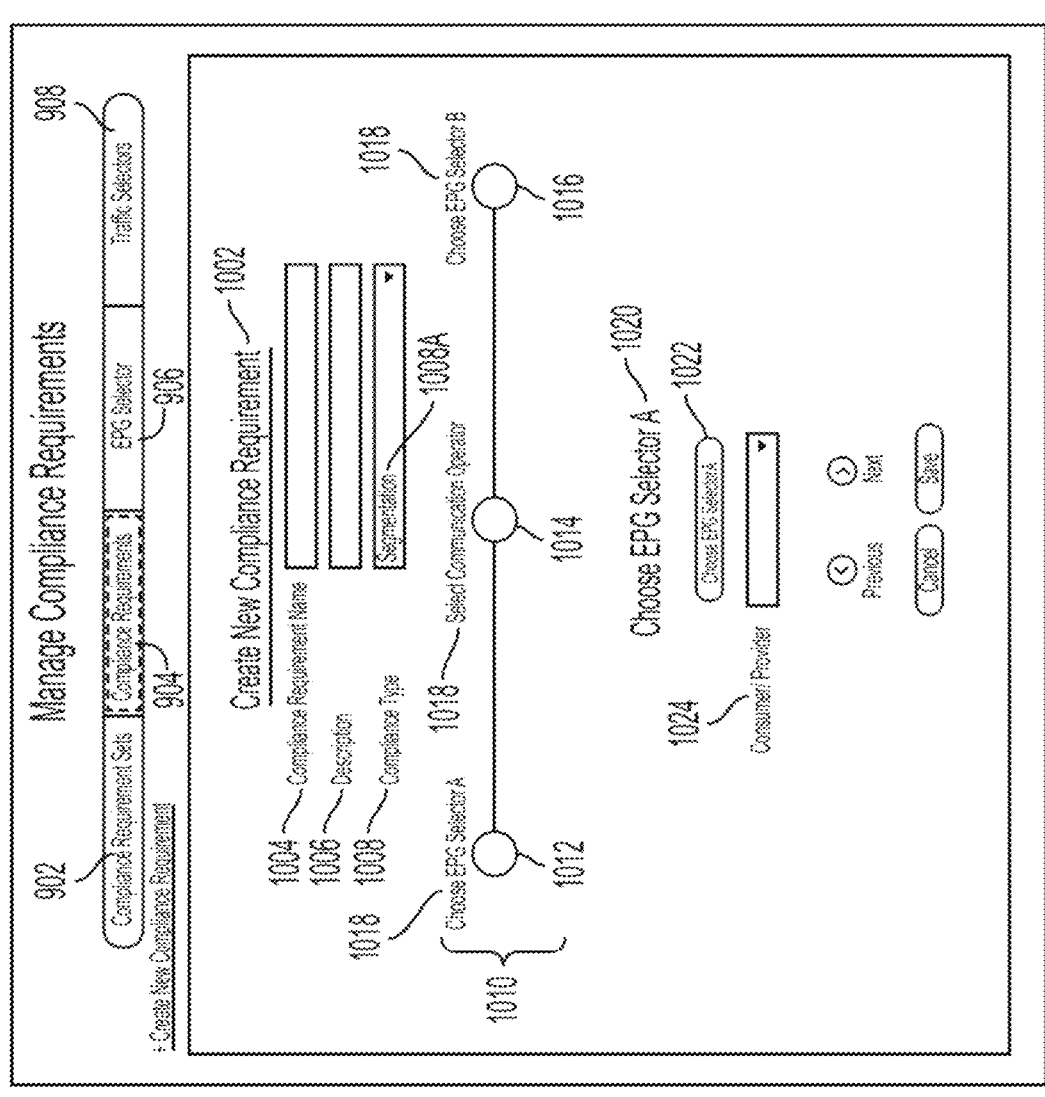
FIG. 10 illustrates an example compliance requirement interface for creating a new compliance requirement.

FIG. 10 illustrates a Compliance Requirement Interface 1000 for creating a compliance requirement. The Compliance Requirement Interface 1000 can be accessed from Compliance Requirements Tab 904 in Compliance Requirement Management Interface 900. The Compliance Requirement Interface 1000 includes a New Compliance Requirement Section 1002 for providing compliance requirement definitions or settings to create a new compliance requirement.

The New Compliance Requirement Section 1002 includes a Compliance Requirement Name Field 1004, where the user can provide a name for the new compliance requirement being created, and a Compliance Requirement Description Field 1006, where the user can provide a description of the new compliance requirement. The New Compliance Requirement Section 1002 can also include a Compliance Type Field 1008 where a user can define the type of compliance requirement being created, such as a traffic segmentation requirement, a traffic restriction requirement, a resource attribute requirement, a naming convention requirement, etc. In this example, the Compliance Type Field 1008 indicates that the compliance type selected for the new compliance requirement is Segmentation 1008A.

The New Compliance Requirement Section 1002 also includes a Compliance Requirement Definitions View 1010 depicting Nodes 1012-1016 representing Compliance Definitions 1018A-C associated with the new compliance requirement. For example, Node 1012 represents an EPG Selector Definition 1018A for EPG Selector A, that is selected or is to be selected for the new compliance requirement. Node 1016 represents an EPG Selector Definition 1018C for EPG Selector B, which is another EPG selector selected or to be selected for the new compliance requirement. Node 1014 represents a Communication Operator Definition 1018B for defining a communication operator for traffic associated with the EPG selectors in Nodes 1012 and 1016.

In some cases, the Nodes 1012-1016 in the Compliance Requirement Definitions View 1010 can be depicted with interconnections and/or according to an order or flow of configuration tasks or definitions for creating the compliance requirement. For example, Node 1012 can be a first node which represents the first definition or configuration task for creating the compliance requirement (e.g., selecting an EPG selector for EPG Selector A), Node 1014 can be the subsequent node which represents the next definition or configuration task (e.g., selecting a communications operator), and Node 1016 can be the last node representing the last definition or configuration task for creating the compliance requirement (e.g., selecting an EPG selector for EPG Selector B). In some cases, the Compliance Definitions 1018A-C can be displayed or populated for the Nodes 1012-1016 as (or after) they are defined. In some cases, each of the Nodes 1012-1016 can depict (e.g., via text or labels, check marks or other visual indicators displayed in or with the Nodes 1012-1016, etc.) which compliance definition has been selected (if any) for that node and/or whether the compliance definition selection or configuration process for that node has completed or not.

The New Compliance Requirement Section 1002 includes an EPG Selector Section 1020 for selecting an EPG selector and associated attributes for EPG Selector A (i.e., Node 1012). The EPG Selector Section 1020 includes an EPG Selector Option 1022 for selecting an EPG selector. The EPG Selector Option 1022 can be, for example and without limitation, a drop-down menu where a user can select an EPG selector, a link to a pop-up window or interface where a user can select an EPG selector, an EPG selector browse function, etc.

EPG Selector Section 1020 can also include a Consumer/Provider Label Field 1024 which allows a consumer or provider label for to be selected for the EPG selector selected in EPG Selector Option 1022. Such labels allow EPGs or EPG selectors to be classified as consumers or providers, which define the relationship between an EPG or EPG selector and a compliance requirement. Thus, EPG Selector Option 1022 allows a user to select an EPG selector for EPG Selector A (i.e., Node 1012) and the Consumer/Provider Label Field 1024 allows the user to apply a consumer or provider label to the selected EPG selector for EPG Selector A. Note, however, that in some cases the Consumer/Provider Label Field 1024 may be optional and the user may complete configuring the EPG Selector A (i.e., Node 1012) without applying or selecting a consumer or provider label.

Figure 11:
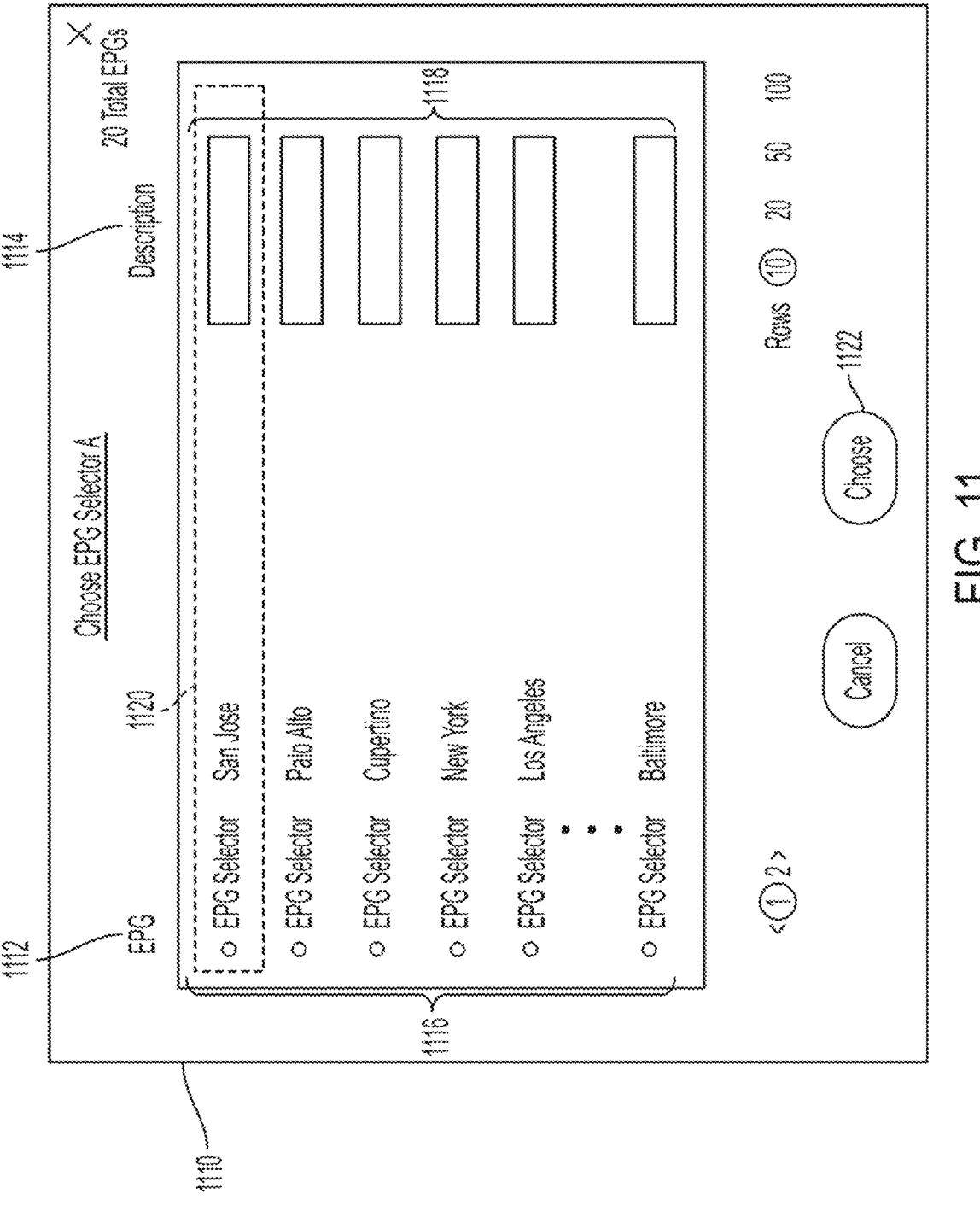
FIG. 11 illustrates an example EPG (Endpoint Group) selector interface for selecting an EPG selector for a security compliance requirement.

FIG. 11 illustrates an EPG Selector Interface 1110 for selecting an EPG selector. The EPG Selector Interface 1110 can be accessed through the EPG Selector Option 1022 in the Compliance Requirement Interface 1000, and allows a user to select an EPG selector for EPG Selector A (i.e., Node 1012). The EPG Selector Interface 1110 includes an EPG Column 1112 which lists EPG Selectors 1116 that the user can select from, and a Description Column 1114 which includes optional Descriptions 1118 for the EPG Selectors 1116 listed in the EPG Column 1112. The Description Column 1114 may or may not include a description (1118) for each of the EPG Selectors 1116 listed in the EPG Column 1112.

In this example, the EPG Selector Interface 1110 illustrates a Selection 1120 from the EPG Selectors 1116, which in this case is EPG Selector San Jose. This indicates that the user has selected EPG Selector San Jose as the EPG selector for EPG Selector A (i.e., Node 1012). The EPG Selector Interface 1110 can include a Choose Option 1122 where the user can choose the EPG Selector San Jose based on the Selection 1120 and proceed with EPG Selector San Jose as the EPG selector for EPG Selector A (i.e., Node 1012).

Figure 12:
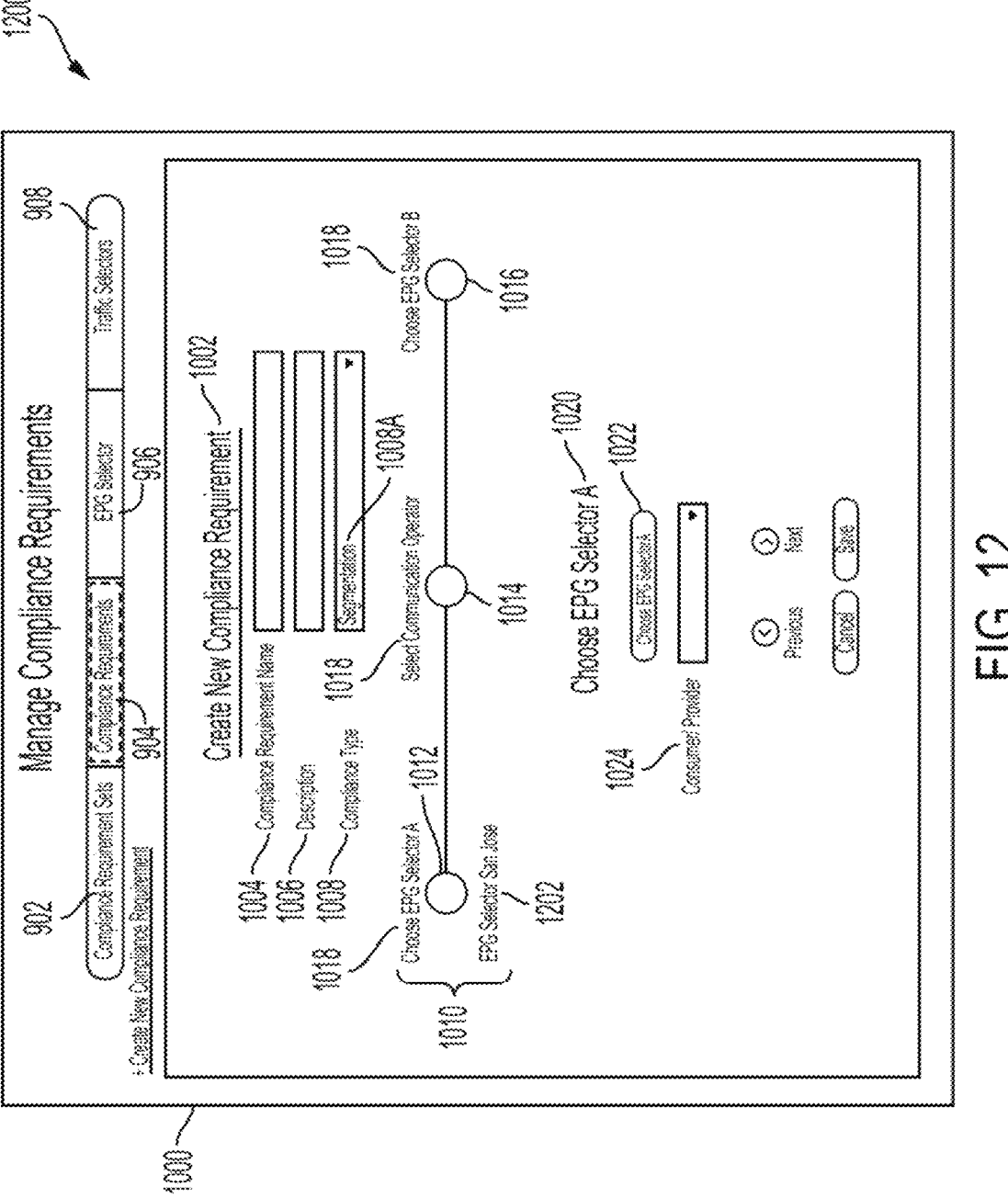
FIG. 12 illustrates an example configuration of a compli-ance requirement interface after a user selects and chooses an EPG selector from an EPG selector interface.

FIG. 12 illustrates a Configuration 1200 of the Compliance Requirement Interface 1000 after the user selects and chooses an EPG selector for EPG Selector A (i.e., Node 1012) from the EPG Selector Interface 1110. As illustrated in the Configuration 1200 of the Compliance Requirement Interface 1000, the Compliance Requirement Definitions View 1010 in the New Compliance Requirement Section 1002 has been updated to identify the Chosen EPG Selector 1202 for EPG Selector A (i.e., Node 1012), which in this example is EPG Selector San Jose. Thus, the Configuration 1200 of the Compliance Requirement Interface 1000 shows that the EPG Selector San Jose has been chosen at Node 1012 corresponding to the EPG Selector A.

Figure 13:
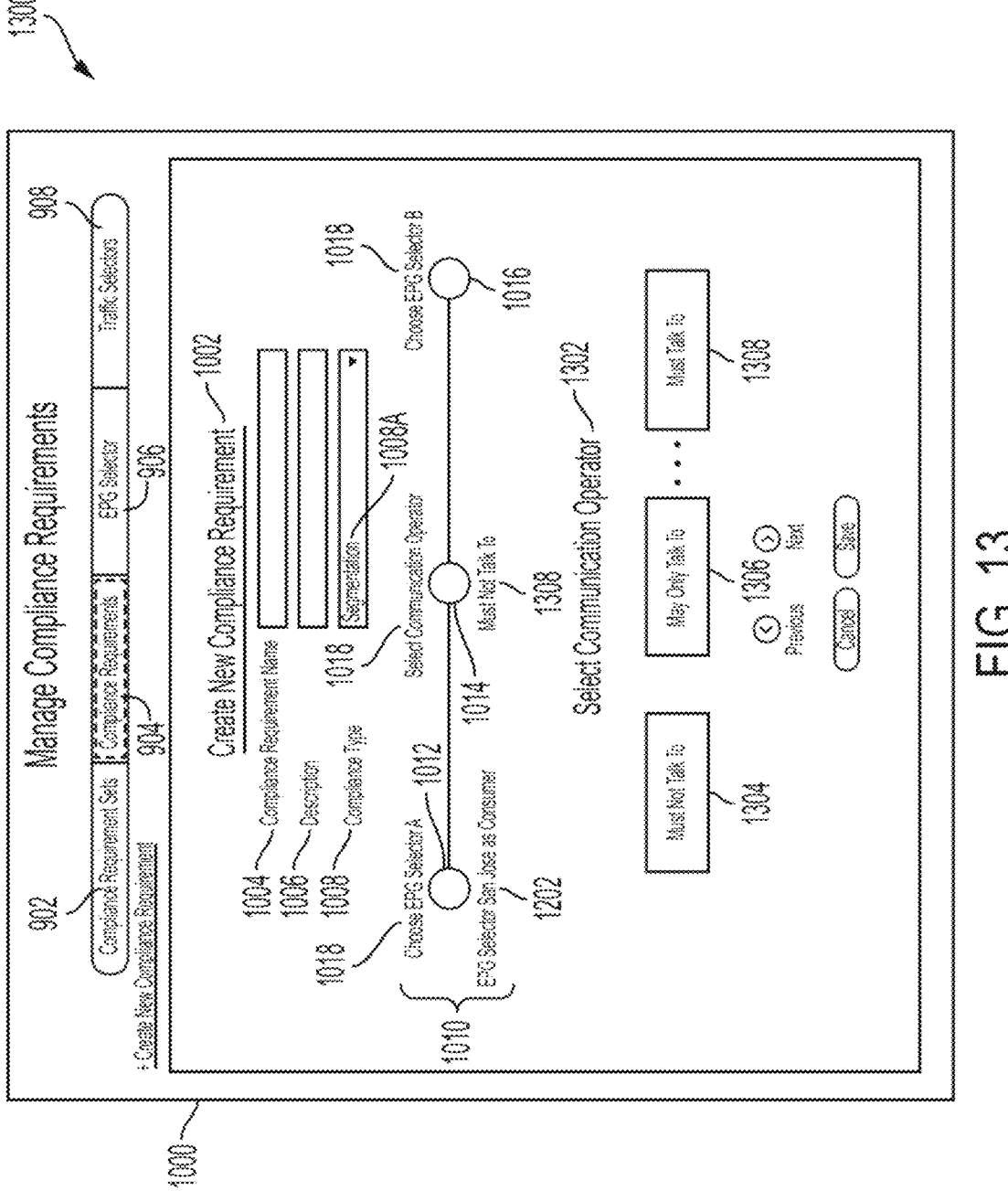
FIG. 13 illustrates an example configuration of a compli-ance requirement interface for enabling a user to select a communication operator for a security compliance require-ment.

Once an EPG selector has been chosen for EPG Selector A (i.e., Node 1012), the user can select a communication operator (i.e., Node 1014) for the new compliance requirement. FIG. 13 illustrates a Configuration 1300 of the Compliance Requirement Interface 1000 for enabling the user to select a communication operator for the new compliance requirement. Here, the Configuration 1300 of the Compliance Requirement Interface 1000 includes a Communication Operator Section 1302 with Communication Operator Options 1304-1308 that the user can select for the new compliance requirement. The Communication Operator Options 1304-1308 in this non-limiting example include a Must Not Talk To option (1304), a May Only Talk To option (1306), and a Must Talk To option (1308). It should be noted that other communication operator options than those depicted in FIG. 13 can also be included, and some implementations may include other type(s) and/or a different number (more or less) of communication operator options.

In the Configuration 1300, the Compliance Requirement Definitions View 1010 shows a Must Not Talk To operator 1308 selected as the communication operator (i.e., Node 1014) for the new compliance requirement. The Must Not Talk To operator 1308 can be selected via the Communication Operator Option 1304 in the Communication Operator Section 1302, as previously described. The Configuration 1300 also shows the Chosen EPG Selector 1202 for EPG Selector A (i.e., Node 1012), EPG Selector San Jose, has been assigned a consumer label, indicating that the EPG Selector San Jose is a consumer EPG Selector. The user can assign the consumer label via the Consumer/Provider Label Field 1024 in the EPG Selector Section 1020 of the Compliance Requirement Interface 1000, as shown in FIGS. 10 and 12.

Figure 14:
FIG. 14 illustrates an example configuration of a compli-ance requirement interface for selecting an EPG selector and associated attributes for a particular EPG selector in a compliance requirement definitions view.

FIG. 14 illustrates a Configuration 1400 of the Compliance Requirement Interface 1000 for selecting an EPG selector and associated attributes for EPG Selector B (i.e., Node 1016) shown in the Compliance Requirement Definitions View 1010. The Configuration 1400 includes an EPG Selector Section 1402 for selecting the EPG selector and associated attributes for EPG Selector B (i.e., Node 1016). The EPG Selector Section 1402 includes an EPG Selector Option 1404 for selecting an EPG selector. The EPG Selector Option 1404 can be, for example and without limitation, a drop-down menu where a user can select an EPG selector, a link to a pop-up window or interface where a user can select an EPG selector, an EPG selector browse function, etc.

The EPG Selector Section 1402 can also include a Consumer/Provider Label Field 1406 for selecting a consumer or provider label for the EPG selector selected in the EPG Selector Option 1404. In this example, the Consumer/Provider Label Field 1406 shows Provider Label 1408 selected for the EPG Selector B (i.e., Node 1016). Thus, the EPG Selector chosen by the user via the EPG Selector Option 1404 will receive the Provider Label 1408 classifying it as a provider.

Figure 15:
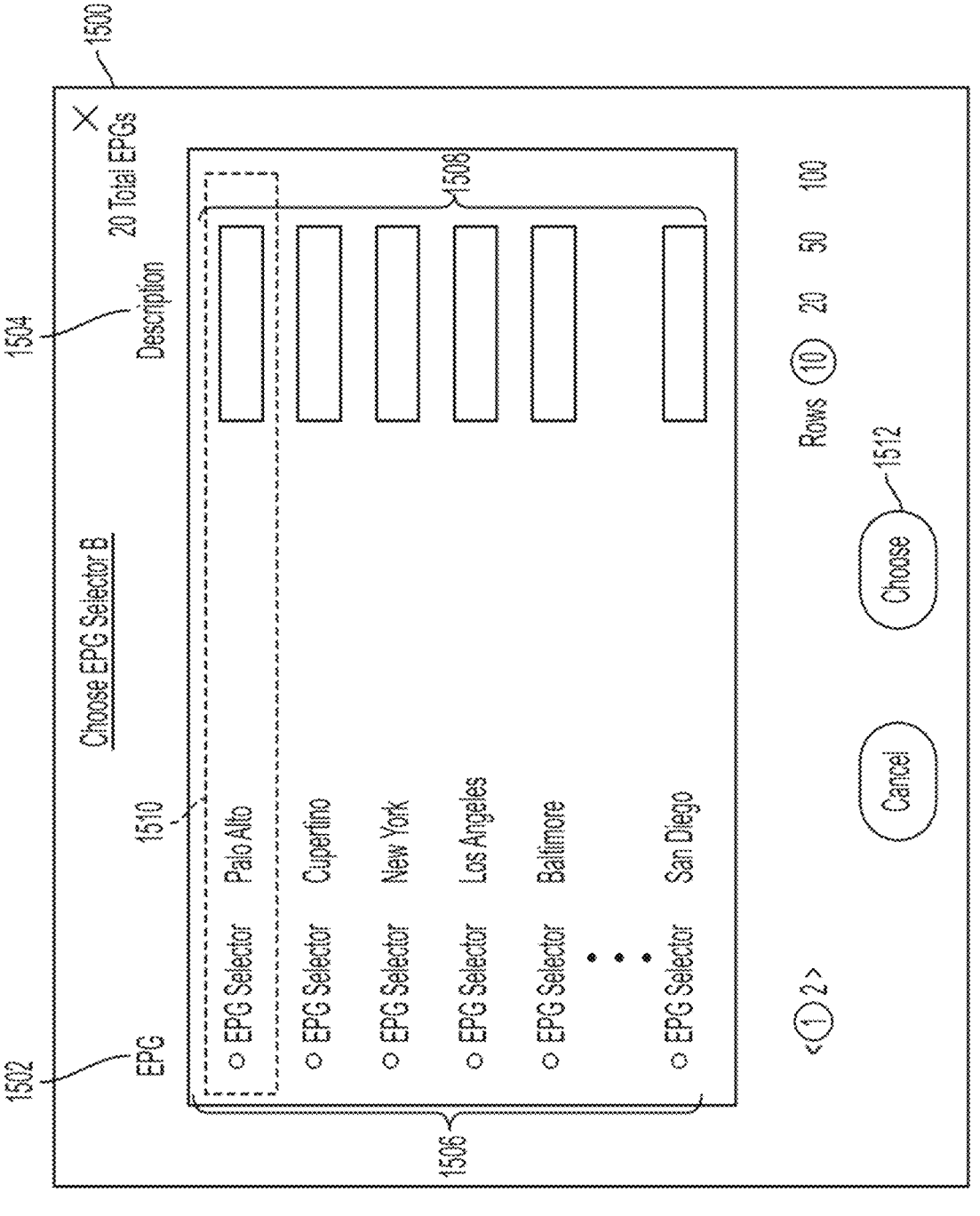
FIG. 15 illustrates an example EPG selector interface for selecting an EPG selector for a security compliance require-ment.

FIG. 15 illustrates an EPG Selector Interface 1500 for selecting an EPG selector for EPG Selector B (i.e., Node 1016). The EPG Selector Interface 1500 can be generated or presented in response to a selection of the EPG Selector Option 1404 in the EPG Selector Section 1402 as shown in the Configuration 1400 of the Compliance Requirement Interface 1000. The EPG Selector Interface 1500 includes an EPG Column 1502 which lists EPG Selectors 1506 that the user can select from, and a Description Column 1504 which includes optional Descriptions 1508 corresponding to the EPG Selectors 1506 listed in the EPG Column 1502.

In this example, the EPG Selector Interface 1500 illustrates a Selection 1510 for EPG Selector B (i.e., Node 1016) from the EPG Selectors 1506, which in this case is EPG Selector Palo Alto. This indicates that the user has selected EPG Selector Palo Alto as the EPG selector for EPG Selector B (i.e., Node 1016). The EPG Selector Interface 1500 can include a Choose Option 1512 where the user can choose the Selection 1120 (EPG Selector Palo Alto) and proceed with EPG Selector Palo Alto as the EPG selector for EPG Selector B (i.e., Node 1016).

Figure 16:
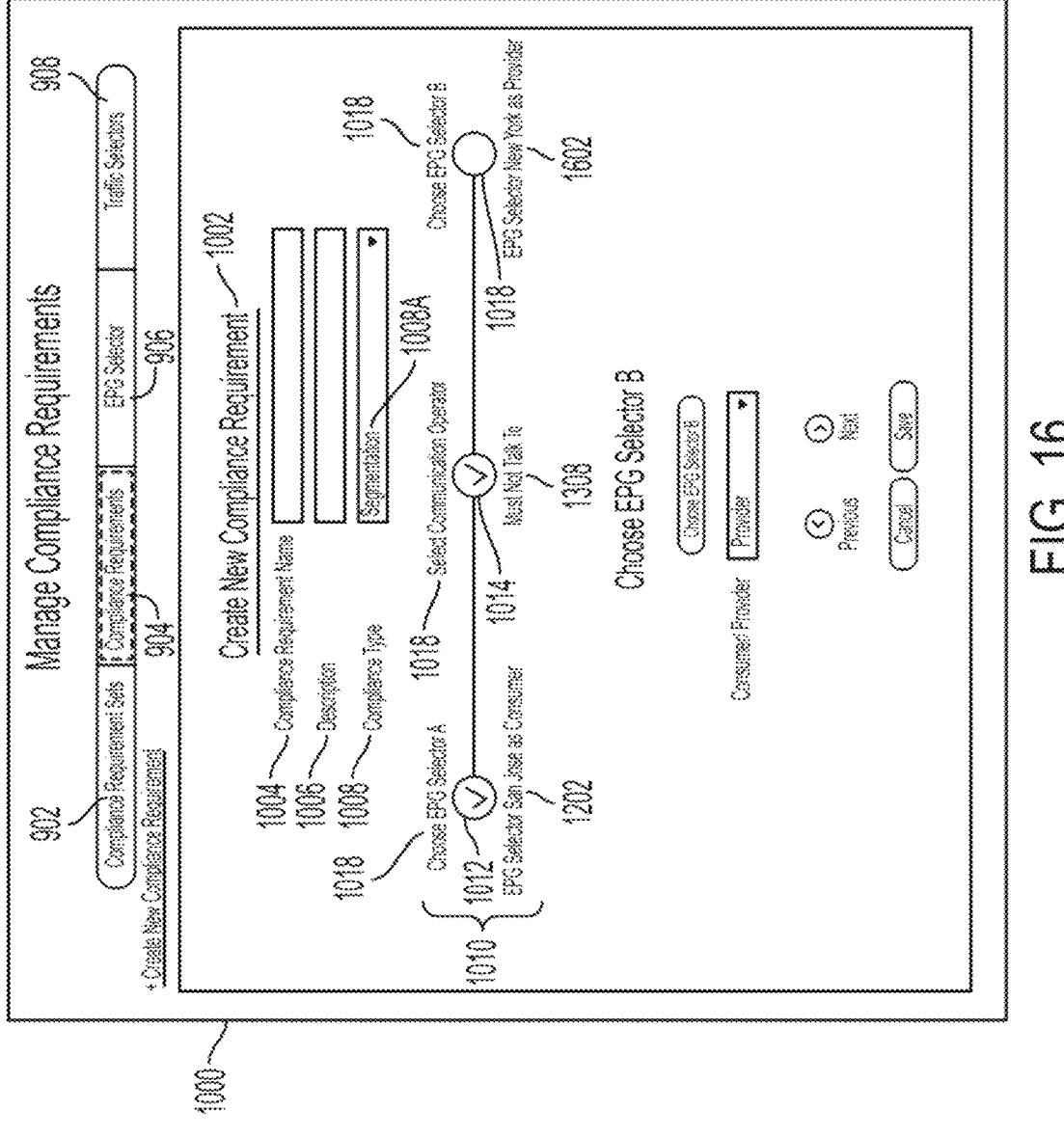
FIG. 16 illustrates an example compliance requirement interface depicting an example configuration of a compli-ance requirement created through the compliance require-ment interface.

Once the user has selected the EPG Selector Palo Alto for EPG Selector B (i.e., Node 1016) via the Choose Option 1512, the user is returned to the Compliance Requirement Interface 1000 which is updated to reflect that the EPG Selector Palo Alto has been selected for EPG Selector B (i.e., Node 1016). With reference to FIG. 16, the Compliance Requirement Definitions View 1010 of the Compliance Requirement Interface 1000 identifies EPG Selector Palo Alto as the Chosen EPG Selector 1602 for EPG Selector B (i.e., Node 1016), and indicates that the EPG Selector Palo Alto has been selected as a provider. The Compliance Requirement Definitions View 1010 also reflects that the Compliance Definitions 1018A-C for Nodes 1012-1016 have been selected or configured. At this point, the user has completed creating the new compliance requirement.

Figure 17A:
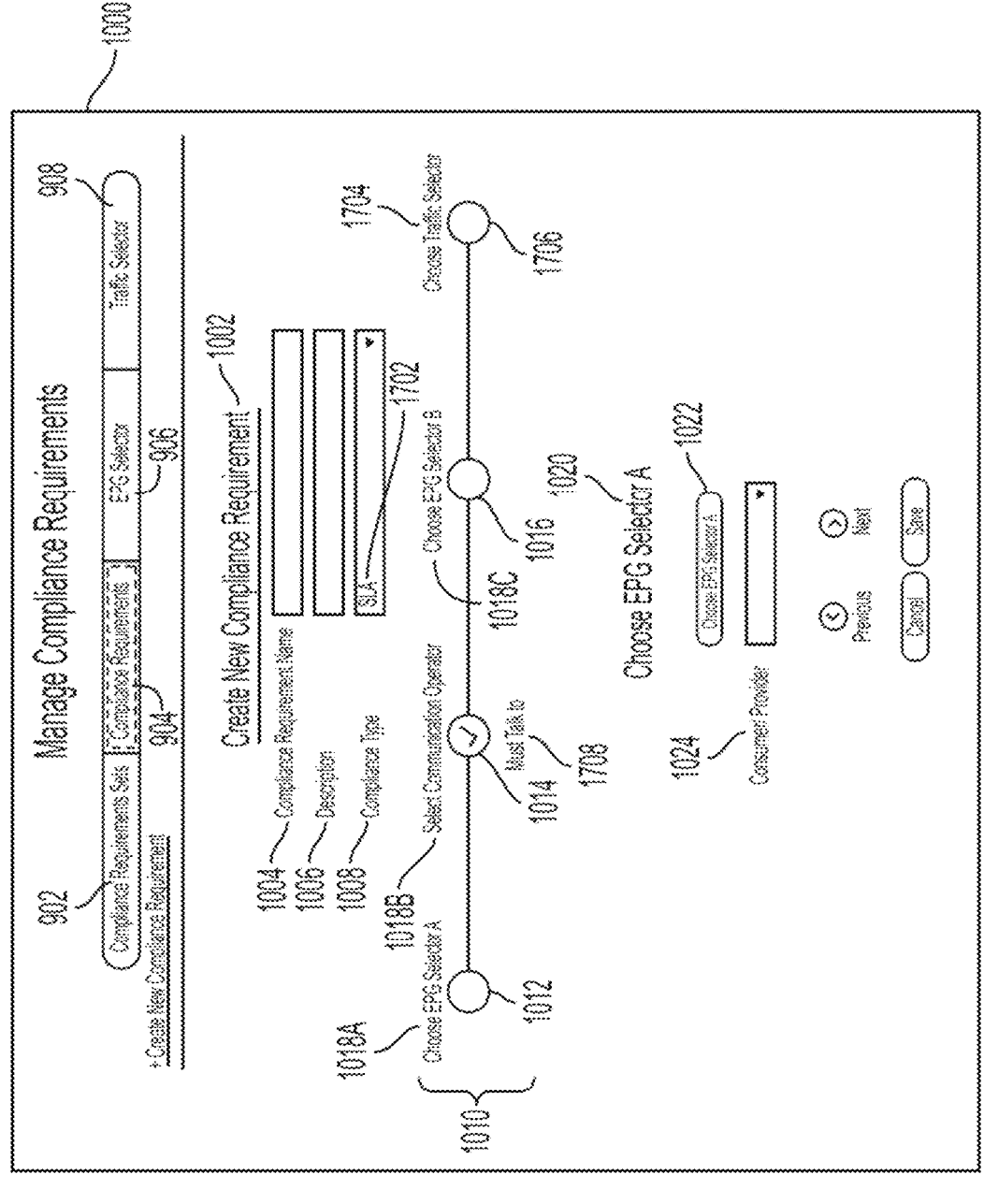
FIGS. 17A through 17C illustrate example configurations of a compliance requirement interface for creating a com-pliance requirement.

FIG. 17A illustrates a Configuration 1700 of the Compliance Requirement Interface 1000 depicting various features for creating a different compliance requirement. In this example, the compliance requirement is an SLA (service level agreement) requirement, as reflected by the SLA Selection 1702 in the Compliance Type Field 1008.

The Compliance Requirement Definitions View 1010 includes Compliance Definitions 1018A-C for selecting an EPG Selector A (1018A), selecting a communication operator (1018B), and selecting an EPG Selector B (1018C). The Compliance Requirement Definitions View 1010 also includes an additional compliance definition, namely Compliance Definition 1704 for selecting a traffic selector. In addition, the Compliance Requirement Definitions View 1010 includes Nodes 1012-1016, respectively corresponding to Compliance Definitions 1018A-C, as well as Node 1706 corresponding to Compliance Definition 1704 for selecting a traffic selector.

The Compliance Requirement Definitions View 1010 includes an indication that a Must Talk To Operator 1708 has been selected or configured as the communication operator in the Compliance Definition 1018B associated with Node 1014. The Must Talk To Operator 1708 for the Compliance Definition 1018B can be selected or configured as previously described in FIG. 13. In FIG. 17A, the Compliance Definitions 1018A, 1018C and 1704 corresponding to Nodes 1012, 1016, and 1706 have not been selected or configured. Accordingly, the Compliance Definitions 1018A, 1018C and 1704 can be selected or configured to complete the compliance requirement.

The Compliance Requirement Interface 1000 in Configuration 1700 includes EPG Selector Section 1020 for selecting an EPG selector and associated attributes for EPG Selector A (i.e., Node 1012). The EPG Selector Section 1020 includes EPG Selector Option 1022 for selecting the EPG selector, and Consumer/Provider Label Field 1024 for selecting a consumer or provider label for the EPG selector. Through the EPG Selector Section 1020, the user can select or configure an EPG selector for Compliance Definition 1018A. The user can also select an EPG selector and any associated attributes for the Compliance Definition 1018C, as previously described.

Figure 17B:
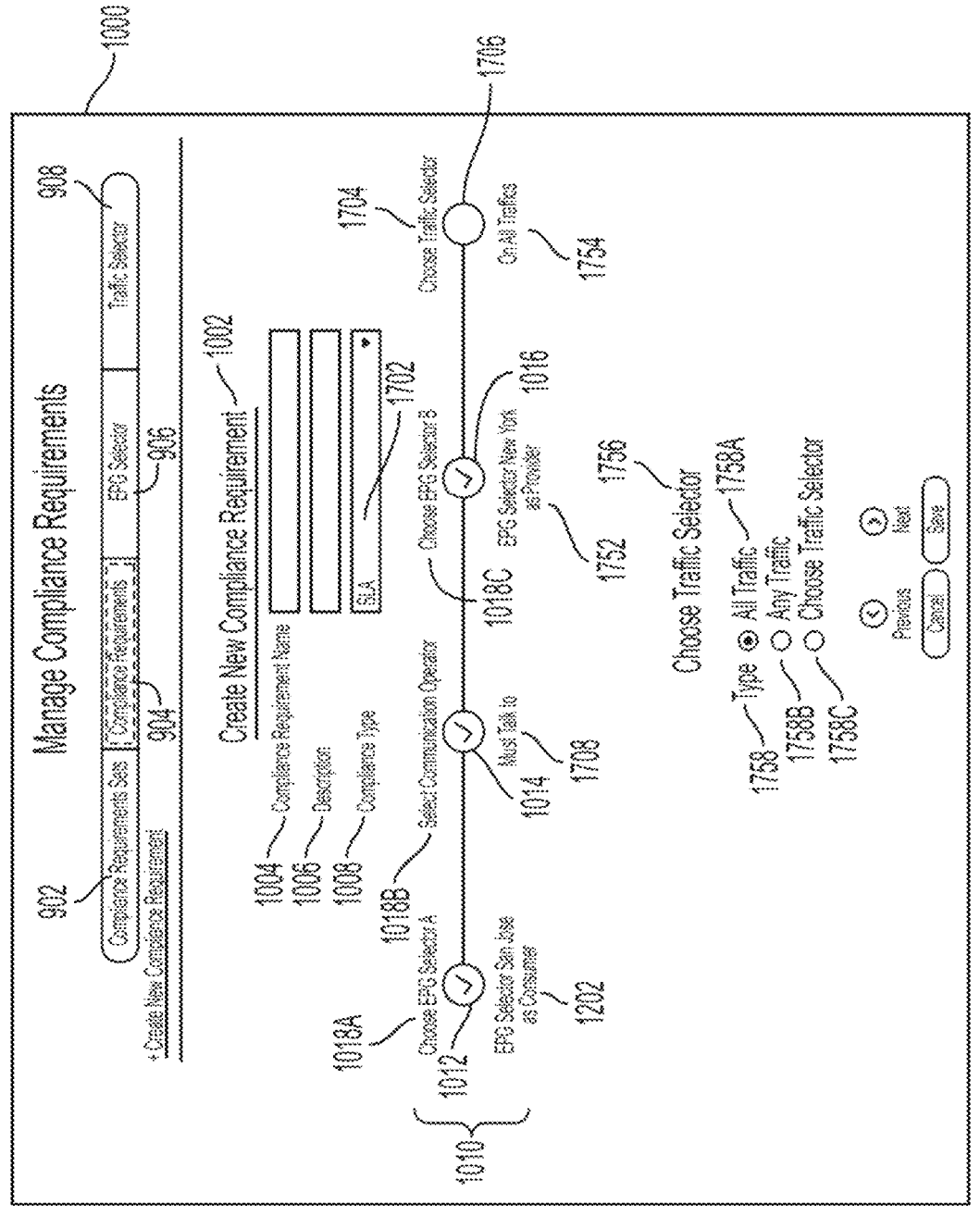

FIG. 17B illustrates a Configuration 1750 of the Compliance Requirement Interface 1000 for selecting a traffic selector for Compliance Definition 1704 associated with Node 1706. Here, a Traffic Selector Section 1756 includes Traffic Selection Options 1758A-C for selecting a Traffic Selector Type 1758. The Traffic Selection Options 1758A-C in this non-limiting example include an option for selecting all traffic (1758A), an option for selecting any traffic (1758B), and an option for choosing a specific traffic selector (1758C).

In FIG. 17B, the user has selected the all traffic option (1758A) in the Traffic Selection Options 1758A-C. Accordingly, the Compliance Definition 1704 for the traffic selector corresponding to Node 1706 reflects that the Chosen Traffic Selector 1754 is all traffic. The Chosen Traffic Selector 1754 provides that the Compliance Definitions 1018A-C should apply to all traffic associated with the EPG selectors configured for the Compliance Definitions 1018A and 1018C, which define the EPG Selector A and EPG Selector B for the compliance requirement. In this example, the Compliance Definitions 1018A-C and 1704 provide that Consumer EPG Selector San Jose (1202) must talk to (1708) Provider EPG Selector New York (1752) on all traffic (1754).

The option for choosing a specific traffic selector (1758C) can allow a user to select from traffic selectors that have been configured in the system and/or are available for selection. In some cases, the option for choosing a specific traffic selector can allow a user to select a traffic selector with more granular specifications, different filters (e.g., protocol filters, IP filters, name filters, attribute filters, port filters, etc.), etc., than the all or any traffic selector options.

Figure 17C:
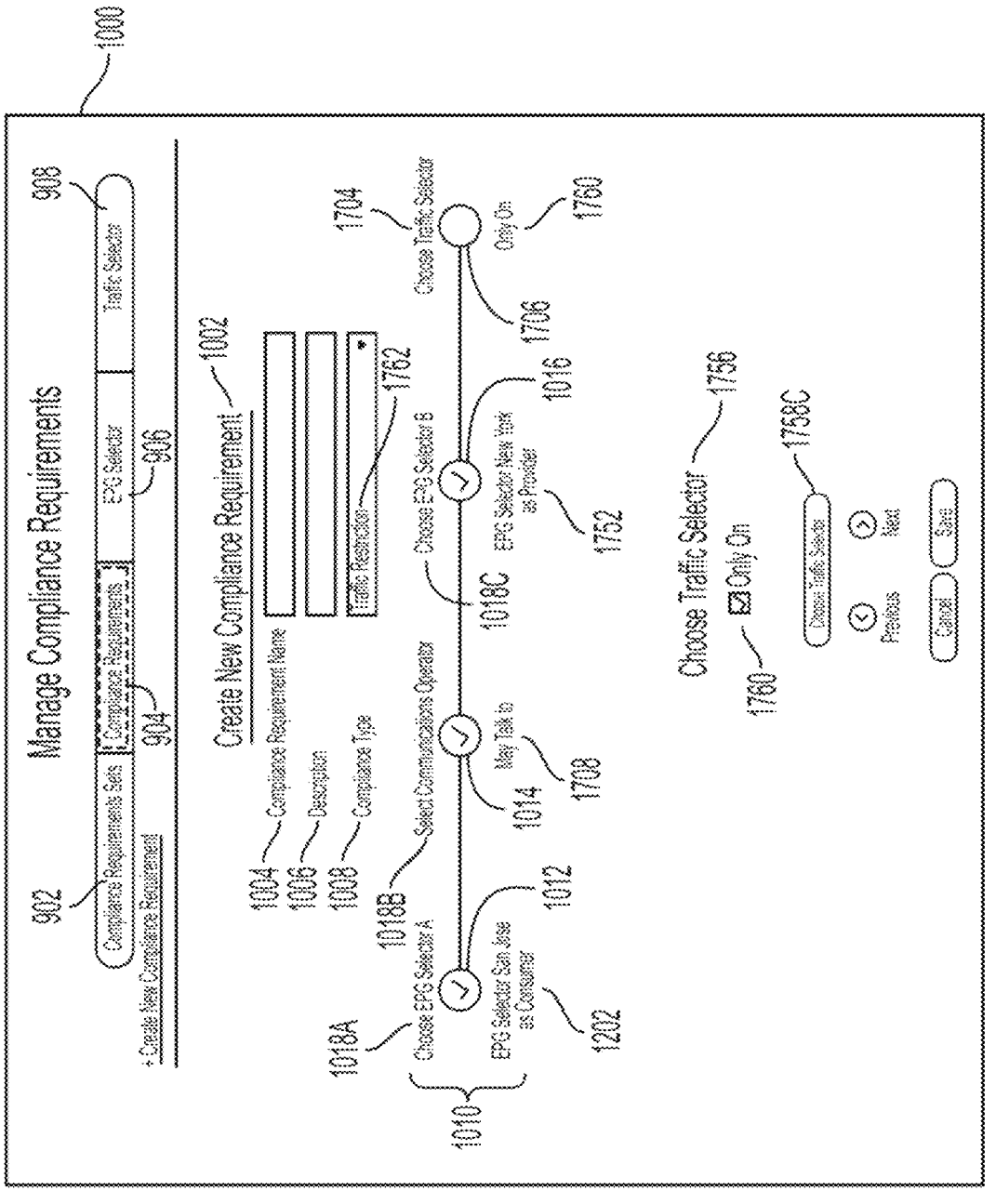

FIG. 17C illustrates an example of a different traffic selector chosen for the Compliance Definition 1704 and a different Compliance Type 1008 selected for the new compliance requirement. Here, the Compliance Type 1008 has been changed to Traffic Restriction 1762 (as opposed to SLA 1702 in the previous example) and a different traffic selector, Traffic Selector 1760, has been selected through the Choose Traffic Selector Option 1758C. In this example, Traffic Selector 1760 is configured to only apply to specific traffic, as opposed to all or any traffic as provided in Traffic Selector Options 1758A and 1758B. For example, the Traffic Selector 1760 may apply only to traffic on a specific protocol, port, EtherType, etc. Having chosen Traffic Selector 1760 through the Choose Traffic Selector Option 1758C, the Compliance Requirement Definitions View 1010 now reflects the chosen Traffic Selector 1760 as the traffic selector configured for the Compliance Definition 1704 associated with Node 1706.

The previous examples illustrate various aspects for creating compliance requirements. However, before creating a compliance requirement, one or more traffic selectors and EPG selectors can be configured for the compliance requirement. FIGS. 18A-E illustrate various aspects for creating traffic selectors and FIG. 19 illustrates various aspects for creating an EPG selector.

Figure 18A:
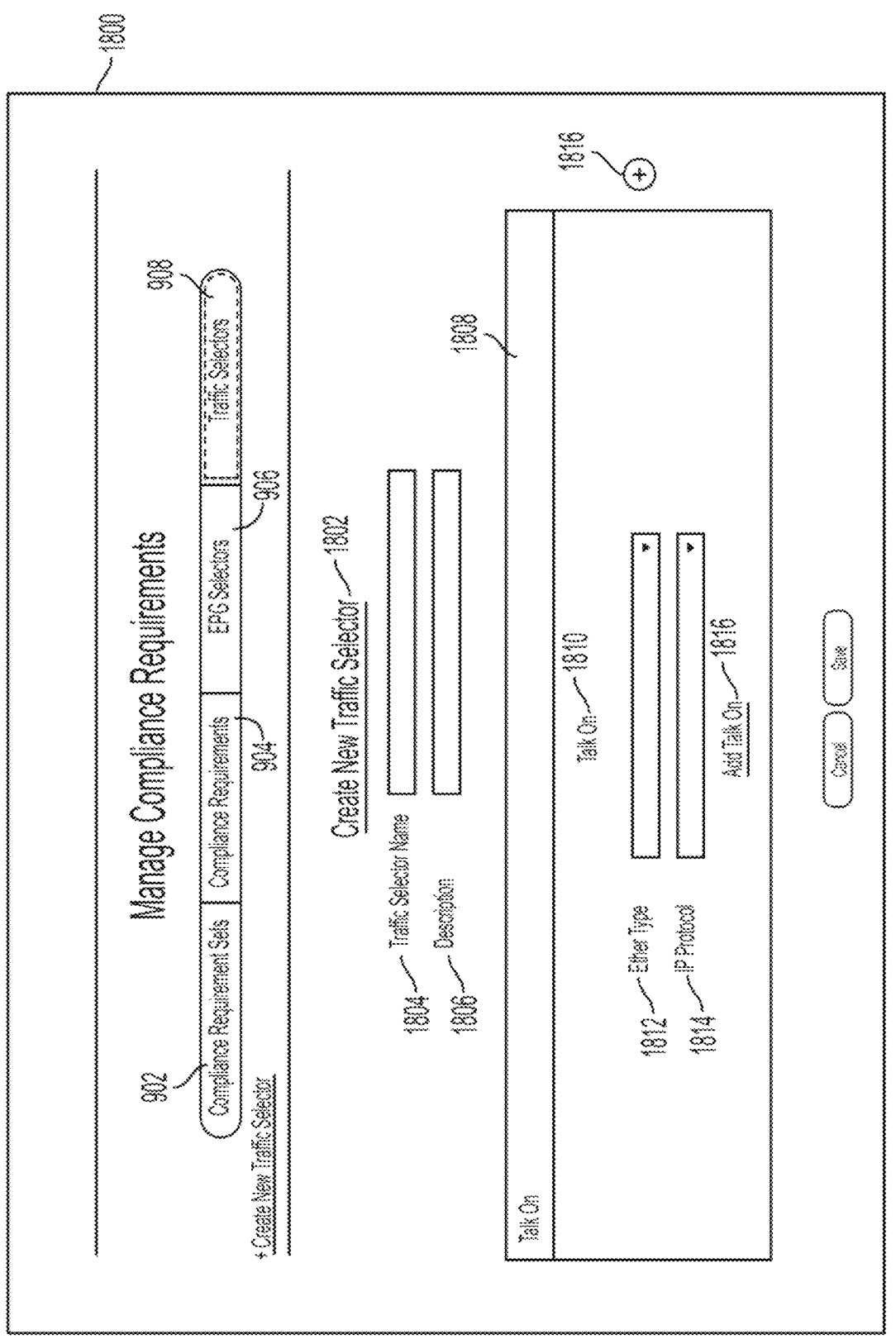
FIGS. 18A through 18E illustrate example configurations of a traffic selector interface for creating a traffic selector for a security compliance requirement.
Figure 19:
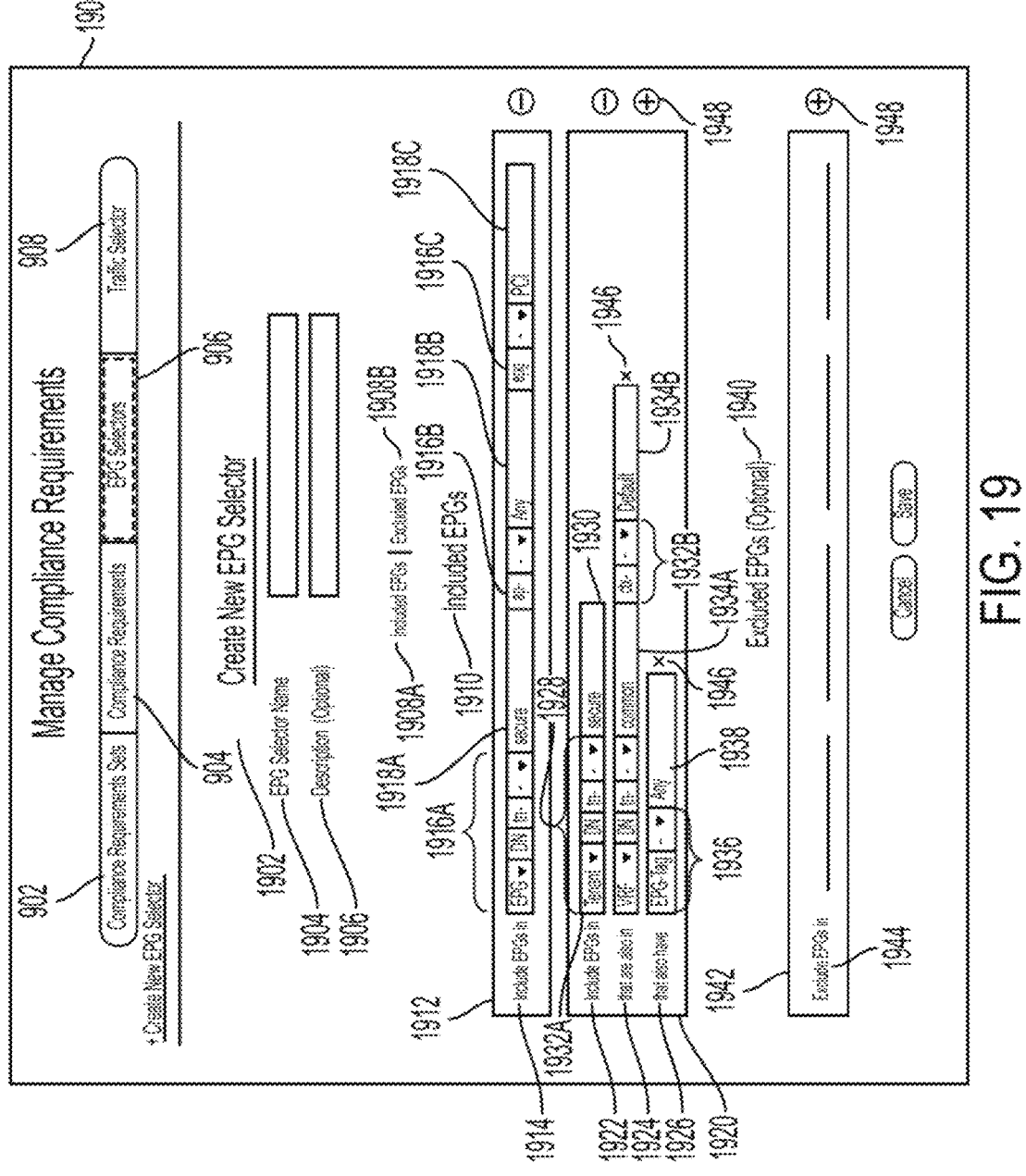
FIG. 19 illustrates an example EPG selector interface for creating an EPG selector for a security compliance require-ment.

With reference to FIG. 18A, a New Traffic Selector Interface 1800 can be accessed from the Traffic Selector Tab 908. The New Traffic Selector Interface 1800 can include a Create New Traffic Selector Section 1802, which can include a Traffic Selector Name Field 1804, a Traffic Selector Description Field 1806, and a Traffic Selector Configuration Section 1808.

The Traffic Selector Configuration Section 1808 can allow a user to configure rules and/or filters for traffic associated with the traffic selector being created. For example, the Traffic Selector Configuration Section 1808 can allow a user to define attributes of the traffic associated with the traffic selector, such as a protocol, a port, an EtherType, etc. In this example, the Traffic Selector Configuration Section 1808 includes Traffic Attribute Fields 1812 and 1814, which allow the user to define an EtherType (e.g., IPv4, ARP, IPv6, LACP, MPLS, SRP, etc.) for the traffic (e.g., via Traffic Attribute Field 1812) and an IP protocol (e.g., TCP, UDP, OSPF, etc.) for the traffic (e.g., via Traffic Attribute Field 1814). The Traffic Selector Configuration Section 1808 can also include an Operator 1810 which identifies a communication action (e.g., talk or communicate on) that applies to the traffic having the attributes defined in the Traffic Attribute Fields 1812 and 1814.

Figure 18B:
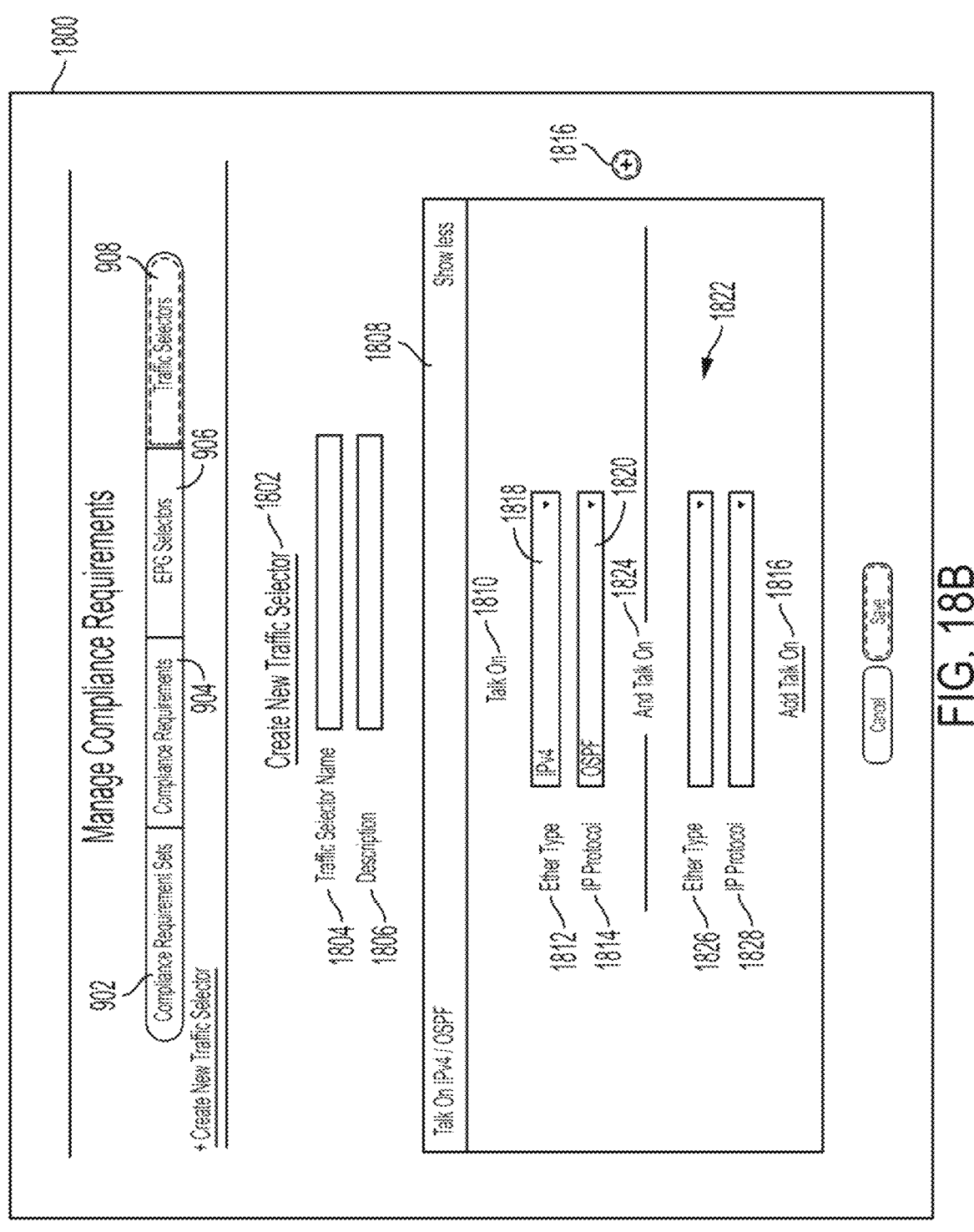

The Traffic Selector Configuration Section 1808 can include an Add Talk On Link 1816 which a user can select to add additional traffic rules or filters for the traffic selector. FIG. 18B illustrates the New Traffic Selector Interface 1800 after a user has configured the Traffic Attribute Fields 1812 and 1814 and added Traffic Configuration Set 1822 via Add Talk On Link 1816.

The Traffic Configuration Set 1822 includes an Operator 1824 and Traffic Attribute Fields 1826 and 1828. The Operator 1824 and Traffic Attribute Fields 1826 and 1828 provide additional criteria or filters (i.e., in addition to the criteria or filters defined via Operator 1810 and Traffic Attribute Fields 1812 and 1814) for the traffic selector. In this example, the Traffic Attribute Fields 1826 and 1828 allow a user to define another EtherType (1826) and IP protocol (1828) for the traffic, and the Operator 1824 is an And operator indicating that the Traffic Configuration Set 1822 should also apply to traffic communications having the attributes defined in the Traffic Attribute Fields 1826 and 1828.

Moreover, the Traffic Attribute Fields 1812 and 1814 in FIG. 18B have been configured to include IPv4 1818 as the EtherType in Traffic Attribute Field 1812 and OSPF (Open Shortest Path First) 1820 as the IP protocol in Traffic Attribute Field 1814. Thus, together the Operator 1810 and Traffic Attribute Fields 1812 and 1814 indicate that the traffic selector also corresponds to traffic communicating on IPv4 (1818) and OSPF (1820).

Figure 18C:
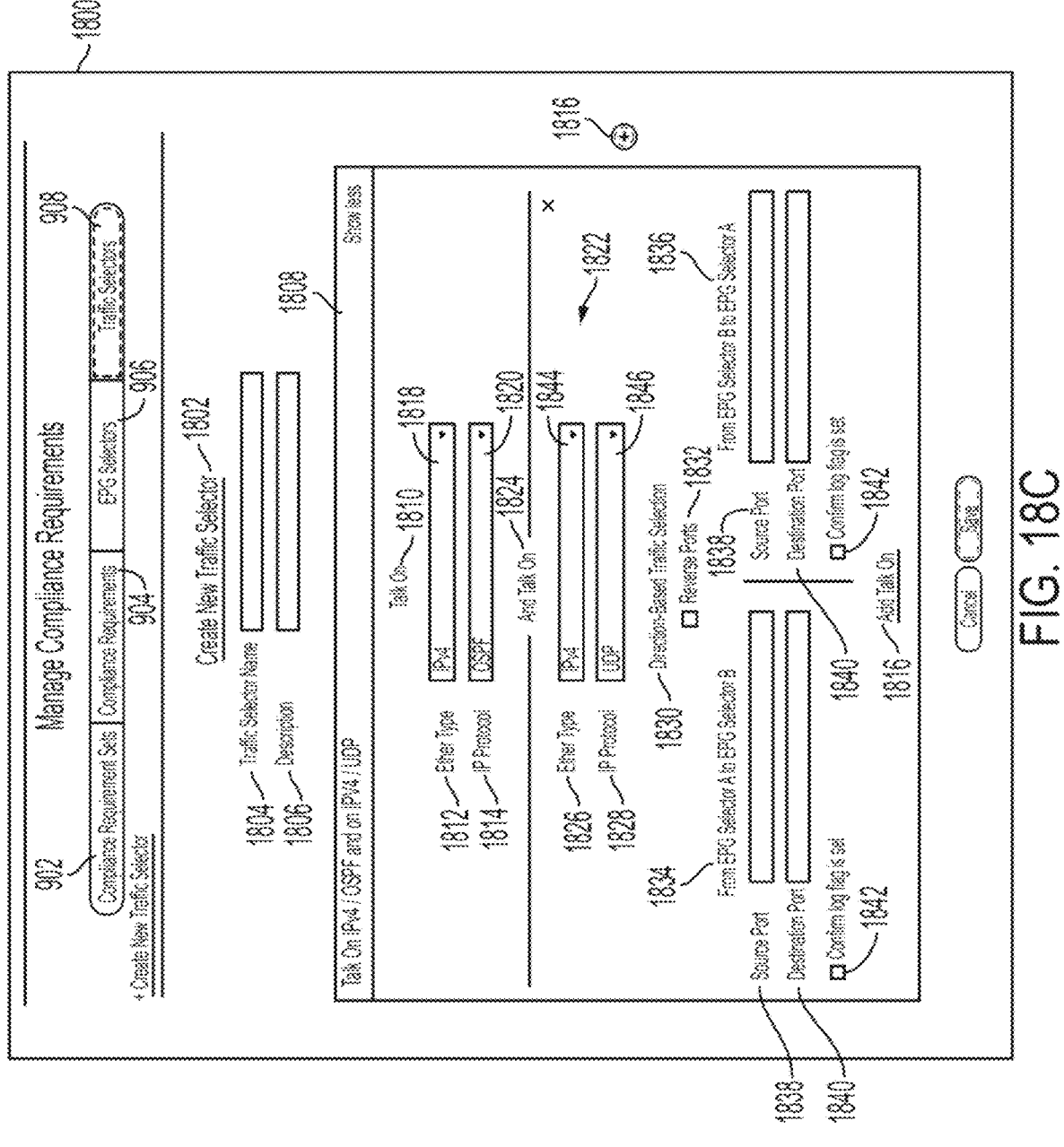

FIG. 18C illustrates a Direction-Based Traffic Configuration Section 1830 in New Traffic Selector Interface 1800 for providing additional configuration options for the Traffic Configuration Set 1822. The additional configuration options in the Direction-Based Traffic Configuration Section 1830 allow a user to provide additional conditions or configurations for each direction of traffic (e.g., from EPG Selector A to EPG Selector B and vice versa).

The Direction-Based Traffic Configuration Section 1830 can include Configuration Fields 1838-1842 for each Traffic Direction 1834 and 1836. For example, the Direction-Based Traffic Configuration Section 1830 can include a source port field (1838) for specifying a traffic source port, a destination port field (1840) for specifying a traffic destination port, and a log flag setting field (1842) for confirming that a log flag is set. The Direction-Based Traffic Configuration Section 1830 can include the source port field (1838), the destination port field (1840) and the log flag setting field (1842) for each Traffic Direction 1834 and 1836, which in this example includes traffic from EPG Selector A to EPG Selector B (Traffic Direction 1834) and traffic from EPG Selector B to EPG Selector A (Traffic Direction 1836). Thus, through the Configuration Fields 1838-1842 in the Direction-Based Traffic Configuration Section 1830, the user can configure attributes or conditions for each specific Traffic Direction 1834 and 1836 (e.g., from EPG Selector A to EPG Selector B, and from EPG Selector B to EPG Selector A).

The Direction-Based Traffic Configuration Section 1830 can also include a Reverse Ports Option 1832, which the user can select, activate, enable, etc., to reverse the ports (e.g., source and destination ports) or port values in the source port field (1838) and the destination port field (1840) of the two Traffic Directions 1834 and 1836.

FIG. 18C also illustrates example EtherType and IP Protocol selections (1844 and 1846) for the Traffic Attribute Fields 1826 and 1828. In FIG. 18C, the Traffic Attribute Field 1826 for EtherType is set to IPv4 (1844) and the Traffic Attribute Field 1828 for IP Protocol is set to User Datagram Protocol (1846) or UDP. Together, the selections (1818, 1820, 1844, 1846) in the Traffic Attribute Fields 1812-1814 and 1826-1828 of the Traffic Selector Configuration Section 1808, including the Traffic Configuration Set 1822, provide that the traffic selector being created applies to traffic having an IPv4 (1818) EtherType (1812) and OSPF (1820) IP Protocol (1814) and traffic having an IPv4 (1844) EtherType (1826) and UDP (1846) IP Protocol (1828).

Figure 18D:
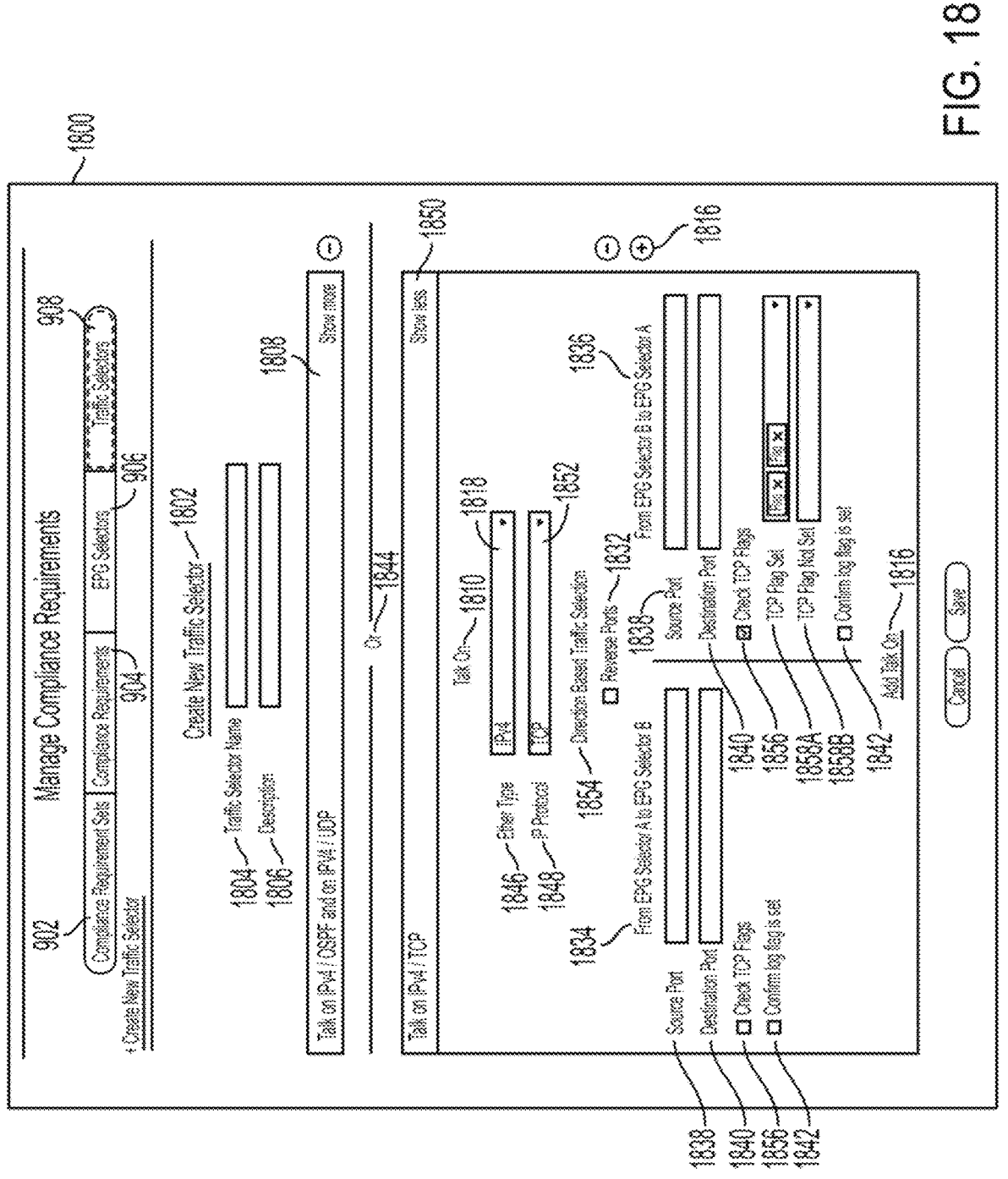

With reference to FIG. 18D, a user can add a Traffic Selector Configuration Section 1850 (e.g., via Add Links 1816) to provide additional configurations, conditions, filters, etc., for the new traffic selector being created. The Traffic Selector Configuration Section 1850 can be additional to, and/or separate from, the Traffic Selector Configuration Section 1808, and can allow the user to configure additional and/or alternative conditions, filters, settings, etc.

In adding the Traffic Selector Configuration Section 1850, the user can select an Operator 1844, which can serve as a logical or Boolean operator (e.g., AND, OR, etc.), to specify whether the configurations or attributes in the Traffic Selector Configuration Section 1850 should apply in addition to (e.g., AND) or alternatively to (e.g., OR) the configurations or attributes in the Traffic Selector Configuration Section 1808. In the example of FIG. 18D, the Operator 1844 is an OR operator. Therefore, the Operator 1844 provides that the new traffic selector being created in FIG. 18D should apply to traffic having the characteristics or conditions specified in the Traffic Selector Configuration Section 1808 or traffic having the characteristics or conditions specified in the Traffic Selector Configuration Section 1850.

The Traffic Selector Configuration Section 1850 can include Traffic Attribute Fields 1846 and 1848, which allow a user to define traffic attributes in the Traffic Selector Configuration Section 1850 for the new traffic selector. In this example, Traffic Attribute Fields 1846 and 1848 allow a user to define an EtherType (1846) and an IP protocol (1848) for the traffic. FIG. 18D shows example Selections 1818 and 1852 for the Traffic Attribute Fields 1846 and 1848, including IPv4 (1818) for the EtherType field (1846) and TCP (1852) for the IP protocol field (1848).

The Traffic Selector Configuration Section 1850 can also include a Direction-Based Traffic Configuration Section 1854 for providing additional configuration options for each direction of traffic (e.g., from EPG Selector A to EPG Selector B, and from EPG Selector B to EPG Selector A). The Direction-Based Traffic Configuration Section 1854 can include Configuration Fields 1838-1842 for each Traffic Direction 1834 and 1836. For example, the Direction-Based Traffic Configuration Section 1854 can include a source port field (1838) for specifying a traffic source port, a destination port field (1840) for specifying a traffic destination port, and a log flag setting field (1842) for confirming that a log flag is set. The Direction-Based Traffic Configuration Section 1854 can include the source port field (1838), the destination port field (1840) and the log flag setting field (1842) for each Traffic Direction 1834 and 1836, which in this example includes traffic from EPG Selector A to EPG Selector B (Traffic Direction 1834) and traffic from EPG Selector B to EPG Selector A (Traffic Direction 1836).

The Direction-Based Traffic Configuration Section 1854 can also include a Reverse Ports Option 1832, as previously explained. The Direction-Based Traffic Configuration Section 1854 can also include a Check TCP Flags Option 1856 for each Traffic Direction 1834 and 1836 (e.g., from EPG Selector A to EPG Selector B, and from EPG Selector B to EPG Selector A). The Check TCP Flags Option 1856 is a TCP-specific configuration option which can be provided because, for example, the user has selected TCP (1852) as the IP protocol in the Traffic Attribute Field 1848. Thus, the options, settings, attributes, conditions, fields, etc., available in a traffic configuration section (e.g., 1808, 1850) can vary based on what is selected in the traffic attribute fields (e.g., 1812-1814, 1826-1828, 1846-1848), to include options, settings, attributes, conditions, fields, etc., that may be specific to a selected attribute such as an EtherType or an IP protocol. In this example, the user has selected TCP (1852) in the Traffic Attribute Field 1848 and the Check TCP Flags Option 1856 is an option specific to TCP provided because TCP has been selected as the IP protocol in Traffic Attribute Field 1848.

In FIG. 18D, the Check TCP Flags Option 1856 for Traffic Direction 1834 (from EPG Selector A to EPG Selector B) has not been selected or enabled, while the Check TCP Flags Option 1856 for Traffic Direction 1836 (from EPG Selector B to EPG Selector A) has been selected or enabled. Because the Check TCP Flags Option 1856 for Traffic Direction 1836 has been selected or enabled, the Direction-Based Traffic Configuration Section 1854 can provide additional configuration options pertaining to the Check TCP Flags Option 1856 selected or enabled. For example, when the Check TCP Flags Option 1856 is selected or enabled, the Direction-Based Traffic Configuration Section 1854 can provide a TCP Flag Set Field 1858A, where a user can specify which set TCP flags (e.g., ACK flag, SYN flag, FIN flag, URG flag, PSH flag, RST flag, ECE flag, CWR flag, etc.) should be checked, and a TCP Flag Not Set Field 1858B, where a user can specify which TCP flags that are not set should be checked.

Figure 18E:
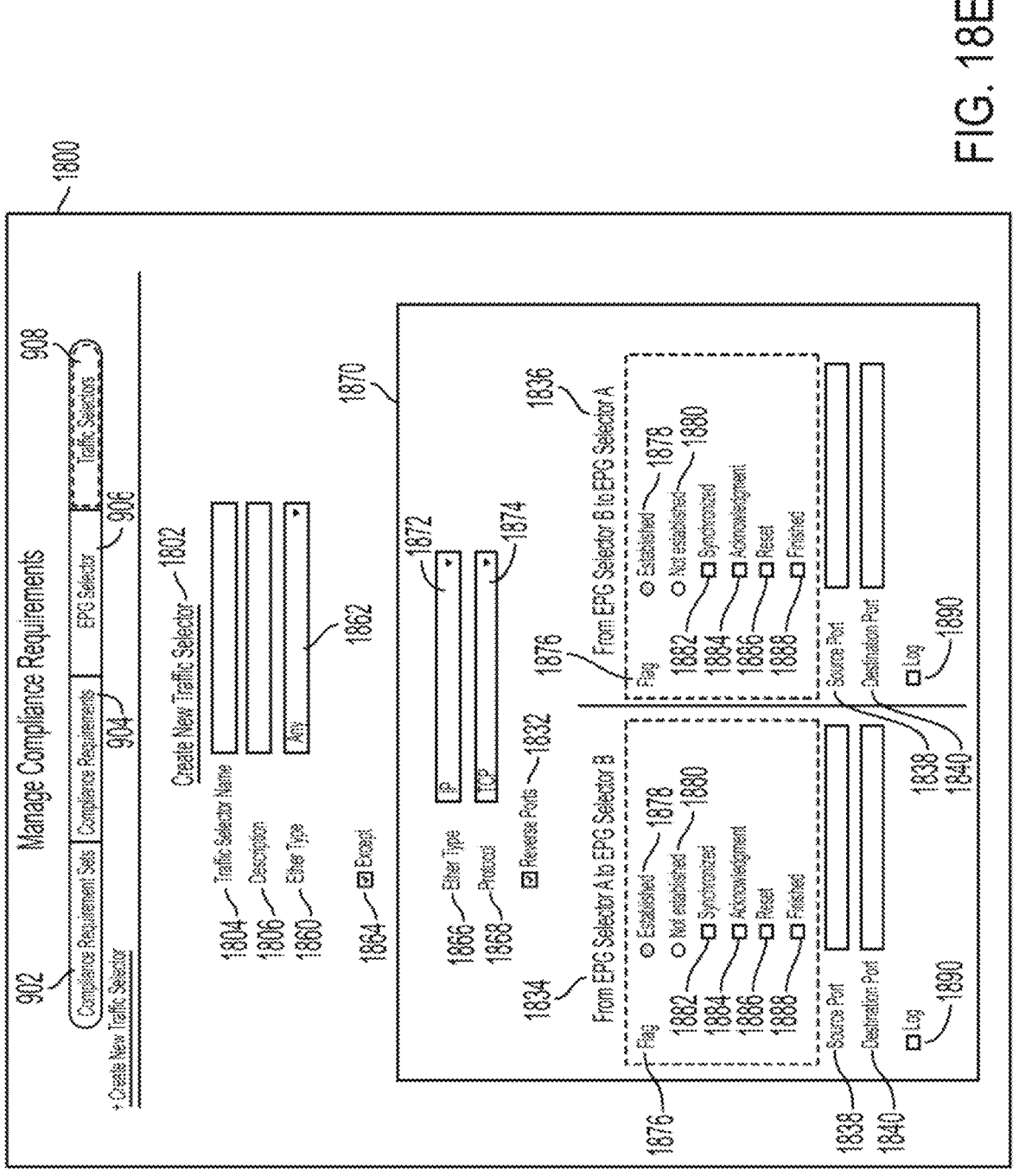

FIG. 18E illustrates another example configuration of the New Traffic Selector Interface 1800 and the Create New Traffic Selector Section 1802 for creating a new traffic selector. The Create New Traffic Selector Section 1802 includes Traffic Selector Name Field 1804 and Traffic Selector Description Field 1806. In addition, the Create New Traffic Selector Section 1802 includes an EtherType Field 1860 where the user can specify or select an EtherType. In this example, the EtherType Value 1862 in the EtherType Field 1860 has been set to "Any", meaning that any EtherType can satisfy the EtherType condition or definition in the EtherType Field 1860.

The Create New Traffic Selector Section 1802 can include an Exception Option 1864, which when selected or enabled allows the user to provide or define exceptions through a Traffic Selector Exceptions Section 1870. Thus, the Exception Option 1864 allows the user to define exceptions for scenarios that otherwise satisfy the EtherType condition or definition (e.g., 1862) specified in the EtherType Field 1860 of the Create New Traffic Selector Section 1802.

In FIG. 18E, the Exception Option 1864 has been selected or enabled. Moreover, Traffic Selector Exceptions Section 1870 has been provided to allow the user to define specific configurations or attributes corresponding to the exception(s). Here, the Traffic Selector Exceptions Section 1870 includes Attribute Fields 1866-1868, which in this example include an EtherType field (1866) and a protocol field (1868). The Attribute Field Selections 1872-1874 specified for the Attribute Fields 1866-1868 are IP (1872) for EtherType (Attribute Field 1866) and TCP (1874) for the protocol field (Attribute Field 1868).

Traffic Selector Exceptions Section 1870 includes a Reverse Ports Option 1832 selected for traffic in both Traffic Directions 1834 and 1836 (e.g., from EPG Selector A to EPG Selector B and vice versa). Traffic Selector Exceptions Section 1870 can also include a Flag Settings Section 1876, a Source Port Field 1838, a Destination Port Field 1840, and a Log Option 1890 (e.g., for logging statistics, events, etc.) for each of the Traffic Directions 1834 and 1836, to allow the user to provide specific configurations or attributes for each direction of traffic.

The Flag Settings Section 1876 pertains to TCP flag settings, which in some implementations is provided as an option in response to the user selecting TCP (1874) in the protocol field (e.g., Attribute Field 1868). The Flag Settings Section 1876 can include an Established Option 1878, which applies to cases where a TCP session or flag (e.g., ACK, RST, etc.) has been established, and a Not Established Option 1880, which applies to cases where a TCP session or flag has not been established. Under the Not Established Option 1880, the Flag Settings Section 1876 can include Flag Options 1882-1888, which allow a user to select or specify specific TCP flags (e.g., SYN, ACK, RST, FIN, etc.) corresponding to the Not Established Option 1880 (e.g., having a not established state or status).

FIG. 19 illustrates a New EPG Selector Interface 1900 for creating an EPG selector. As previously explained, to create compliance requirements a user may first create EPG selector(s) and traffic selector(s) that can be used to configure the compliance requirements. The New EPG Selector Interface 1900 provides an interface where the user can create a new EPG selector and define specific configurations or attributes for that EPG selector.

The New EPG Selector Interface 1900 includes a Create New EPG Selector Section 1902 where the user can input specific attributes, values, conditions, settings, etc., for the EPG selector being created. The Create New EPG Selector Section 1902 can include an EPG Selector Name Field 1904 where the user can provide a name for the EPG selector being created, and an EPG Selector Description Field 1906 where the user can input a description for the EPG selector.

The Create New EPG Selector Section 1902 can include Included EPGs Link 1908A for accessing included EPGs and/or Included EPGs Section 1910, and Excluded EPGs Link 1908B for accessing excluded EPGs and/or Excluded EPGs Section 1940. The Included EPGs Section 1910 allows a user to define attributes or criteria for determining which EPGs should be included in the EPG selector, and the Excluded EPGs Section 1940 allows a user to define attributes or criteria for determining which (if any) EPGs should be excluded from the EPG selector.

The Included EPGs Section 1910 can include one or more Inclusion Criteria Sets 1912, 1920 for specifying the parameters, attributes and/or criteria to be used in determining which EPGs should be included in the EPG selector. For example, the Inclusion Criteria Set 1912 can include Inclusion Parameters 1914 that should be met by an EPG to be included in the EPG selector. The Inclusion Parameters 1914 can include Object Definitions 1916A-C and Expressions 1918A-C defining properties or attributes associated with the Object Definitions 1916A-C. The Object Definitions 1916A-C can specify or define specific objects, such as EPGs, tenants, distinguished names (DNs), application profiles (APs), VRFs, EPG tags, etc., and the Expressions 1918A-C can define specific properties or attributes associated with the objects defined in the Object Definitions 1916A-C. The Object Definitions 1916A-C and Expressions 1918A-C can provide the criteria or parameters used to determine which EPGs should be included in the EPG selector.

For example, the Object Definitions 1916A include EPG, DN, and tenant objects, and the Expression 1918A includes the value or expression "secure". Here, the Object Definitions 1916A and Expression 1918A together provide that an EPG with DN/tn- (e.g., tenant name) "secure" should be included in the EPG selector. Moreover, the Object Definition 1916B includes AP (Application Profile) and the Expression 1918B includes the value or expression "Any", meaning that any application profile should be included in the EPG selector. The Object Definition 1916C corresponds to an EPG name and the Expression 1918C includes the value or expression "PCI", meaning that an EPG with the name "PCI" should be included in the EPG selector. Thus, based on the Object Definitions 1916A-C and Expressions 1918A-C, the Inclusion Parameters 1914 provide that an EPG would match the conditions or parameters in the Object Definitions 1916A-C and Expressions 1918A-C and would be included in the EPG selector if it has the DN/tn-secure, is associated with any application profile, and has the name "PCI".

The Included EPGs Section 1910 can include additional inclusion criteria sets (e.g., 1920). In FIG. 19, the Included EPGs Section 1910 also includes Inclusion Criteria Set 1920, which is another inclusion criteria set. The Inclusion Criteria Set 1920 in this example includes Inclusion Parameters 1922, 1924, and 1926. Inclusion Parameters 1924 and 1926 are nested or "AND" parameters, meaning that the Inclusion Parameters 1924 and 1926 should be met in addition to Inclusion Parameters 1922 as opposed to alternatively or in lieu of. Thus, to be included in the EPG selector based on the Inclusion Parameters 1922, 1924, 1926, an EPG should satisfy or meet all of the Inclusion Parameters 1922, 1924, 1926.

In this example, Inclusion Parameters 1922 includes Object Definitions 1928 and Expression 1930. Object Definitions 1928 include tenant, DN, and tn- or tenant name, and Expression 1930 includes the value "secure". Thus, Object Definitions 1928 and Expression 1930 provide that an EPG should be included in the EPG selector if the EPG is included in a tenant with DN/tn-secure (e.g., EPG in tenant with DN and tenant name "secure").

Inclusion Parameters 1924 include Object Definitions 1932A (VRF, DN, tn-) and Expression 1934A ("common"), and Object Definition 1932B (context) and Expression 1934B ("default"). According to Inclusion Parameters 1924, to be included in the EPG selector, in addition to satisfying the Inclusion Parameters 1914, an EPG should also be in a VRF with DN/tn-common and the context "default" (ctx-default).

Inclusion Parameters 1926 include Object Definition 1936 (EPG-Tag) and Expression 1938 ("Any"). Thus, based on Inclusion Parameters 1926, to be included in the EPG selector, in addition to satisfying the Inclusion Parameters 1914 and 1924, an EPG should also have an EPG tag "Any" (e.g., any EPG tag).

The Included EPGs Section 1910 can also include Remove Elements 1946 which can be selected or used to remove one or more parameters. For example, the Inclusion Parameters 1924 and 1926 in the Inclusion Criteria Set 1920 can include Remove Elements 1946 that a user can use to remove any or all parameters provided in the Inclusion Parameters 1924 and 1926. To illustrate, if the user determines that the Inclusion Parameters 1926 are unnecessary or should be removed, the user can select the Remove Element 1946 corresponding to the Inclusion Parameters 1926 (e.g., the Remove Element 1946 next to or closest to the Inclusion Parameters 1926, a remove element that is associated with the Inclusion Parameters 1926, and/or a remove element that is configured to allow the user specify what the user wants to remove). The Included EPGs Section 1910 can also include Add Elements 1948 that enable a user to add inclusion or exclusion parameters and/or criteria sets.

The Excluded EPGs Section 1940 allows a user to provide Exclusion Criteria Sets 1944. Each exclusion criteria set can include exclusion parameters with object definitions and expressions similar to the Included EPGs Section 1910, as well as any other criteria or type of criteria.

Figure 20A:
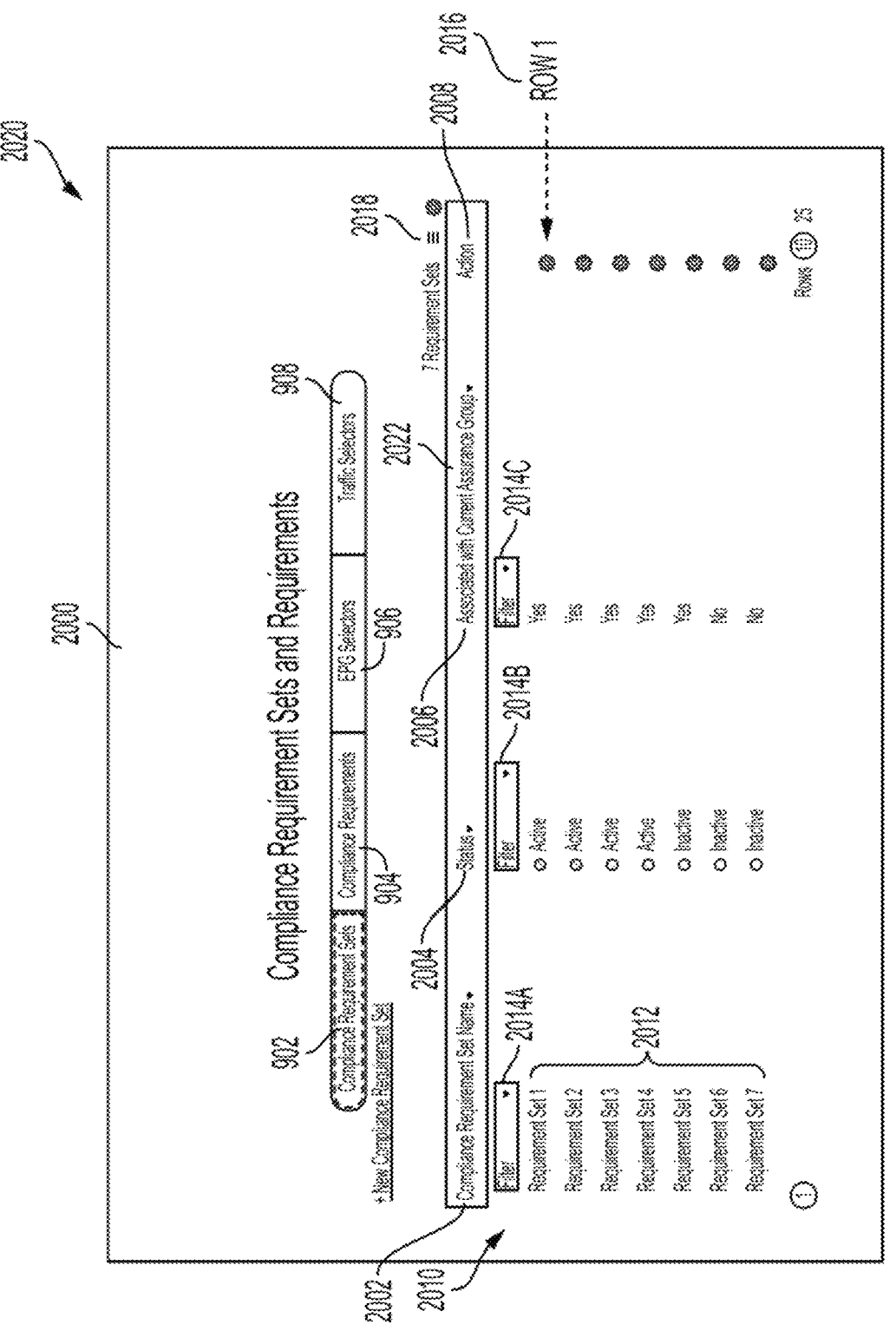
FIGS. 20A through 20D illustrate example configurations of a compliance requirement sets interface.

FIG. 20A illustrates an example Configuration 2020 of a Compliance Requirement Sets Interface 2000. The Compliance Requirement Sets Interface 2000 can be accessed from the Compliance Requirement Sets Tab 902. The Compliance Requirement Sets Interface 2000 can display a Table 2010 identifying Compliance Requirement Sets 2012 configured in the system, and may be used to access, modify, add, or remove information associated with the Compliance Requirement Sets 2012 on the system. The Table 2010 can include a Name Column 2002, a Status Column 2004 which indicates whether a compliance requirement set is active or inactive, an Association Column 2006 which indicates whether a compliance requirement set is associated with an assurance group (e.g., a group of compliance requirement sets) or is not associated with an assurance group, and an Action Column 2008.

The Compliance Requirement Sets 2012 in Configuration 2020 are thus displayed in the Table 2010 by name, status (e.g., active, inactive), association (e.g., is associated with an assurance group, is not associated with an assurance group or a group of compliance requirement sets), and action. For example, Row 1 (2016) of the Table 2010 includes a compliance requirement set with the name "Requirement Set 1", an active status, and an association with an assurance group.

The Table 2010 in the Compliance Requirement Sets Interface 2000 can also include Filter Fields 2014A-C where a user can input or select filtering criteria or values for filtering Compliance Requirement Sets 2012 displayed in the Table 2010. For example, the Compliance Requirement Sets Interface 2000 can include a Name Filter Field 2014A where a user can filter compliance requirement sets by name, a Status Filter Field 2014B where a user can filter compliance requirement sets by status, and an Association Filter Field 2014C where a user can filter compliance requirement sets by association (or lack thereof).

The Compliance Requirement Sets Interface 2000 can include a Settings Function 2018 which allows a user to modify columns and/or information presented in the Table 2010 and/or the Compliance Requirement Sets Interface 2000. For example, the Table 2010 in the example Configuration 2020 of the Compliance Requirement Sets Interface 2000 includes a Name Column 2002, a Status Column 2004, an Association Column 2006, and an Action Column 2008, as previously explained. The Settings Function 2018 allows the columns in Table 2010 to be modified to include more or less columns or information, including one or more different or same columns.

Figure 20B:
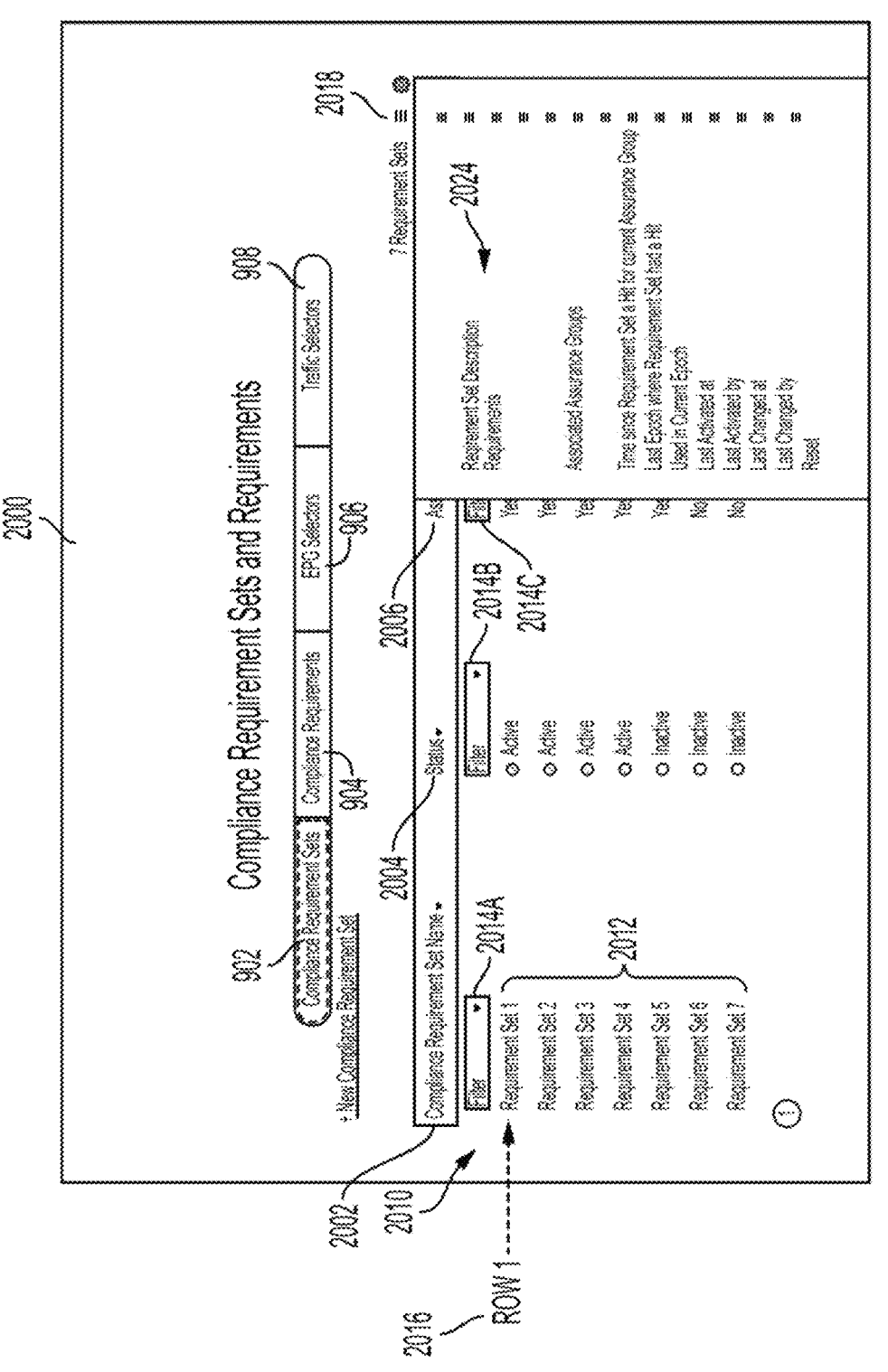

For example, with reference to FIG. 20B, when a user selects or activates the Settings Function 2018, the Compliance Requirement Sets Interface 2000 can present an Interface Element 2022 such as a window, screen, frame, graphic, box, prompt, pop-up, etc., which presents Columns 2024 that may be added to, or removed from, the Table 2010. Non-limiting examples of columns (2024) that can be added to the Table 2010 from the Interface Element 2022 include a compliance requirement set description column, a compliance requirements column identifying the compliance requirements configured for each compliance requirement set presented in the Table 2010, an associated assurance groups column identifying the assurance groups that the compliance requirement sets (2012) displayed in the Table 2010 are associated with (if any), a column indicating a time since each compliance requirement set had a hit for an associated assurance group, a column indicating the last epoch where a compliance requirement set had a hit, a column indicating whether a compliance requirement set is used in the current epoch, one or more columns indicating a time or event that last activated a compliance requirement set, one or more columns indicating a time or event that last changed a compliance requirement set, etc.

Figure 20C:
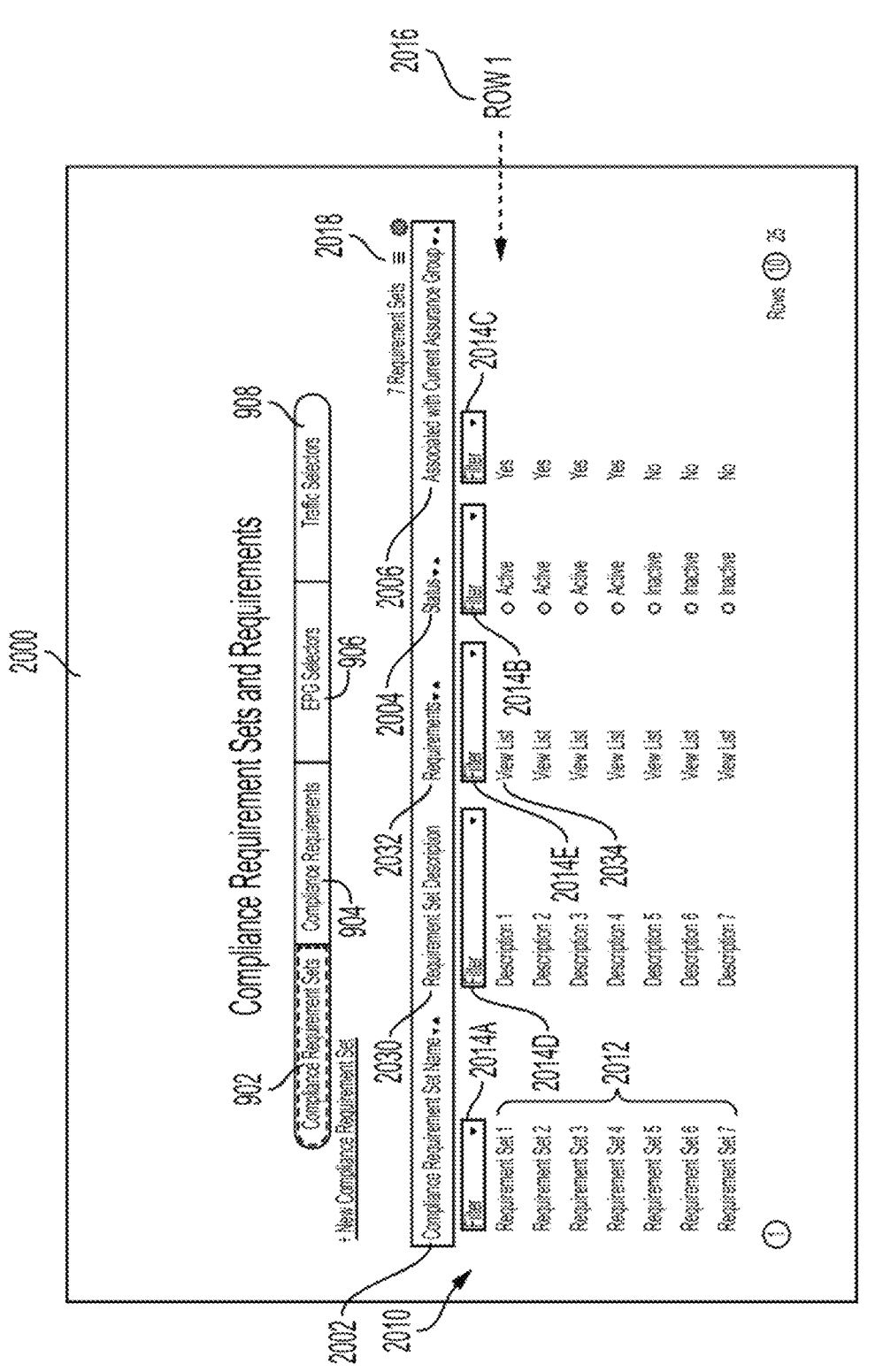

FIG. 20C illustrates the Compliance Requirement Sets Interface 2000 and Table 2010 after columns in the Table 2010 have been added and removed via the Interface Element 2022 accessed from through Settings Function 2018. In this example, a Compliance Requirement Set Description Column 2030 and a Compliance Requirements Column 2032 have been added to the Table 2010, and the Action Column 2008 has been removed from the Table 2010.

The Compliance Requirement Set Description Column 2030 includes a description of Compliance Requirement Sets 2012 displayed in the Table 2010, and the Compliance Requirements Column 2032 includes a link or list for viewing the compliance requirements configured for the Compliance Requirement Sets 2012 in the Table 2010. The Compliance Requirement Set Description Column 2030 and the Compliance Requirements Column 2032 can include Filters 2014D-E for filtering compliance requirement sets based on a compliance requirement set description (e.g., Filter 2014D) and/or one or more configured compliance requirements (e.g., Filter 2014E).

Figure 20D:
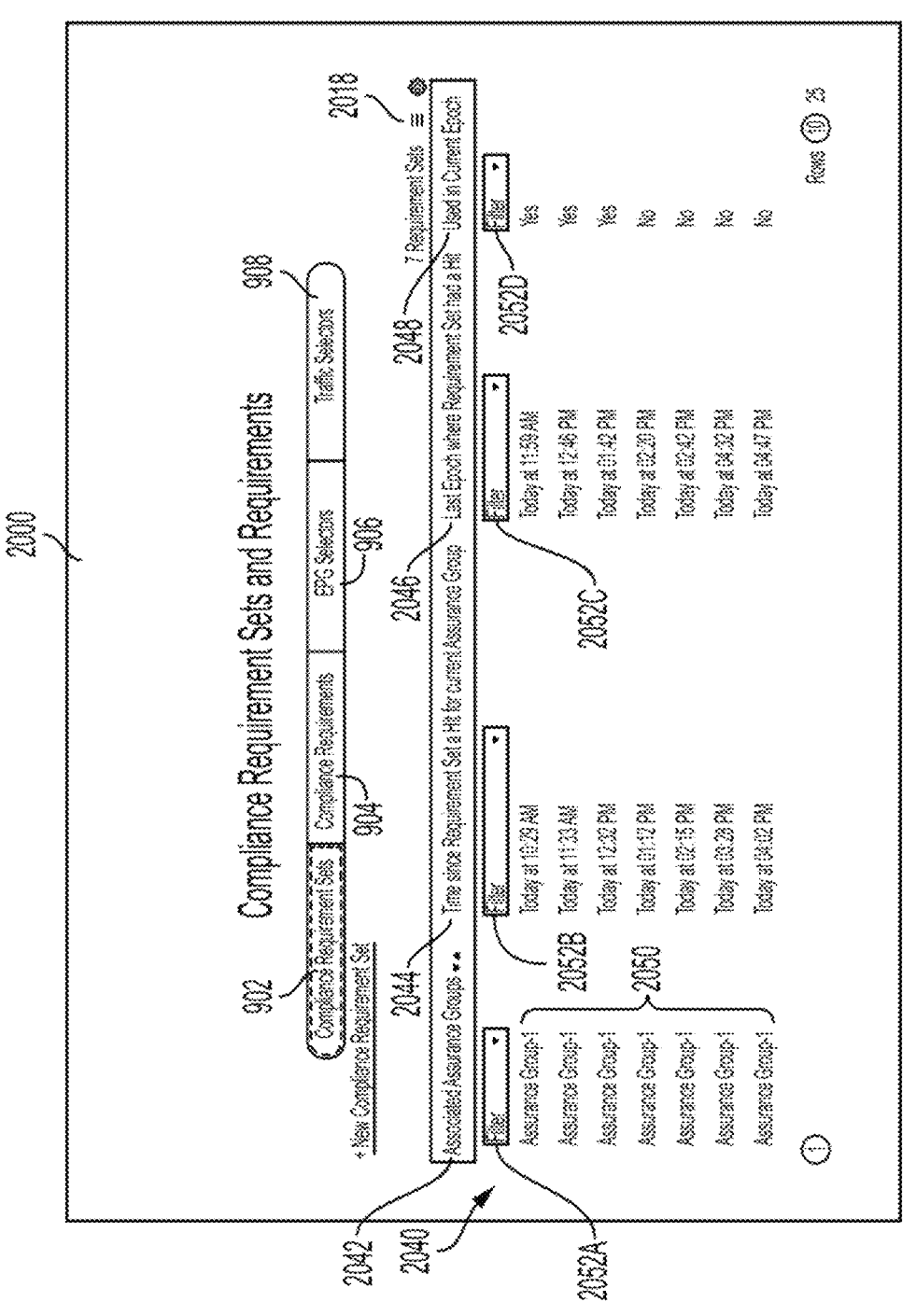

FIG. 20D illustrates a view of Compliance Requirement Sets Interface 2000 depicting a Table 2040 of attributes and/or statistics associated with a compliance requirement set selected from Compliance Requirement Sets 2012 in Table 2010 shown in FIGS. 20A-C. The Table 2040 includes an Assurance Group Column 2042 identifying associated assurance groups, a Column 2044 identifying a time since the compliance requirement set had a hit for the current assurance group, a Column 2046 identifying a last epoch where the compliance requirement set had a hit, and a Column 2048 identifying whether the compliance requirement set is used in the current epoch.

The Table 2040 can include Rows 2050 of information for Columns 2042-2048. Moreover, the Columns 2042-2048 can include Filters 2052A-D for filtering information in the Table 2040. For example, Column 2042 can include Filter 2052A for filtering information from Column 2042, Column 2044 can include Filter 2052B for filtering information from Column 2044, Column 2046 can include Filter 2052C for filtering information from Column 2046, and Column 2048 can include Filter 2052D for filtering information from Column 2048.

Turning back to FIG. 20C, when a user selects from the Compliance Requirements Column 2032 to view the compliance requirements associated with a compliance requirement set in Table 2010 of the Compliance Requirement Sets Interface 2000, the system can present an interface or view (e.g., a screen, a frame, a window, a tab, etc.) displaying the selected compliance requirements. For example, if a user selects View List Link 2034 from the Compliance Requirements Column 2032 in Table 2010, the system will display the compliance requirements associated with the compliance requirement set corresponding to the View List Link 2034.

Figure 21:
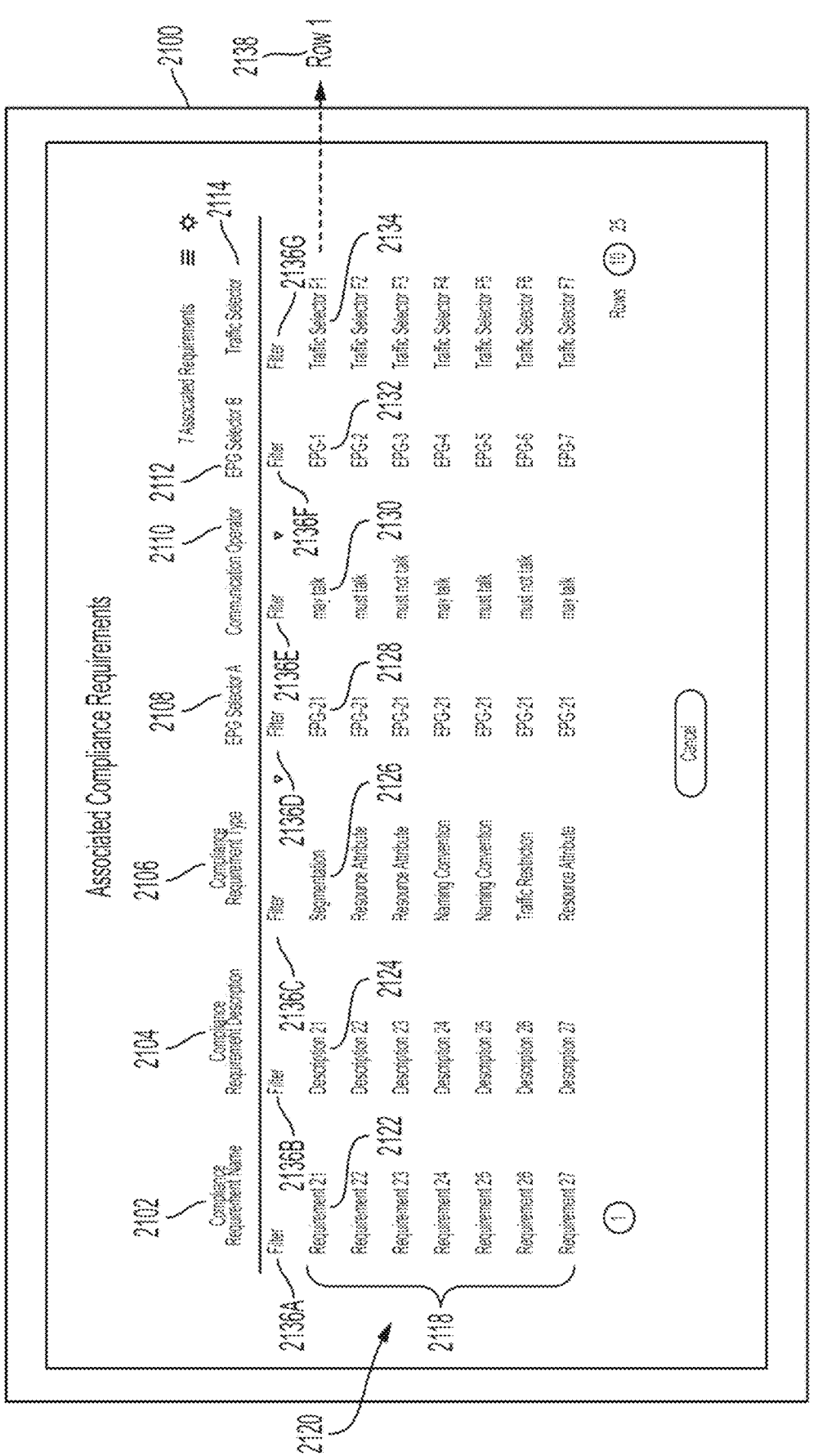
FIG. 21 illustrates an example compliance requirements interface identifying compliance requirements associated with a compliance requirement set.

To illustrate, with reference to FIG. 21, when a user selects View List Link 2034, the system can present a Compliance Requirements Interface 2100 identifying the compliance requirements (and associated information) associated with the compliance requirement set associated with the View List Link 2034. The Compliance Requirements Interface 2100 includes a Table 2120 of Compliance Requirements 2118. The Table 2120 includes various Columns 2102-2114 of information associated with the Compliance Requirements 2118, and the Columns 2102-2114 can include Filters 2136A-G for filtering the compliance requirement information in Table 2120.

In this example, the Table 2120 includes a Compliance Requirement Name Column 2102 which includes the names of the Compliance Requirements 2118, a Compliance Requirement Description Column 2104 which includes descriptions of the Compliance Requirements 2118, a Compliance Requirement Type Column 2106 which identifies the types of compliance requirements (e.g., segmentation requirement, traffic restriction requirement, naming convention requirement, resource or object attribute requirement, SLA requirement, etc.) of the Compliance Requirements 2118, an EPG Selector A Column 2108 which identifies the EPGs selected as the EPG selector A (e.g., the source or destination EPG) for the Compliance Requirements 2118, a Communication Operator Column 2110 which identifies the communication operators (e.g., may talk, must talk, must not talk, etc.) configured for the Compliance Requirements 2118, an EPG Selector B Column 2112 which identifies the EPGs selected as the EPG selector B (e.g., the source or destination EPG) for the Compliance Requirements 2118, and a Traffic Selector Column 2114 which identifies the specific traffic selectors configured for the Compliance Requirements 2118.

The various Columns 2102-2114 in Table 2120 include respective information pertaining to the Compliance Requirements 2118 included in the Table 2120. To illustrate, in Row 1 (2138) of Table 2120, the Name Entry 2122 in the Compliance Requirement Name Column 2102 indicates the name of the compliance requirement associated with Row 1 (2138) is "Requirement 21", the Description Entry 2124 in the Compliance Requirement Description Column 2104 includes the description "Description 21" for the compliance requirement associated with Row 1 (2138), the Type Entry 2126 in the Compliance Requirement Type Column 2106 indicates that the type of the compliance requirement associated with Row 1 (2138) is "Segmentation", EPG Entry 2128 in the EPG Selector A Column 2108 indicates that the EPG selected as the EPG Selector A for the compliance requirement associated with Row 1 (2138) is "EPG-21", the Operator Entry 2130 in the Communication Operator Column 2110 indicates that the communications operator for the compliance requirement associated with Row 1 (2138) is "May Talk", the EPG Entry 2132 in the EPG Selector B Column 2112 indicates that the EPG selected as the EPG Selector B for the compliance requirement associated with Row 1 (2138) is "EPG-1", and the Traffic Selector Entry 2134 in the Traffic Selector Column 2114 indicates that the traffic selector configured for the compliance requirement associated with Row 1 (2138) is "Traffic Selector F1".

Figure 22:
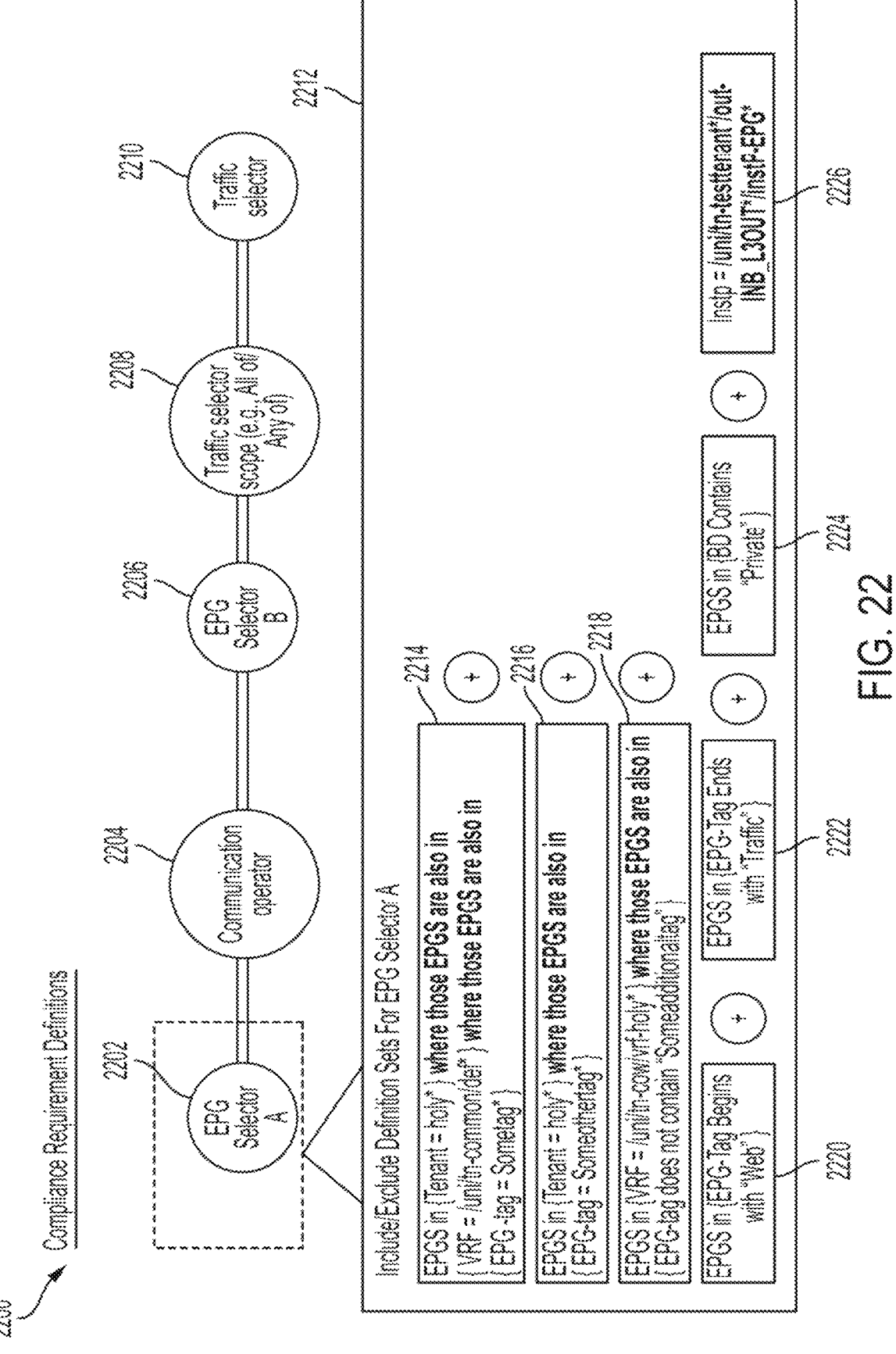
FIG. 22 illustrates a diagram of an example definitions scheme for configuring compliance requirements.

FIG. 22 illustrates a diagram of an example Definitions Scheme 2200 for configuring compliance requirements. Definitions Scheme 2200 first includes an EPG Selector Object 2202 representing an EPG Selector A for a compliance requirement. The user here can provide definitions for EPG Selector Object 2202 to configure the EPG selector A for the compliance requirement. The Definition Sets 2212 provide an example of Definitions 2214-2226 set for the EPG Selector Object 2202. The Definitions 2214-2226 provide the definitions (e.g., attributes, conditions, expressions, filters, criteria, parameters, etc.) for determining which EPG(s) should be in the EPG selector Object 2202 (e.g., the EPG(s) to be included in the EPG Selector A for the compliance requirement). The Definitions 2214-2226 can include definitions for including and/or excluding EPG(s) in the EPG Selector Object 2202. The example definitions (2214-2226) in the Definition Sets 2212 include criteria for selecting or including an EPG based on a tenant associated with the EPG, a VRF associated with the EPG, an EPG tag associated with the EPG, a bridge domain (BD) associated with the EPG, etc.

The Definitions Scheme 2200 further includes a Communication Operator Object 2204 representing the communication operator for the compliance requirement. The Communication Operator Object 2204 can include a communication operator definition (e.g., may talk to, must talk to, must not talk to, etc.) for the Communication Operator Object 2204. The Definitions Scheme 2200 includes EPG Selector Object 2206 representing the EPG Selector B for the compliance requirement. The EPG Selector Object 2206 can include a definitions set with definitions for determining which EPG(s) to include in the EPG Selector B, such as the Definitions 2214-2226 in Definitions Sets 2212 associated with EPG Selector Object 2202 associated with EPG Selector A.

The Definitions Scheme 2200 includes a Traffic Selector Scope Object 2208 and Traffic Selector Object 2210. The Traffic Selector Object 2210 represents the traffic selector for the compliance requirement, and can include definitions for identifying the traffic selector(s) for the compliance requirement. The Traffic Selector Scope Object 2208 can include definitions specifying the scope or rules for determining which traffic selectors configured for the Traffic Selector Object 2210 can or must satisfy or comply with the compliance requirement. For example, the Traffic Selector Scope Object 2208 can include definition(s) specifying which traffic selectors (e.g., 2210) should satisfy or comply with the requirements defined for the Communication Operator Object 2204 and the EPG Selector Objects 2202 and 2206 (e.g., EPG Selector A may talk to EPG Selector B, EPG Selector A must talk to EPG Selector B, EPG Selector A must not talk to EPG Selector B).

To illustrate, the Traffic Selector Scope Object 2208 can specify that communications matching the requirements defined for the Communication Operator Object 2204 and the EPG Selector Objects 2202, 2206 must be allowed/denied on all or any traffic selectors associated with the Traffic Selector Object 2210. For example, the Traffic Selector Scope Object 2208 can specify that EPG Selector A (e.g., 2202) may, must, or must not talk to EPG Selector B on all traffic selectors (e.g., 2210). As another example, the Traffic Selector Scope Object 2208 can specify that EPG Selector A (e.g., 2202) may, must, or must not talk to EPG Selector B on any traffic selectors (e.g., 2210). Thus, the Traffic Selector Scope Object 2208 can define which traffic selectors must apply/comply with the compliance requirement, including for example whether all traffic selectors must apply/comply or whether only a subset or any of the traffic selectors must apply/comply, etc.

Figures 23A, 23B:
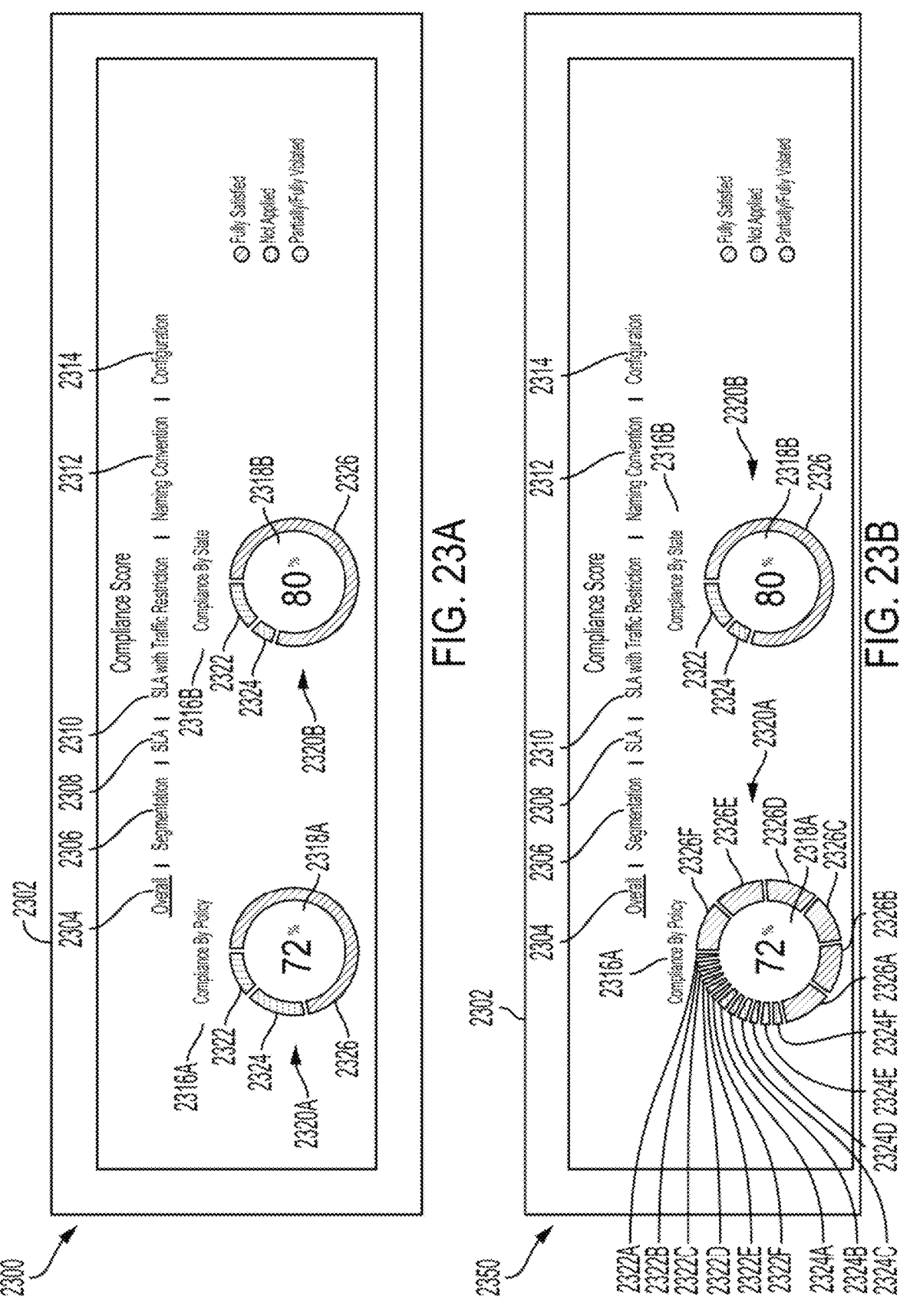
FIGS. 23A and 23B illustrate example configurations of a compliance score interface.

FIG. 23A illustrates an example Configuration 2300 of a Compliance Score Interface 2302. The Compliance Score Interface 2302 can display compliance scores and statistics. The compliance scores or statistics presented in the Compliance Score Interface 2302 can be derived by using any compliance requirements defined as previously described to perform assurance operations for determining whether the compliance requirements are satisfied (fully or partially), applied or enforced, violated (fully or partially), etc., based on the policies and/or configurations implemented in the network, such as ACI policies programmed in a network controller (e.g., an APIC controller), hardware (e.g., TCAM) rules programmed on devices in the network, etc.

In some implementations, the compliance scores and statistics can be displayed for specific types or categories of compliance requirements. For example, Compliance Score Interface 2302 can include an Overall Menu 2304 for accessing overall compliance scores (e.g., compliance scores for all types of compliance requirements, a Segmentation Menu 2306 for accessing or viewing compliance scores for segmentation requirements, an SLA Requirements Menu 2308 for accessing or viewing compliance scores for SLA requirements, an SLA With Traffic Restriction Requirements Menu 2310 for accessing or viewing compliance scores for SLA with traffic restriction requirements, a Naming Convention Requirements Menu 2312 for accessing or viewing compliance scores for naming convention requirements, or a Configuration Requirements Menu 2314 for accessing or viewing compliance scores for a specific configuration requirement.

In the example Configuration 2300 in FIG. 23A, the Compliance Score Interface 2302 displays compliance score information under the Overall Menu 2304. Here, the Compliance Score Interface 2302 includes a Compliance Score Graphic 2320A displaying a Compliance Score 2318A indicating a compliance by Policy 2316A and a Compliance Score Graphic 2320B displaying a Compliance Score 2318B indicating a compliance by State 2316B.

The Compliance Score Graphics 2320A-B in this example are pie charts divided into Slices 2322-2326 representing or illustrating the numerical proportion of compliance requirements partially or fully violated (Slice 2322), not applied (Slice 2324), and fully satisfied (Slice 2326). Thus, the Compliance Score Graphics 2320A-B can provide a total compliance score (e.g., 2318A and 2318B) and an indication of the number or proportion of compliance requirements that were violated (partially or fully), not applied, or fully satisfied. This information can provide an indication of the degree to which the configuration and/or behavior of the network complies or satisfies the compliance requirements.

FIG. 23B illustrates another Configuration 2350 of the Compliance Score Interface 2302 where the slices (e.g., 2322-2326) of Compliance Score Graphic 2320A are subdivided by requirement types or categories. For example, the Slice 2322 representing compliance requirements that are violated (partially or fully) is subdivided into Slices 2322A-F, where each slice (2322A-F) corresponds to a particular compliance requirement type or category, such as a segmentation requirement, an SLA requirement, an SLA with traffic restriction requirement, a naming convention requirement, a resource attribute requirement, a specific configuration requirement, etc. Moreover, the Slice 2324 representing compliance requirements that are not applied is subdivided into Slices 2324A-F, where each slice (2324A-F) corresponds to a particular compliance requirement type or category. Further, the Slice 2326 representing compliance requirements that are fully satisfied is subdivided into Slices 2326A-F, where each slice (2326A-F) corresponds to a particular compliance requirement type or category.

In some cases, the Compliance Score Graphics 2320A-B and/or the Slices (2322, 2324, 2326, 2322A-F, 2324A-F, 2326A-F) in FIGS. 23A and 23B can be dynamic, and can be selected to drill down (e.g., access more specific details) on the associated information. For example, a user can select Slice 2322A representing the compliance requirements violated (partially or fully) for a specific compliance requirement type or category (e.g., a segmentation requirement, an SLA requirement, etc.) to access additional information or statistics associated with that slice (i.e., Slice 2322A), such as a timestamp or epoch of each violation, the specific compliance requirement(s) that were violated, the specific network policies or conditions that caused the compliance requirement violations, any patterns associated with the compliance requirement violations, items associated with the compliance requirement violations (e.g., objects, network segments, network devices, network configurations or policies, packets or flows, etc.), information about the compliance requirement violations (e.g., descriptions, notifications, statistics, compliance or configuration suggestions, violation culprits, requirements information, network conditions during the compliance requirement violations, information about objects associated with the compliance violations such as VRFs or EPGs, etc.), and/or any other relevant information.

While the Compliance Score Graphics 2320A-B in FIGS. 23A-B are shown as pie charts, it should be noted that such configuration or implementation is provided as a non-limiting example for explanation purposes, and other types or configurations of the Compliance Score Graphics 2320A-B and/or other ways for presenting the compliance score information are also contemplated herein. For example, in some implementations, the compliance score information can be presented in a list, report, bar graph, table, log, heat map, and/or in any other scheme or configuration either in addition to or in lieu of the pie charts depicted by the Compliance Score Graphics 2320A-B.

Figure 24A:
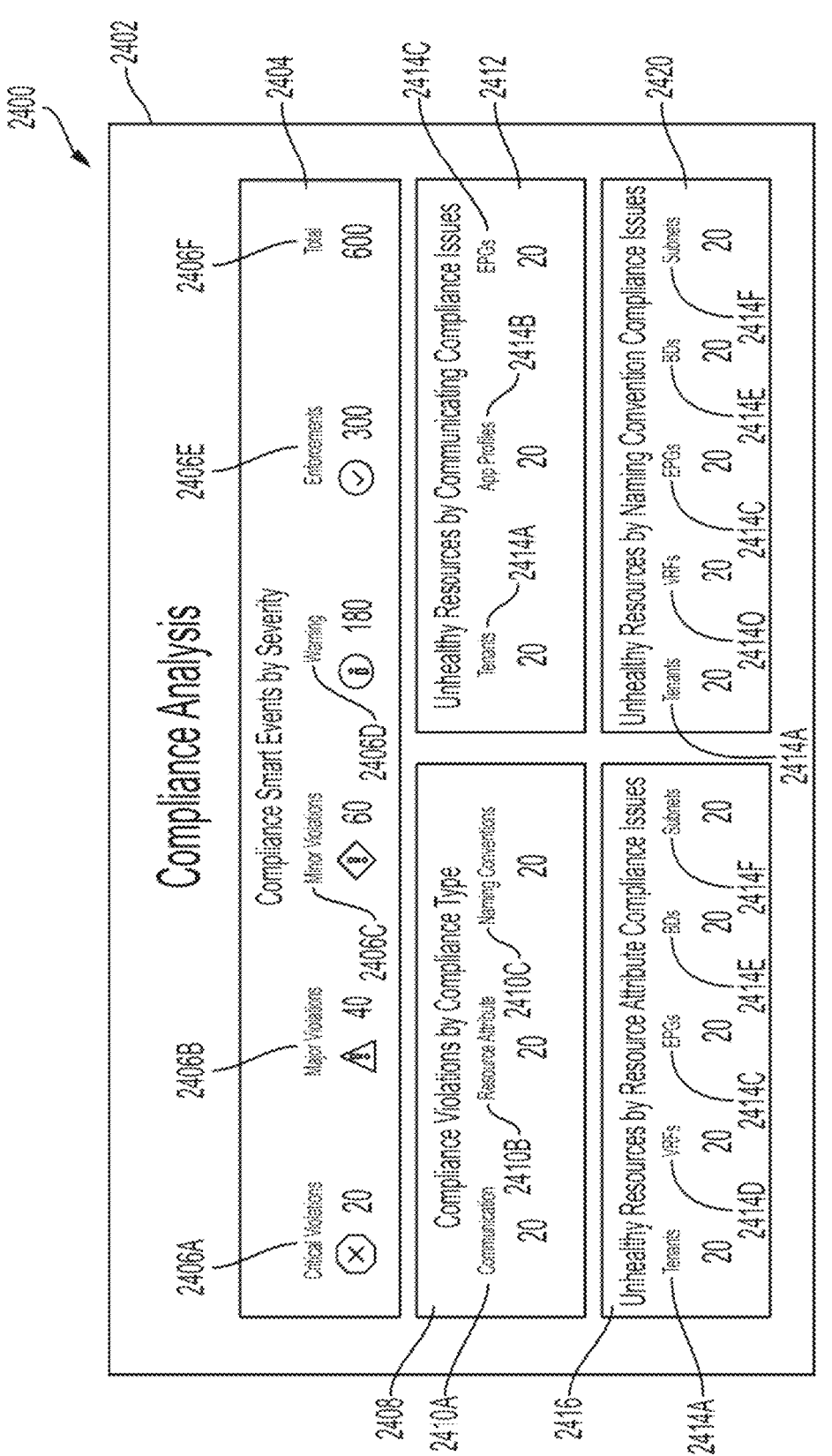
FIGS. 24A and 24B illustrate example views of a compliance analysis interface.

FIG. 24A illustrates an example View 2400 of a Compliance Analysis Interface 2402. The compliance and analysis information presented in the Compliance Analysis Interface 2402 can be derived by using any compliance requirements defined as previously described, to perform assurance operations for determining whether the compliance requirements are satisfied (fully or partially), applied or enforced, violated (fully or partially), etc., based on the policies and/or configurations implemented in the network.

In View 2400, the Compliance Analysis Interface 2402 includes a Section 2404 identifying compliance events by severity, including Critical Violations 2406A, Major Violations 2406B, Minor Violations 2406C, Warnings 20406D, Enforcements 2406E, and Total 2406F. The Compliance Analysis Interface 2402 can also include a Section 2408 identifying compliance violations by compliance type, including violations for Communication Requirements 2410A, Resource Attribute Requirements 2410B, and Naming Convention Requirements 2410C.

The Compliance Analysis Interface 2402 can further include a Section 2412 identifying unhealthy resources, including tenants (2414A), application profiles (2414B) and EPGs (2414C), by communication compliance issues. Moreover, the Compliance Analysis Interface 2402 can include a Section 2416 identifying unhealthy resources, including tenants (2414A), VRFs (2414D), EPGs (2414C), BDs (2414D), and subnets (2414E), by resource attribute compliance issues. The Compliance Analysis Interface 2402 can also include a Section 2420 identifying unhealthy resources, including tenants (2414A), VRFs (2414D), EPGs (2414C), BDs (2414D), and subnets (2414E), by naming convention compliance issues. In this example, the Sections 2412, 2416, and 2420 can provide resource or object specific violations or issues for each of the compliance types in Section 2408. Thus, the Sections 2412, 2416, and 2420 can provide a different or more granular view of the violations or issues identified for each compliance type in Section 2408.

Figure 24B:
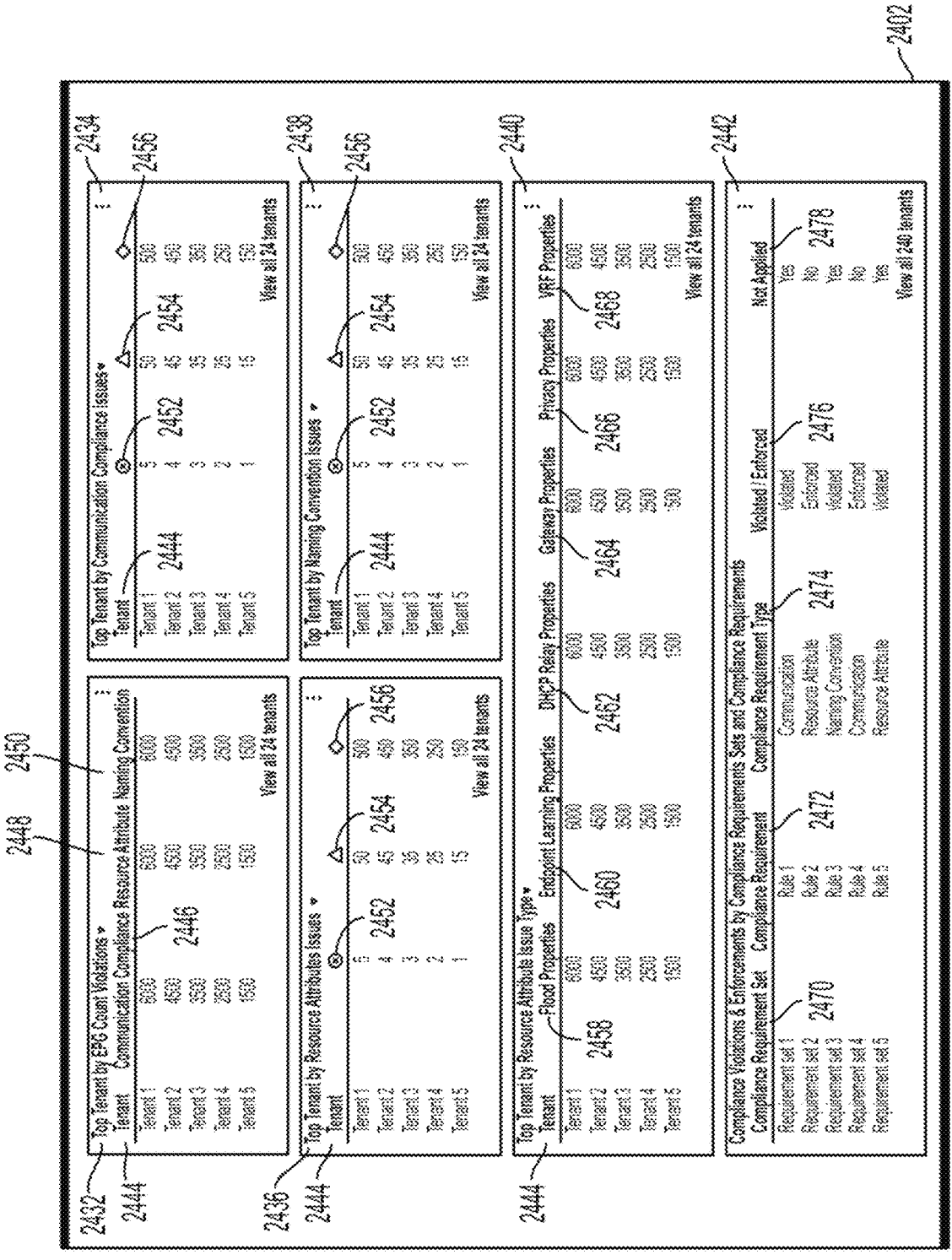

FIG. 24B illustrates another View 2430 of the Compliance Analysis Interface 2402 including various Tables 2432-2442 of compliance information and statistics. In this example, the Compliance Analysis Interface 2402 includes a Table 2432 presenting the top tenants by EPG count violations, a Table 2434 presenting the top tenants by communication compliance issues, a Table 2436 presenting the top tenants by resource attribute issues, a Table 2438 presenting the top tenants by naming convention issues, a Table 2440 presenting the top tenants by resource attribute issue type, and a Table 2442 presenting compliance violations and enforcements by compliance requirement sets and compliance requirements.

The Table 2432 presenting the top tenants by EPG count violations can include a Tenant Column 2444 identifying tenants for each row of statistics or information, a Communication Requirement Count Column 2446 including the number of communication compliance requirement violations for each tenant in Tenant Column 2444, a Resource Attribute Count Column 2448 including the number of resource attribute compliance requirement violations for each tenant in Tenant Column 2444, and a Naming Convention Count Column 2450 including the number of naming convention compliance requirement violations for each tenant in Tenant Column 2444.

The Table 2434 presenting the top tenants by communication compliance issues can include Tenant Column 2444, and Columns 2452-2456 including the number of communication compliance issues (e.g., traffic selector issues, traffic compliance issues, etc.) for various types of events, such as critical events (2452), major events (2454), and minor events (2456). For example, Column 2452 can display the number of critical events (e.g., communication compliance critical events) for each tenant in Tenant Column 2444, Column 2454 can display the number of major events (e.g., communication compliance major events) for each tenant in Tenant Column 2444, and Column 2456 can display the number of minor events (e.g., communication compliance minor events) for each tenant in Tenant Column 2444.

The Table 2436 presenting the top tenants by resource attribute compliance issues can include Tenant Column 2444, and Columns 2452-2456 including the number of resource attribute compliance issues for various types of events, such as critical events (2452), major events (2454), and minor events (2456). For example, Column 2452 can display the number of critical events (e.g., resource attribute compliance critical events) for each tenant in Tenant Column 2444, Column 2454 can display the number of major events (e.g., resource attribute compliance major events) for each tenant in Tenant Column 2444, and Column 2456 can display the number of minor events (e.g., resource attribute compliance minor events) for each tenant in Tenant Column 2444.

The Table 2438 presenting the top tenants by naming convention issues can include Tenant Column 2444, and Columns 2452-2456 including the number of naming convention compliance issues for various types of events, such as critical events (2452), major events (2454), and minor events (2456). For example, Column 2452 can display the number of critical events (e.g., naming convention compliance critical events) for each tenant in Tenant Column 2444, Column 2454 can display the number of major events (e.g., naming convention compliance major events) for each tenant in Tenant Column 2444, and Column 2456 can display the number of minor events (e.g., naming convention compliance minor events) for each tenant in Tenant Column 2444.

The Table 2440 presenting the top tenants by resource attribute issue type can include Tenant Column 2444, and Columns 2458-2468 including the number of compliance issues for various resource attribute issue types, such as flood properties (Column 2458), endpoint learning properties (Column 2460), DHCP relay properties (Column 2462), gateway properties (Column 2464), privacy properties (Column 2466), and VRF properties (Column 2468).

The Table 2442 presenting compliance violations and enforcements by compliance requirement sets and compliance requirements can include a Compliance Requirement Set Column 2470, identifying specific compliance requirement sets in the Table 2442, a Compliance Requirement Column 2472, identifying specific compliance requirements in the compliance requirement sets listed in Table 2442, a Compliance Requirement Type Column 2474, identifying specific compliance requirement types in the Table 2442, a Violation and Enforcement Column 2476, identifying whether the specific compliance requirement sets in the Table 2442 are violated or enforced, and a Not Applied Column 2478, identifying whether the specific compliance requirement sets in the Table 2442 have been applied.

Figure 25:
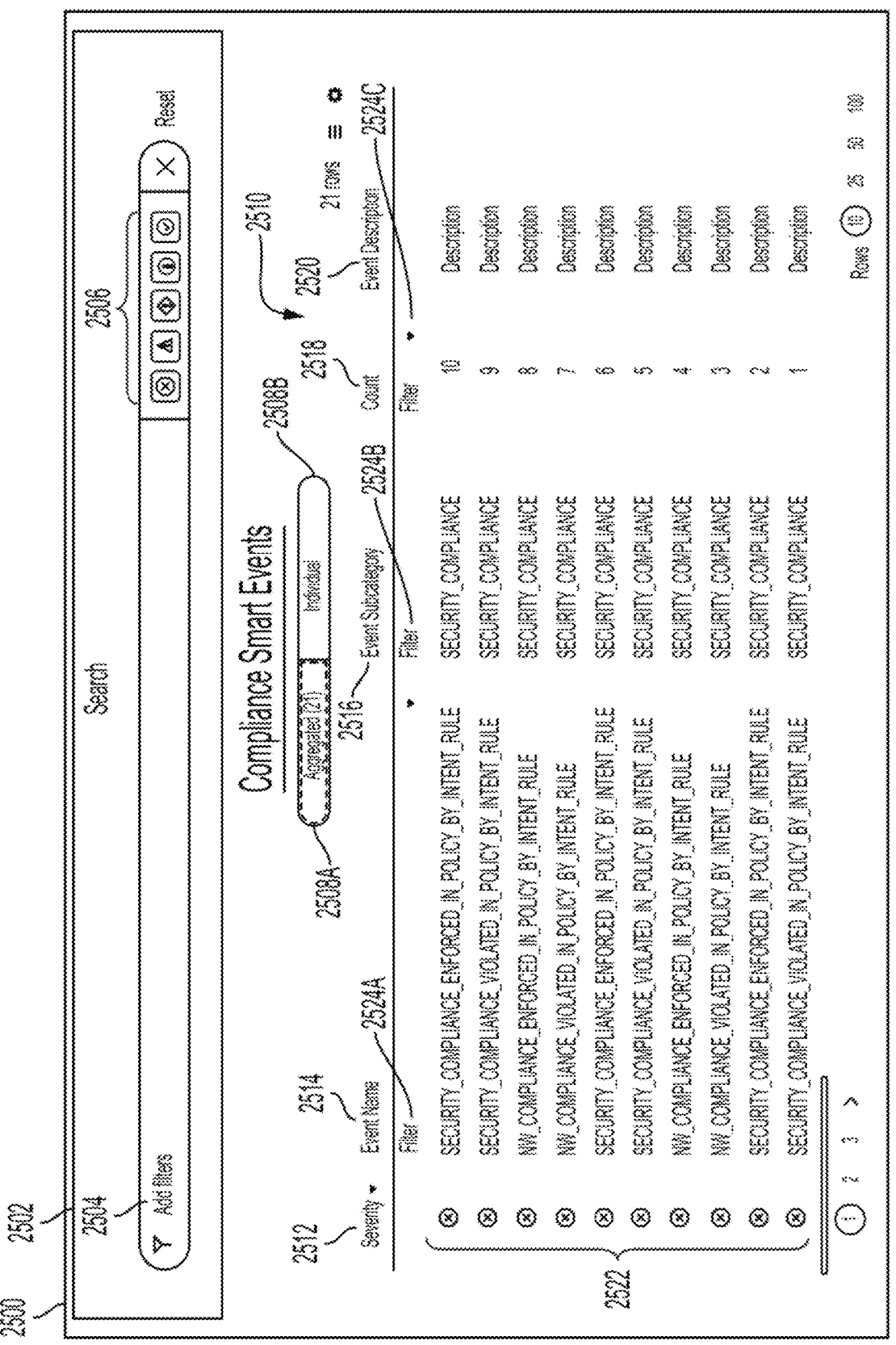
FIG. 25 illustrates an example interface for searching compliance events.

FIG. 25 illustrates an example Compliance Events Search Interface 2500. The Compliance Events Search Interface 2500 allows users to search for specific compliance events generated or calculated based on compliance requirements or compliance requirement sets defined as previously described. The Compliance Events Search Interface 2500 can include a Search Interface 2502 where the user can input search criteria and execute a search based on the search criteria. The Search Interface 2502 includes Search Input Area 2504 where the user can input or select filters (e.g., search criteria) and a Search Filters Area 2506 that includes or identifies each search filter that has been added or configured for a search. Non-limiting examples of search filters can include an event severity filter (e.g., critical, major, minor, warning, etc.), an event type filter (e.g., type of compliance requirement event or issue), an event description filter, an event name filter, an object filter (e.g., EPG, VRF, tenant, BD, application profile, EPG tag, etc.), and so forth.

The Compliance Events Search Interface 2500 can include a Search Results Section 2510 which presents Results 2522 of the search performed based on the filters (e.g., 2506) provided in the Search Input Area 2504. The Results 2522 can include the events that match the filters implemented in the search as well as information associated with the events, such as a severity, a description, an event name, an event type, an event count, an EPG compliance requirement set associated with the event, etc.

The Search Results Section 2510 can include an Aggregated Events Option 2508A for displaying aggregated events and an Individual Events Option 2508B for displaying individual events. In this example, Results 2522 include aggregated events based on Aggregated Events Option 2508A.

The Search Results Section 2510 can include various Columns 2512-2520 of information presented as part of the Results 2522. For example, the Search Results Section 2510 can include a Severity Column 2512 indicating the severity (e.g., critical, major, minor, warning, etc.) of each event in the Results 2522, an Event Name Column 2514 identifying the name of each event, an Event Subcategory Column 2516 indicating an associated event subcategory, a Count Column 2518 indicating a count for each event, and an Event Description Column 2520 including any description available (if any) for each event. The Search Results Section 2510 can also include Filters 2524A-C for applying specific filters to the Results 2522.

Having disclosed example system components and concepts, the disclosure now turns to the example methods for creating and verifying security compliance requirements, shown in FIGS. 26-28. The steps outlined herein are examples and can be implemented in any combination, including combinations that exclude, add, or modify certain steps.

With reference to FIG. 26, at step 2602, a method for creating security compliance requirements and verifying the security compliance requirements in a network can include receiving, via a user interface, EPG inclusion rules (e.g., 1914, 1922, 1924, 1926, 1944) defining which EPGs on a network (e.g., Network Environment 100) should be included in each of a plurality of EPG selectors (e.g., EPG Selectors 1116, EPG Selectors 1506). The plurality of EPG selectors can represent respective sets of EPGs that satisfy the EPG inclusion rules.

The EPG inclusion rules can be received via, for example, a portion, section, or interface of the user interface, which allows a user to create and/or configure EPG selectors, such as New EPG Selector Interface 1900. Moreover, the EPG inclusion rules can include rules, criteria, parameters, conditions, etc., for including EPGs in the EPG selectors as well as excluding EPGs from the EPG selectors (e.g., 1914, 1916A-C, 1918A-C, 1922, 1924, 1926, 1928, 1930, 1932A-B, 1934A-B, 1936, 1938, 1944). For example, the EPG inclusion rules can include filters for selecting EPGs in the network for inclusion in an EPG selectors based on a VRF associated with the EPGs, a tenant associated with the EPGs, an application profile associated with the EPGs, a name (or portion of a name) associated with the EPGs, a tag (e.g., EPG tag) associated with the EPGs, a label associated with the EPGs, and/or any other criteria or attributes associated with the EPGs.

At step 2604, the method can include selecting the respective sets of EPGs that satisfy the EPG inclusion rules for inclusion in the plurality of EPG selectors. In some examples, each respective set of EPGs can be selected based on a respective portion of the EPG inclusion rules associated with, or applicable to, the respective set. For example, each respective set of EPGs can be selected based on those of the EPG inclusion rules that apply to the respective set of EPGs and/or define criteria (e.g., parameters, filters, attributes, etc.) that match the respective set of EPGs.

At step 2606, the method can involve creating the plurality of EPG selectors based on the respective sets of EPGs. Each of the respective sets of EPGs can include one or more EPGs, and each of the plurality of EPG selectors can include one or more of the respective sets of EPGs.

At step 2608, the method can include creating a traffic selector including traffic parameters (e.g., 1818, 1820, 1832, 1834, 1842, 1844, 1846, 1852, 1856, 1858A, 1858B, 1862, 1864, 1872, 1874, 1876, 1890) received via the user interface. The traffic selector can be created as shown in FIGS. 18A-E via a traffic selector interface (e.g., New Traffic Selector Interface 1800) associated with the user interface. The traffic selector can represent or include, for example, specific traffic, including a specific type(s) of traffic, a specific category (or categories) of traffic, a specific class (or classes) of traffic, traffic having specific attributes, etc.

The traffic represented by the traffic selector can be defined by the traffic parameters. For example, the traffic parameters can be used to identify, classify, select, filter, etc., specific traffic to be included in, added to, associated with, mapped to, applied to, etc., the traffic selector. The traffic parameters can include, for example, traffic attributes, criteria, categories, filters, etc., for traffic associated with the traffic selector. Non-limiting examples of traffic parameters include traffic protocols (e.g., OSPF, EGP, IGP, TCP, UDP, ICMP, IGMP, EIGRP, PIM, any, etc.), EtherTypes (e.g., IPv6, IPv4, MPLS, Trill, ARP, FCOE, MAC security, unspecified, etc.), ports (e.g., source ports, destination ports), exceptions, flags, traffic direction-based traffic settings, addresses, state (e.g., session state, protocol state, etc.), port ranges, traffic priority values, etc., any of which can be used to identify, select, classify, associate, include, etc., traffic by matching or comparing the traffic with the traffic parameters. Traffic matching the traffic parameters for a traffic selector can be associated with, added to, or assigned to the traffic selector.

At step 2610, the method can include creating a security compliance requirement for the network based on a first EPG selector (e.g., the Chosen EPG Selector 1202 for EPG Selector A as shown in FIG. 17C) from the plurality of EPG selectors, a second EPG selector (e.g., the Chosen EPG Selector 1752 for EPG Selector B as shown in FIG. 17C) from the plurality of EPG selectors, the traffic selector, and a communication operator (e.g., Communication Operator Definition 1018B) defining a communication condition (e.g., 1708) for traffic associated with the first EPG selector, the second EPG selector, and the traffic selector. The security compliance requirement can be created and configured using the user interface.

To illustrate, as shown in FIGS. 17A-C, a user can access Compliance Requirement Interface 1000 to create the security compliance requirement. Using Compliance Requirement Interface 1000, the user can configure the security compliance requirement by, for example and without limitation, selecting EPG selectors (e.g., EPG selector A and EPG selector B) for the security compliance requirement, specifying a communication operator (e.g., Communication Operator 1708 associated with Communication Operator Definition 1018B) for the security compliance requirement, and selecting a traffic selector (e.g., Chosen Traffic Selector 1754 associated with associated with Compliance Definition 1704, Chosen Traffic Selector 1760 associated with Compliance Definition 1704) for the security compliance requirement.

The communication operator a communication condition or requirement for traffic between EPGs in the EPG selectors associated with the security compliance requirement (e.g., the first and second EPG selectors). Non-limiting examples of communication operators include a "may talk to" condition, a "may only talk to" condition, a "must be able to talk to" condition, and a "must not talk to" condition. For example, the communication operator configured for the security compliance requirement can specify that the first EPG selector may talk to the second EPG selector on the traffic selector, the first EPG selector may only talk to the second EPG selector on the traffic selector, the first EPG selector must be able to talk to the second EPG selector on the traffic selector, or the first EPG selector must not talk to the second EPG selector on the traffic selector.

The security compliance requirement can define a security requirement that should be enforced, applied, satisfied, etc., in the network for traffic between the EPGs in the EPG selectors of the security compliance requirement, which matches the attributes, criteria, etc., specified by the security compliance requirement, such as the conditions provided by the communication operator(s) and the traffic selector(s) defined for the security compliance requirement. The security compliance requirement can be used to perform a compliance or assurance verification (e.g., via an assurance, compliance, or containment check as further described herein) in the network. The compliance or assurance verification can determine whether the policies, state, and/or configuration of the network comply (e.g., apply, satisfy, etc.) the security compliance requirement or otherwise violate (fully or partially) or fail to apply/enforce the security compliance requirement.

At step 2612, the method can include determining whether security policies (e.g., rules, contracts, policy settings, filters, access control list entries, etc.) on the network (e.g., security policies configured on Controller 116, Leafs 104, etc.) comply (e.g., satisfy, violate, apply, enforce, etc.) with the security compliance requirement. In some cases, this determination can involve comparing security policies on the network with the security compliance requirement to determine whether the security compliance requirement is satisfied (fully or partially), violated (fully or partially), applied, or enforced by the security policies.

In some implementations, a compliance system (e.g., Assurance Appliance System 300, Policy Analyzer 504, Formal Analysis Engine 522) can obtain the security compliance requirement and perform a check (e.g., an equivalence, assurance, or compliance check) by comparing the security compliance requirement (or a representation thereof) with security policies on the network (or a representation thereof) to determine whether the security policies comply with the security compliance requirement. For example, the compliance system can perform a check between the security policies and the security compliance requirement as described in FIGS. 5A-C and 6A-C.

In some examples, a compliance system (e.g., Assurance Appliance System 300) can use a model of the network (e.g., Logical Model 270, Hardware Model 276, etc.) to determine whether policies on the network (e.g., policies represented in the model) comply with the security compliance requirement. For example, the compliance system can generate a data structure, such as a BDD (e.g., 540), an ROBDD (e.g., 600A, 600B, 600C), an n-bit vector or string, a flat list of rules, etc., representing Logical Model 270 (and/or policies and configurations therein) as well as a data structure for each pair of EPGs from the first and second EPG selectors (e.g., each pair of EPGs including one EPG from the first EPG selector and one EPG from the second EPG selector) representing the pair of EPGs, the communication operator, and the traffic selector.

The compliance system can then perform a containment check for the data structure of each pair of EPGs to determine if the data structure of each pair of EPGs is contained in the data structure representing Logical Model 270. If the data structures of each pair of EPGs are contained in the data structure representing Logical Model 270, the compliance system can determine that the policies in the network satisfy the security compliance requirement. If the data structure of one or more pairs of EPGs is not contained (fully and/or partially) in the data structure representing Logical Model 270, the compliance system can determine that the policies in the network violate or do not apply the security compliance requirement.

For example, assume the first EPG selector includes EPG1 and EPG2, and the second EPG selector of the security compliance requirement includes EPG3 and EPG4. Further assume that the communication operator includes the conditions "must talk to", and the traffic selector includes the traffic parameters TCP protocol and Ethertype IPv6. Based on the first and second EPG selectors, the communication operator, and the traffic selector, the security compliance requirement in this example provides that EPG1 and EPG 2 (i.e., the first EPG selector) must talk to EPG 3 and EPG 4 (i.e., the second EPG selector) using TCP protocol and IPv6.

To determine whether policies in the network comply with the compliance requirement, the compliance system can create a BDD representing EPG1, EPG3, the communication operator, and the traffic selector; a BDD representing EPG1, EPG4, the communication operator, and the traffic selector; a BDD representing EPG2, EPG3, the communication operator, and the traffic selector; and a BDD representing EPG2, EPG4, the communication operator, and the traffic selector. Here, the compliance system has created a BDD for each pair of EPGs in the first and second EPG selectors, representing the compliance requirement as it pertains to each pair of EPGs. The compliance system can perform a containment check for each BDD by determining whether each BDD is contained in a BDD created for Logical Model 270. The BDD created for Logical Model 270 can reflect policies and configurations of the network.

If the BDDs for all the pairs of EPGs are contained in the BDD created for Logical Model 270, the compliance system can determine that the policies in the network comply with the security compliance requirement. On the other hand, if one or more BDDs corresponding to one or more of the pairs of EPGs are not fully contained in the BDD created for Logical Model 270, the compliance system can determine that the security compliance requirement is at least partially violated or not fully applied by the policies in the network.

To illustrate, assume Logical Model 270 contains the following policies for traffic between EPG1 and EPG2:

R1: Source=EPG1; Destination=EPG2; Protocol=TCP; Type=IPv4; Port=80; Action=Allow R2: Source=EPG1; Destination=EPG2; Protocol=*; Type=*; Port=*; Action=Deny In addition, assume a security compliance requirement has been created with the following security requirements for traffic between EPG1 and EPG2:

S1: EPG1 may talk to EPG2 only on Protocol TCP, EtherType IPv4, and Port 80; where EPG1 is an EPG from EPG Selector A, EPG2 is an EPG from EPG Selector B, "must talk to" represents the communication operator associated with the security compliance requirement, and the traffic parameters "only on Protocol TCP, EtherType IPv4, and Port 80" represent the traffic selector associated with the security compliance requirement.

To perform a containment check between rules S1 and R1 and R2, the method can can create respective data structures, such as BDDs, for S1, R1, and R2, and determine whether the BDD for S1 is contained within the BDD for R1 and R2. In this example, R1 provides that traffic between EPG1 and EPG2 transmitted over TCP, IPv4, and port 80 is allowed; while R2 provides that all traffic between EPG1 and EPG2 is denied. Since R1 has a higher priority than R2, the result is that traffic between EPG1 and EPG2 transmitted over TCP, IPv4, and port 80 is allowed and all other traffic between EPG1 and EPG2 is denied. These requirements in R1 and R2 are consistent with the requirements in S1. Therefore, the containment check will result in an equivalency between the respective data structures for S1, R1, and R2, indicating that the security compliance requirement as it pertains to EPG1 and EPG2 is satisfied by the policies in Logical Model 270 for traffic between EPG1 and EPG2 (i.e., R1 and R2).

At step 2614, the method can include generating compliance assurance events indicating whether the security policies configured on the network comply with the security compliance requirement. For example, after determining whether the policies in the network comply with the security compliance requirement, the compliance system can generate compliance assurance events based on the results of the check from step 2612. The compliance system can raise or generate an event for each compliance result or determination, or raise or generate events only for certain types of compliance results or determinations, such as when the security compliance requirement is violated (fully and/or partially), satisfied (fully and/or partially), not applied or enforced, etc.

In some cases, the method can include presenting the compliance assurance events on a display or interface (e.g., 2302, 2402, 2500). The compliance assurance events presented can include compliance results. The compliance results can indicate whether the security compliance requirement was violated (partially or fully), satisfied (partially or fully), applied or enforced, etc. The compliance results can be specific to an epoch or a period when the compliance check was performed. However, in some cases, the compliance results can include results from other compliance checks and/or periods or epochs, for example.

The compliance assurance events and/or compliance results presented in the graphical user interface can include compliance scores, event counts (e.g., violations, compliance warnings, passed compliance checks, enforcement events, etc.), information about the security compliance requirement(s) checked, information about resources or objects (e.g., EPGs, VRFs, tenants, bridge domains, subnets, application profiles, contracts, filters, workloads, devices, etc.) associated with one or more security compliance requirements checks, an indication of the policies or objects implicated by an event (e.g., policies or objects that caused the event to be raised), etc.

In some cases, the information presented for the compliance assurance events and/or compliance results can be grouped into one or more categories and presented by category or categories. For example, compliance assurance events and/or compliance results can be presented by type of security compliance requirement, type of result (e.g., violation, enforcement, requirement pass, warning, etc.), type of object or resource (e.g., by tenant, EPG, VRF, tenant, subnet, server, resource or security group, etc.), severity of event (e.g., critical, major, minor, warning, etc.), type of issue, event count, resource attributes (e.g., flood properties, VRF properties, privacy properties, endpoint properties, etc.), specific policies or requirements, etc.

Moreover, the information can be presented in different ways based on one or more factors such as user preferences. For example, compliance assurance events and related information can be presented based on a specific organization or sorting of the compliance assurance events and related information. To illustrate, compliance assurance events can be sorted and presented by event counts, epochs (or any interval or schedule), priorities, severity, event or resource rankings, compliance scores, compliance requirement types, compliance issues, resource or event attributes, specific policies, specific compliance requirements, compliance requirement sets, etc.

In some cases, compliance assurance events can be presented along with an indication of a cause for the events being raised. For example, compliance assurance events can be presented along with an indication of a cause for the security compliance requirement being satisfied, violated, or not applied. When presenting the cause, the specific objects and/or policies involved in the cause and/or included in the security compliance requirement can also be identified. For example, assume a compliance assurance event is generated for a security compliance requirement that is violated. The compliance assurance event identifying the violation can be presented along with an indication of the policies, requirements, or objects that caused the violation and/or a list of policy constructs (e.g., EPGs, VRF, application profile, bridge domain, tenant, filter, contract, etc.) associated with the security compliance requirement, the policy or policies that caused the violation, and/or the resources or objects involved in the violation or the compliance check. For example, the violation can be presented along with an indication that the violation was caused by a specific contract or rule between a specific consumer EPG and a specific provider EPG.

In some cases, the method can include grouping security compliance requirements into sets including multiple security compliance requirements. Moreover, a specific security compliance requirement or security compliance requirement set can be associated with a particular fabric or segment of the network and applied specifically to that particular fabric or segment of the network. For example, if the network includes multiple fabrics, a security compliance requirement or security compliance requirements set can be associated with one or more fabrics, and used to check if the one or more fabrics (or the policies associated with the one or more fabrics) comply with such security compliance requirement or security compliance requirements set. Thus, step 2612 for determining compliance can be performed based on the security policies in the one or more fabrics and the security compliance requirement or security compliance requirements set.

In some cases, the method can include determining whether a state of the network complies with the security compliance requirement. For example, the method can include comparing the security compliance requirement to rules programmed on the network devices (e.g., switches, routers, etc.) in the network, such as ACLs and/or rules programmed on the hardware memory (e.g., TCAM) of network nodes (e.g., Leafs 104). To illustrate, the method can include comparing (e.g., by performing a containment or assurance check) one or more first data structures (e.g., BDDs, ROBDDs, vectors, flat rules, etc.) representing the security compliance requirement with one or more second data structures (e.g., BDDs, ROBDDs, vectors, flat rules, etc.) representing hardware policy entries (e.g., TCAM entries) configured on network devices in the network, and based on the comparison, determining whether the hardware policy entries configured on the network devices satisfy, violate, or apply the security compliance requirement.

In some implementations, the one or more second data structures representing hardware policy entries configured on the network devices can be created based on one or more hardware models (e.g., Hardware Model 276) created for the network. For example, a hardware model associated with a switch in the network can be used to construct one or more BDDs, which can represent a portion of the state of the network reflected in the switch (e.g., the rules programmed on the switch for implementing or enforcing security policies in the network), and the one or more BDDs can be used to determine if the portion of the state of the network complies with the security compliance requirement. Similar containment checks can be performed using hardware models associated with other switches in the network, and the aggregated results can indicate whether the state of the network complies with the security compliance requirement. In some cases, this can involve performing a containment check by checking if one or more BDDs created for, and representing, the security compliance requirement are contained in the one or more BDDs constructed from the hardware model(s) representing the state of the network.

FIG. 27 illustrates an example method for creating a security compliance requirement and determining compliance of policies involving objects on a same network context. The objects can include, for example, EPGs, application profiles, contracts, network domains, filters, tenants, policies, policy constructs, etc. Moreover, the network context can include, for example, a private network, a network domain, a VRF, a subnet, a bridge domain, etc. In this example method, the objects are EPGs and the network context is a VRF. However, in other examples, the objects and/or network context can include other types of objects, policy constructs, and/or network contexts, such as security groups, subnets, bridge domains, network contexts, group policy objects, etc.

At step 2702, the method can include creating a security compliance requirement (e.g., via Compliance Requirement Interface 1000) for a network (e.g., Network Environment 100), the security compliance requirement including a first EPG selector (e.g., the Chosen EPG Selector 1202 for EPG Selector A as shown in FIG. 17C) and a second EPG selector (e.g., the Chosen EPG Selector 1752 for EPG Selector B as shown in FIG. 17C) representing respective sets of EPGs, a traffic selector, and a communication operator (e.g., Communication Operator Definition 1018B).

The respective sets of EPGs associated with the first and second EPG selectors can be selected or determined based on EPG inclusion rules (e.g., 1914, 1922, 1924, 1926, 1944) as previously explained. The traffic selector can include traffic parameters (e.g., 1818, 1820, 1832, 1834, 1842, 1844, 1846, 1852, 1856, 1858A, 1858B, 1862, 1864, 1872, 1874, 1876, 1890) identifying traffic associated with the traffic selector. The traffic parameters can be used to match traffic to the traffic selector and/or identify what traffic corresponds to the traffic selector. The communication operator can define a communication condition (e.g., 1708) for traffic associated with the first and second EPG selectors and the traffic selector, such as a "may talk to" condition, a "must talk to" condition, a "must not talk to" condition, a "may only talk to" condition, etc.

At step 2704, the method can involve creating, for each distinct pair of EPGs from the respective sets of EPGs, a first respective data structure representing the distinct pair of EPGs, the communication operator, and the traffic selector. The distinct pair of EPGs can include a respective EPG from each of the first EPG selector and the second EPG selector (e.g., each pair of EPGs can include one EPG from the first EPG selector and one EPG from the second EPG selector). The first respective data structure can be, for example, a BDD (e.g., 540), an ROBDD (e.g., 600A, 600B, 600C), an n-bit vector or string, a flat list of rules, etc., representing the distinct pair of EPGs, the communication operator, and the traffic selector. For example, the first respective data structure can be a BDD representing one or more variables, rules, values, Boolean functions, etc., associated with the distinct pair of EPGs, the communication operator, and the traffic selector. FIGS. 5A-C and 6A-C and their accompanying description provide example data structures, such as ROBDDs, generated for example objects and/or rules and used to perform assurance or containment checks.

At step 2706, the method can include creating a second respective data structure representing a model of the network (e.g., Logical Model 270). The second respective data structure can be, for example, a BDD (e.g., 540), an ROBDD (e.g., 600A, 600B, 600C), an n-bit vector or string, a flat list of rules, etc., representing the model (e.g., Logical Model 270) of the network and/or policies and configurations therein.

At step 2708, the method can include determining whether the first respective data structure is contained in the second respective data structure to yield a containment check. For example, a compliance system, such as Assurance Appliance System 300, can perform a containment check for each first respective data structure (e.g., the data structure created for each distinct pair of EPGs) to determine if each first respective data structure is contained in the second respective data structure representing the model of the network.

At step 2710, the method can include determining whether security policies configured on the network comply with (e.g., satisfy, violate, or apply) the security compliance requirement based on the containment check. For example, if the first respective data structure of each distinct pair of EPGs is contained in the second respective data structure representing the model of the network (e.g., Logical Model 270), a compliance system (e.g., Assurance Appliance System 300) can determine that the policies in the network satisfy the security compliance requirement. If the first respective data structure of each distinct pair of EPGs is not contained (fully and/or partially) in the second respective data structure representing the model of the network, the compliance system can determine that the policies in the network violate or do not apply the security compliance requirement. If only some of the first respective data structures are not contained (fully and/or partially) in the second respective data structure, the compliance system can determine that only some policies in the network violate or do not apply the security compliance requirement.

In some cases, the compliance system can determine which policies in the network and/or which policy constructs or policies represented by the first respective data structures violate or do not apply the security compliance requirement based on the containment check. For example, the compliance system can identify which of the first respective data structures are not contained in the second respective data structure and based on this determine which policies and/or policy constructs are associated with the failed containment check.

In some cases, the method can include determining that each EPG in at least one distinct pair of EPGs is associated with the same network context (e.g., same VRF). For example, in some cases, the process for performing containment checks can vary depending on whether the EPGs in a pair of EPGs represented by the first respective data structure are in the same or different network context (e.g., same VRF). To illustrate, when the EPGs are in the same network context (e.g., same VRF), step 2710 can involve determining whether the policies associated with the network context (e.g., the VRF) satisfy, violate, or apply the security compliance requirement, as described herein.

On the other hand, if the EPGs in a pair of EPGs are in different network contexts, the containment check process can involve determining where the policies associated with the pair of EPGs may be located (e.g., which network context), as described below with respect to FIG. 28. For example, in some cases, the policies associated with a pair of EPGs in different network contexts can be set or located in only one of the network contexts, both network contexts, or none of the network contexts. Accordingly, to perform a compliance check, the method may involve determining where (e.g., which network context or contexts) to look in or check for policies. To illustrate, in some cases, policies associated with a consumer EPG and a provider EPG can be located or set in the network context associated with the consumer EPG. Thus, the policies may not be located or set in the network context associated with the provider EPG. Therefore, to perform the containment check for the policies associated with the consumer and provider EPGs, the method can involve locating the policies in the network context associated with the consumer EPG. Additional details and a description of an example method for performing containment checks involving EPGs in different network contexts are provided below with reference to FIG. 28.

Referring to FIG. 27, in this example method the EPGs are in the same network context (e.g., same VRF). As previously explained, in some examples, the policies associated with EPGs in a same network context can be contained in that network context. Accordingly, in this example, the second respective data structure can be created based at least partly on the policies in the model that are associated with the network context (e.g., VRF) of the EPGs. The second respective data structure can thus represent policies associated with the network context. The containment check can therefore involve checking if each first respective data structure is contained in the second respective data structure representing the policies associated with the network context.

In other examples, despite the EPGs being in the same network context, the second respective data structure can be created based all the policies in the model (e.g., Logical Model 270) or policies associated with any other portion of the model. The containment check can thus involve checking if each first respective data structure is contained in a second respective data structure that represents all of the policies in the model or policies associated with any other portion of the model.

In some cases, the method can include generating one or more compliance assurance events indicating whether the security policies comply with the security compliance requirement. The one or more compliance assurance events can be based on the compliance result in step 2710. For example, after determining whether the policies in the network comply with the security compliance requirement, a compliance system can generate compliance assurance events based on the results of the check from step 2710. The compliance system can raise or generate an event for each compliance result or determination, or raise or generate events only for certain types of compliance results or determinations, such as when the security compliance requirement is violated (fully and/or partially), satisfied (fully and/or partially), not applied or enforced, etc.

In some cases, the method can include presenting the one or more compliance assurance events on a display or interface (e.g., 2302, 2402, 2500). The compliance assurance events presented can include the compliance results. The compliance results can indicate whether the security compliance requirement was violated (partially or fully), satisfied (partially or fully), applied or enforced, etc. The compliance results can be specific to an epoch or a current period when the compliance check was performed. However, in some cases, the compliance results can include results from other compliance checks, such as compliance checks performed at various periods of time or epochs, for example.

When presenting the compliance assurance events and/or compliance results, the presented information can include compliance scores, event counts, information about the security compliance requirement(s) checked, information about resources or objects associated with one or more security compliance requirements checks, an indication of the policies or objects implicated by an event, etc. In some cases, the information presented for the compliance assurance events and/or compliance results can be grouped into one or more categories and presented by category or categories. For example, compliance assurance events and/or results can be presented by type of security compliance requirement, type of result, type of object or resource, severity of event, type of issue, event count, resource attributes, specific policies or requirements, etc.

Moreover, the information can be presented in different ways and configurations based on one or more factors such as user preferences. For example, compliance assurance events and related information can be presented based on a specific organization or sorting of the compliance assurance events and related information. In some cases, compliance assurance events can be presented along with an indication of a cause for the security compliance requirement being raised, as previously described with reference to FIG. 26.

In some cases, the method can include grouping security compliance requirements into sets including multiple security compliance requirements. Moreover, the method can include associating one or more specific security compliance requirements or security compliance requirement sets with a particular fabric or segment of the network and applying the one or more specific security compliance requirements or security compliance requirement sets specifically to that associated fabric or segment of the network. For example, if the network (e.g., Network Environment 100) includes multiple fabrics, a security compliance requirements set can be associated with one or more fabrics, and used to check if the one or more fabrics (or the associated policies) comply with the security compliance requirement set.

In some cases, the method can include determining whether a state of the network complies with the security compliance requirement. For example, the method can include comparing the security compliance requirement to rules programmed on the network devices (e.g., switches, routers, etc.) in the network, such as ACLs and/or rules programmed on the hardware memory (e.g., TCAM) of network devices (e.g., Leafs 104) in the network. To illustrate, the method can include comparing (e.g., by performing a containment or assurance check) one or more first data structures representing the security compliance requirement with one or more second data structures representing hardware policy entries (e.g., TCAM entries) configured on network devices in the network, and based on the comparison, determining whether the hardware policy entries configured on the network devices satisfy, violate, or apply the security compliance requirement.

In some implementations, the one or more second data structures representing hardware policy entries configured on the network devices can be created based on one or more hardware models (e.g., Hardware Model 276) created for the network and/or network devices. For example, the hardware model of a switch can be used to construct one or more BDDs, which can represent the state of the network as it pertains to that network device (e.g., the rules programmed on the network device that implement or enforce security policies in the network), and the one or more BDDs can be used in the containment check.

FIG. 28 illustrates an example method for creating a security compliance requirement involving objects on different network contexts and determining a compliance of policies associated with the objects. The objects can include, for example, EPGs, application profiles, contracts, domains, filters, tenants, policy constructs, etc. Moreover, the network contexts can include, for example, private networks, network domains, VRFs, subnets, bridge domains, etc. In this example, the objects are EPGs and the private networks are VRFs.

At step 2802, the method can include creating, for a network (e.g., Network Environment 100), a security compliance requirement (e.g., via Compliance Requirement Interface 1000) including EPG selectors (e.g., the Chosen EPG Selector 1202 for EPG Selector A and the Chosen EPG Selector 1752 for EPG Selector B) representing respective sets of EPGs, a traffic selector, and a communication operator (e.g., Communication Operator Definition 1018B).

The respective sets of EPGs associated with the EPG selectors can be selected or determined based on EPG inclusion rules (e.g., 1914, 1922, 1924, 1926, 1944) configured as previously explained. The traffic selector can include traffic parameters (e.g., 1818, 1820, 1832, 1834, 1842, 1844, 1846, 1852, 1856, 1858A, 1858B, 1862, 1864, 1872, 1874, 1876, 1890) identifying traffic associated with the traffic selector. The communication operator can define a communication condition (e.g., 1708) for traffic associated with the EPG selectors and the traffic selector, such as a "may talk to"

condition, a "must talk to" condition, a "must not talk to" condition, a "may only talk to" condition, etc.

At step 2804, the method can include determining, based on a plurality of distinct pairs of EPGs from the respective sets of EPGs, that respective EPGs in one or more distinct pairs of EPGs are associated with different network contexts in the network. For example, the method can include determining that the EPGs in a pair of EPGs are in a different VRF. Each of the plurality of distinct pairs of EPGs can include a respective EPG from the EPG selectors. For example, a distinct pair of EPGs can include an EPG from a first EPG selector and an EPG from a second EPG selector.

At step 2806, the method can involve determining, for each of the one or more distinct pairs of EPGs, which of the different network context(s) contains security policies for traffic between the respective EPGs in the one or more distinct pairs of EPGs. As previously mentioned, when EPGs in a pair of EPGs are in different network contexts, the policies associated with the pair of EPGs can be located or set in one of the different network contexts, both network contexts, or neither network context. Accordingly, to perform a containment check for a pair of EPGs in different network contexts, the method can include finding where (e.g., which network context(s)) the policies associated with the pair of EPGs are located or set, in order to check those policies.

In some cases, policies for a pair of EPGs including a consumer and provider can be located on the network context associated with the consumer. Thus, step 2806 can include identifying the consumer EPG, checking the network context associated with the consumer EPG and determining whether the policies are in the network context associated with the consumer EPG. For example, in some cases, rules for traffic between a consumer and provider EPG are created in the network context associated with the consumer EPG. Thus, if a contract between EPG1 and EPG2 specifies that EPG1 is the consumer and EPG2 is the provider, and EPG1 and EPG2 are in different network contexts, the rules for the traffic between EPG1 and EPG2 may be created in the network context of the consumer (i.e., EPG1). Therefore, the compliance check for policies associated with traffic between EPG1 and EPG2 can be done in the network context of the consumer (e.g., EPG1).

In some implementations, to determine at step 2806 which network context contains the security policies for traffic between the respective EPGs in a pair of EPGs, the method can involve checking a tag of each EPG in the pair of EPGs. The tag can identify the EPG associated with it. The tags can be, for example, classIDs (class identifiers), pcTags (policy construct tags), or any other tags. In some examples, the tag of an EPG may be used to determine if the EPG is a consumer EPG, if the network context associated with the EPG is a consumer network context, and/or if the network context associated with the EPG contains the policies associated with that EPG.

For example, in some cases, the tags can include global and local tags. Global tags can be globally unique across a fabric and local tags may only be unique within a context, such as a VRF. The global and local tags can have respective numbers designated for the tags. The numbers associated with global and local tags can fall within a different number range. For example, global tags can have a number within a global range, such as 1 to 16,385, and local tags can have a number within a local range, such as 16,386 to 65,535. Therefore, the number of a tag can indicate whether the tag is a global tag or a local tag depending on the range it falls in. Moreover, in some cases, consumer EPGs are assigned global tags while provider EPGs are generally assigned local tags. Thus, in some cases, the number of an EPG's tag can be used to determine or infer whether the EPG is a consumer EPG. Therefore, the tags of a pair of EPGs can be checked to determine which EPG is the consumer and consequently whether the network context associated with that EPG may contain the policies for traffic between the pair of EPGs.

Accordingly, to determine at step 2806 which network context contains the security policies for traffic between a pair of EPGs, the method can involve identifying which EPG in the pair of EPGs has a global tag and determining that the EPG with the global tag is the consumer EPG. The method can also involve identifying the network context associated with the consumer EPG and determining that the policies for traffic between the pair of EPGs are in the network context of the EPG identified as the consumer. In some cases, both EPGs in a pair of EPGs may have a global tag. This can be the case if the provider EPG in the pair is a consumer EPG in a different contract and was previously assigned a global tag as the consumer for that contract. If both EPGs in a pair have a global tag, the method at step 2806 can determine that the policies may be created in both of the different network contexts and the containment check (e.g., step 2812 below) should be done on both of the different network contexts.

In other cases, both EPGs in a pair of EPGs may have a local tag. Here, the method at step 2806 can determine that a containment check is unnecessary for the pair of EPGs because the pair of EPGs cannot communicate with each other as none of the EPGs are set as consumer in the contract or policy. Accordingly, the method as it pertains to that pair of EPGs can end without performing steps 2808, 2810, 2812, and/or 2814 below.

At step 2808, the method can include creating, for each distinct pair of EPGs from the one or more distinct pairs of EPGs, a first respective data structure representing the distinct pair of EPGs, the communication operator, and the traffic selector. The first respective data structure can be, for example, a BDD (e.g., 540), an ROBDD (e.g., 600A, 600B, 600C), an n-bit vector or string, a flat list of rules, etc., representing the distinct pair of EPGs, the communication operator, and the traffic selector. The first respective data structure can be created as previously explained with respect to step 2704 in FIG. 27.

When only a first one of the different network contexts is determined to contain policies for traffic between the respective EPGs in the one or more distinct pairs of EPGs, at step 2810 the method can include creating a second respective data structure representing a first portion of a model (e.g., Logical Model 270) of the network, the first portion of the model containing policies associated with the first one of the different network contexts; and at step 2812 the method can include determining whether the first respective data structure is contained in the second respective data structure to yield a first containment check. The second respective data structure can be, for example, a BDD (e.g., 540), an ROBDD (e.g., 600A, 600B, 600C), an n-bit vector or string, a flat list of rules, etc., representing the first portion of the model (and/or the configuration data therein) containing the policies associated with the network context(s). Thus, the second respective data structure can encompass the policies in the model corresponding to the network context(s), and consequently the policies associated with the pair of EPGs. The second respective data structure can be created as previously explained with respect to step 2706 in FIG. 27.

When both of the different network contexts are determined to contain policies for traffic between the respective EPGs in the one or more distinct pairs of EPGs, the method can include, at step 2814, creating the second respective data structure representing the first portion of the logical model and a third respective data structure representing a second portion of the logical model (e.g., Logical Model 270), the second portion of the logical model containing policies associated with a second one of the different network contexts; and at step 2816 determining whether the first respective data structure is contained in the second respective data structure and/or the third respective data structure to yield a second containment check.

The first or second containment checks at steps 2812 and 2816 can be performed for the first respective data structure of each distinct pair of EPGs based on the second and/or third respective data structure, depending on whether policies for traffic between the respective EPGs in the one or more distinct pairs of EPGs are contained in one or both of the different network contexts. An example containment check is described above in step 2708 of FIG. 27.

At step 2818, the method can include determining whether security policies for traffic between the respective EPGs in the one or more distinct pairs of EPGs comply (e.g., satisfy, violate, apply) with the security compliance requirement based on the first or second containment check. In some cases, a compliance system such as Assurance Appliance 300 can determine which policies in the network and/or which policy constructs or policies satisfy, violate or do not apply the security compliance requirement based on the first or second containment check. For example, the compliance system can identify which of the first respective data structures are not contained in the second respective data structure and based on this determine which policies and/or policy constructs violate, satisfy, or fail to apply the security compliance requirement.

In some cases, the method can include generating one or more compliance assurance events based on the compliance result in step 2814. The one or more compliance assurance events can be generated and/or displayed as previously described with reference to FIGS. 26 and 27. Moreover, the one or more compliance assurance events can present various types of information, such as an indication of the security compliance requirement (and associated configuration settings), an indication of the policies and/or policy constructs that caused an event to be raised, a cause for the compliance result (e.g., a compliance violation, a compliance pass, a failure to apply a security compliance requirement, etc.), a time period or epoch associated with the event, etc. Additional details and examples of compliance assurance events and associated configurations and event presentations are further described above with respect to FIGS. 26 and 27.

In some cases, the method can include grouping security compliance requirements into security compliance requirement sets including multiple security compliance requirements. Moreover, the method can include associating one or more specific security compliance requirements or security compliance requirement sets with a particular fabric or segment of the network and applying the one or more specific security compliance requirements or security compliance requirement sets to that associated fabric or segment.

In some cases, the method can include determining whether a state of the network complies with the security compliance requirement. For example, the method can include comparing the security compliance requirement to rules programmed on network devices (e.g., switches, routers, etc.) in the network, such as ACLs and/or rules programmed on the hardware memory (e.g., TCAM) of network devices (e.g., Leafs 104) in the network. To illustrate, the method can include comparing (e.g., by performing a containment or assurance check) one or more first data structures representing the security compliance requirement with one or more second data structures representing hardware policy entries (e.g., TCAM entries) configured on network devices in the network, and based on the comparison, determining whether the hardware policy entries configured on the network devices satisfy, violate, or apply the security compliance requirement.

In some implementations, the one or more second data structures representing hardware policy entries configured on the network devices can be created based on one or more hardware models (e.g., Hardware Model 276) created for the network and/or network devices. For example, the hardware model of a switch can be used to construct one or more BDDs, which can represent the state of the network as it pertains to that network device (e.g., the rules programmed on the network device that implement or enforce security policies in the network), and the one or more BDDs can be used in the containment check.

In some cases, determining whether security policies for traffic between the respective EPGs in distinct pairs of EPGs comply with the security compliance requirement can include performing the method in FIG. 27 for some pairs of EPGs and the method in FIG. 28 for other pairs of EPGs. For example, assume some EPG pairs are in a same network context and other EPG pairs are in different network contexts. To determine whether security policies for traffic between the respective EPGs in distinct pairs of EPGs comply with the security compliance requirement, the containment check for the EPG pairs in the same network context can be performed as described in the method of FIG. 27, and the containment check for the EPG pairs in different network contexts can be performed as described in the method of FIG. 28. The determination can then be performed based on the results of the containment checks for the EPG pairs in the same network context and the EPG pairs in different network contexts.

The security compliance requirements in FIGS. 8-28 have been described with reference to EPGs. However, it should be noted that EPGs are used herein for explanation purposes as a non-limiting example of objects or policy constructs, but other types of objects or constructs are also contemplated herein and can be used to create and check compliance requirements as described herein. For example, instead of implementing EPG selectors, in some implementations compliance requirements and assurance or compliance checks can implement other object or construct selectors (in addition to, or in lieu of, EPG selectors), such as security groups, application profiles, contracts or rules, domains, filters, tenants, groups, policy groups, and/or any other group of objects or elements having one or more common attributes (e.g., a common location, SLA, address domain, label, configuration, security requirement, etc.).

The disclosure now turns to FIGS. 29 and 30, which illustrate example network and computing devices, such as switches, routers, servers, endpoints, client computers, and so forth. FIG. 29 illustrates an example network device 2900 suitable for performing switching, routing, assurance and containment checks, and other networking operations. Network device 2900 includes a central processing unit (CPU) 2904, interfaces 2902, and a connection 2910 (e.g., a PCI bus). When acting under the control of software or firmware, the CPU 2904 is responsible for executing packet management, error detection, and/or routing functions. The CPU 2904 preferably accomplishes all these functions under the control of software including an operating system and any appropriate applications software. CPU 2904 may include one or more processors 29029, such as a processor from the INTEL X296 family of microprocessors. In some cases, processor 29029 can be specially designed hardware for controlling the operations of network device 2900. In some cases, a memory 2906 (e.g., non-volatile RAM, ROM, TCAM, etc.) also forms part of CPU 2904. However, there are many different ways in which memory could be coupled to the system. In some cases, the network device 2900 can include a memory and/or storage hardware, such as TCAM, separate from CPU 2904. Such memory and/or storage hardware can be coupled with the network device 2900 and its components via, for example, connection 2910.

The interfaces 2902 are typically provided as modular interface cards (sometimes referred to as "line cards"). Generally, they control the sending and receiving of data packets over the network and sometimes support other peripherals used with the network device 2900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 2904 to efficiently perform routing computations, network diagnostics, security functions, etc.

Although the system shown in FIG. 29 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 2900.

Regardless of the network device's configuration, it may employ one or more memories (including memory 2906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 2906 could also hold various software containers and virtualized execution environments and data.

The network device 2900 can also include an application-specific integrated circuit (ASIC), which can be configured to perform routing, switching, and/or other operations. The ASIC can communicate with other components in the network device 2900 via the connection 2910, to exchange data and signals and coordinate various types of operations by the network device 2900, such as routing, switching, and/or data storage operations, for example.

FIG. 30 illustrates an example computing system architecture 3000 including components in electrical communication with each other using a connection 3005, such as a bus. System architecture 3000 includes a processing unit (CPU or processor) 3010 and a system connection 3005 that couples system components including system memory 3015, such as read only memory (ROM) 3020 and random access memory (RAM) 3025, to processor 3010. The system architecture 3000 can include a cache of high-speed memory connected directly with, in close proximity to, or integrated as part of, processor 3010. The system architecture 3000 can copy data from memory 3015 and/or storage device 3030 to cache 3012 for quick access by processor 3010. In this way, the cache can provide a performance boost that avoids processor delays while waiting for data. These and other modules can control processor 3010 to perform various actions. Other memory 3015 may be available for use as well. The memory 3015 can include different types of memory with different performance characteristics. The processor 3010 can include any processor and hardware or software service, such as service 1 3032, service 2 3034, and service 3 3036 stored in storage device 3030, configured to control the processor 3010 as well as a special-purpose processor where software instructions are incorporated into the actual processor design. The processor 3010 may be a completely self-contained computing system, containing multiple cores or processors, a bus, memory controller, cache, etc. A multi-core processor may be symmetric or asymmetric.

To enable user interaction with the system architecture 3000, an input device 3045 can represent any number of input mechanisms, such as a microphone for speech, a touch-sensitive screen for gesture or graphical input, keyboard, mouse, motion input, speech and so forth. An output device 3035 can also be one or more of a number of output mechanisms known to those of skill in the art. In some instances, multimodal systems can enable a user to provide multiple types of input to communicate with the system architecture 3000. The communications interface 3040 can generally govern and manage the user input and system output. There is no restriction on operating on any particular hardware arrangement and therefore the basic features here may easily be substituted for improved hardware or firmware arrangements as they are developed.

Storage device 3030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 3025, read only memory (ROM) 3020, and hybrids thereof. The storage device 3030 can include services 3032, 3034, 3036 for controlling the processor 3010. Other hardware or software modules are contemplated. The storage device 3030 can be connected to the system connection 3005. In one aspect, a hardware module that performs a particular function can include the software component stored in a computer-readable medium in connection with the necessary hardware components, such as the processor 3010, connection 3005, output device 3035, and so forth, to carry out the function.

For clarity of explanation, in some instances the present technology may be presented as including individual functional blocks, including devices, components, steps or routines in a method embodied in software, or combinations of hardware and software. In some cases, the computer-readable devices or media can include a cable or wireless signal. However, when mentioned, non-transitory computer-readable media expressly exclude media such as energy, electromagnetic waves, and signals per se.

Methods according to the above examples can be implemented using computer-executable instructions stored or otherwise available from computer-readable media. Such instructions can comprise, for example, instructions and data which cause or configure a computer or processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions and/or information include magnetic or optical disks, flash memory, USB devices provided with non-volatile memory, networked storage devices, and so on.

Devices implementing methods according to these disclosures can include hardware, firmware and/or software, and can take any of a variety of form factors. Example form factors include laptops, smart phones, small form factor computers, personal digital assistants, rackmount devices, standalone devices, and so on. Functionality described herein also can be embodied in peripherals or add-in cards. Such functionality can also be implemented on a circuit board among different chips or different processes executing in a device. The instructions, media for conveying such instructions, computing resources for executing them, and other structures for supporting such computing resources are means for providing the functions described in these disclosures.

Although a variety of examples and information was used to explain aspects within the scope of the appended claims, no limitation of the claims should be implied based on particular features or arrangements in such examples, as one of ordinary skill would be able to use these examples to derive a variety of implementations. Although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. The described features and steps are disclosed as examples of components within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A system comprising:

one or more processors; and at least one non-transitory computer-readable storage medium having stored therein instructions which, when executed by the one or more processors, cause the system to:

create a security compliance requirement for a network;

determine that respective groups in one or more pairs of endpoint groups are associated with respective different network contexts, wherein the respective different network contexts comprise one or more of a private network context, a network domain contact, a virtual routing and forwarding instance context, and a bridge domain context;

for a respective pair of endpoint groups of the one or more pairs of endpoint groups, create a first respective data structure representing the respective pair of endpoint groups;

create a second respective data structure representing a first portion of a logical model of the network, the first portion of the logical model containing policies corresponding to one context of the respective different network contexts;

determine whether the first respective data structure is contained in the second respective data structure, by evaluating one or more of a binary decision diagram, a reduced ordered binary decision diagram, or an n-bit vector representing respective policies, to yield a containment check, wherein the first respective data structure and the second respective data structure represent the respective different network contexts;

determine, in response to the containment check, whether policies for traffic between respective groups in the one or more pairs of endpoint groups comply with the security compliance requirement across the respective different network contexts to obtain a policy determination; and generate, in response to the policy determination, one or more compliance assurance events.

2. The system of claim 1, wherein the at least one non-transitory computer-readable storage medium stores additional instructions which, when executed by the one or more processors, cause the system to:

determine that the respective different network contexts contain policies for traffic between the respective groups in the one or more pairs of groups; and based on the respective different network contexts containing policies for traffic between the respective groups in the one or more pairs of groups, create a third respective data structure representing a second portion of the logical model, the second portion of the logical model containing policies associated with one determined context of the respective different network contexts.

3. The system of claim 2, wherein determining whether the first respective data structure is contained in the second respective data structure comprises determining whether the first respective data structure is contained in both the second respective data structure and the third respective data structure.

4. The system of claim 3, wherein the first respective data structure, the second respective data structure and the third respective data structure comprise at least one of the binary decision diagram, the reduced ordered binary decision diagram, and the n-bit vector.

5. The system of claim 1, wherein the second respective data structure is created in response to a determination that only one of the respective different network contexts contains policies for traffic between the respective groups in the one or more pairs of groups.

6. The system of claim 1, wherein the at least one non-transitory computer-readable storage medium stores additional instructions which, when executed by the one or more processors, cause the system to:

determine, for each of the one or more pairs of groups, that at least one of the respective different network contexts contains policies for traffic between the respective groups in the one or more pairs of groups.

7. The system of claim 1, wherein the at least one non-transitory computer-readable storage medium stores additional instructions which, when executed by the one or more processors, cause the system to:

compare one or more first data structures representing the security compliance requirement with one or more second data structures representing hardware policy entries configured on network devices in the network to obtain a comparison, the one or more first data structures and the one or more second data structures comprising at least one of the binary decision diagram, the reduced ordered binary decision diagram, and the n-bit vector; and based on the comparison, determine whether a state of the network complies with the security compliance requirement.

8. The system of claim 7, wherein determining whether a state of the network complies with the security compliance requirement comprises determining whether the hardware policy entries configured on the network devices in the network satisfy, violate, or apply the security compliance requirement.

9. The system of claim 1, wherein the one or more compliance assurance events indicate that one or more of the policies satisfy, violate, or do not apply the security compliance requirement and wherein the at least one non-transitory computer-readable storage medium stores additional instructions which, when executed by the one or more processors, cause the system to:

present at least one of:

a first indication that the security compliance requirement is satisfied, violated, or not applied by one or more of the policies on the network;

a second indication of a cause for the security compliance requirement being satisfied, violated, or not applied; and a third indication of at least one of an event severity, a number of security compliance issues, a compliance score, a security compliance issues count by category, and a compliance score by category, wherein the category comprises at least one of a type of security compliance requirement, a type of resource affected, and a policy object affected.

10. A method comprising:

creating a security compliance requirement for a network;

determining that respective security groups in one or more pairs of endpoint groups are associated with different network contexts, wherein the different network contexts comprise one or more of a private network context, a network domain contact, a virtual routing and forwarding instance context, and a bridge domain context;

for a respective pair of endpoint groups of the one or more pairs of endpoint groups, creating a first respective data structure representing the respective pair of endpoint groups;

creating a second respective data structure representing a first portion of a logical model of the network, the first portion of the logical model containing policies corresponding to one context of the different network contexts;

determining whether the first respective data structure is contained in the second respective data structure, by evaluating one or more of a binary decision diagram, a reduced ordered binary decision diagram, or an n-bit vector representing respective policies, to yield a containment check, wherein the first respective data structure and the second respective data structure represent the different network contexts;

determining, in response to the containment check, whether policies for traffic between respective groups in the one or more pairs of endpoint groups comply with the security compliance requirement across the different network contexts to obtain a policy determination; and generating, in response to the policy determination, one or more compliance assurance events.

11. The method of claim 10, further comprising:

determining that the different network contexts contain policies for traffic between the respective groups in the one or more pairs of groups; and based on the different network contexts containing policies for traffic between the respective groups in the one or more pairs of groups, creating a third respective data structure representing a second portion of the logical model, the second portion of the logical model containing policies associated with one of the different network contexts.

12. The method of claim 11, wherein determining whether the first respective data structure is contained in the second respective data structure comprises determining whether the first respective data structure is contained in both the second respective data structure and the third respective data structure.

13. The method of claim 12, wherein the first respective data structure, the second respective data structure and the third respective data structure comprise at least one of the binary decision diagram, the reduced ordered binary decision diagram, and the n-bit vector.

14. The method of claim 10, wherein the second respective data structure is created in response to a determination that only one of the different network contexts contains policies for traffic between the respective groups in the one or more pairs of groups.

15. The method of claim 10, further comprising:

comparing one or more first data structures representing the security compliance requirement with one or more second data structures representing hardware policy entries configured on network devices in the network to obtain a comparison, the one or more first data structures and the one or more second data structures comprising at least one of the binary decision diagram, the reduced ordered binary decision diagram, and the n-bit vector; and based on the comparison, determining whether the hardware policy entries configured on the network devices in the network satisfy, violate, or apply the security compliance requirement.

16. The method of claim 10, wherein the one or more compliance assurance events indicates that one or more of the policies satisfy, violate, or do not apply the security compliance requirement, the method further comprising:

presenting at least one of:

a first indication that the security compliance requirement is satisfied, violated, or not applied by one or more of the policies on the network;

a second indication of a cause for the security compliance requirement being satisfied, violated, or not applied; and a third indication of at least one of an event severity, a number of security compliance issues, a compliance score, a security compliance issues count by category, and a compliance score by category, wherein the category comprises at least one of a type of security compliance requirement, a type of resource affected, and a policy object affected.

17. At least one non-transitory computer-readable storage medium having stored therein instructions which, when executed by one or more processors, cause the one or more processors to:

create a security compliance requirement for a network;

determine that respective groups in one or more pairs of endpoint groups are associated with different network contexts, wherein the different network contexts comprise one or more of a private network context, a network domain contact, a virtual routing and forwarding instance context, and a bridge domain context;

for a respective pair of endpoint groups of the one or more pairs of endpoint groups, create a first respective data structure representing the respective pair of endpoint groups; create a second respective data structure representing a first portion of a logical model of the network, the first portion of the logical model containing policies corresponding to one context of the different network contexts;

determine whether the first respective data structure is contained in the second respective data structure, by evaluating one or more of a binary decision diagram, a reduced ordered binary decision diagram, or an n-bit vector representing respective policies, to yield a containment check, wherein the first respective data structure and the second respective data structure represent the different network contexts;

determine in response to the containment check, whether policies for traffic between respective groups in the one or more pairs of endpoint groups comply with the security compliance requirement across the different network contexts to obtain a policy determination; and generate, in response to the policy determination, one or more compliance assurance events.

18. The at least one non-transitory computer-readable storage medium of claim 17, wherein the instructions, when executed by the one or more processors, cause the one or more processors to:

determine that the different network contexts contain policies for traffic between the respective groups in the one or more pairs of groups; and based on the different network contexts containing policies for traffic between the respective groups in the one or more pairs of groups, create a third respective data structure representing a second portion of the logical model, the second portion of the logical model containing policies associated with one of the different network contexts;

wherein determining whether the first respective data structure is contained in the second respective data structure comprises determining whether the first respective data structure is contained in both the second respective data structure and the third respective data structure.

* * * * *